(12) United States Patent
Usman et al.

(10) Patent No.: US 11,554,796 B2
(45) Date of Patent: Jan. 17, 2023

(54) VEHICLE-BASED GUIDED SWITCHING

(71) Applicant: Hyperloop Technologies, Inc., Los Angeles, CA (US)

(72) Inventors: Irfan-ur-rab Usman, Los Angeles, CA (US); Alex Jedinger, Los Angeles, CA (US); Mario Hansl, Los Angeles, CA (US)

(73) Assignee: HYPERLOOP TECHNOLOGIES, INC., Los Angeles, CA (US)

( * ) Notice: Subject to any disclaimer, the term of this patent is extended or adjusted under 35 U.S.C. 154(b) by 796 days.

(21) Appl. No.: 16/039,736

(22) Filed: Jul. 19, 2018

(65) Prior Publication Data
US 2019/0023285 A1 Jan. 24, 2019

Related U.S. Application Data

(60) Provisional application No. 62/535,595, filed on Jul. 21, 2017.

(51) Int. Cl.
*B61B 13/08* (2006.01)
*B60L 13/00* (2006.01)
(Continued)

(52) U.S. Cl.
CPC ............ *B61B 13/08* (2013.01); *B60L 13/003* (2013.01); *B61L 11/083* (2013.01); *B61L 23/002* (2013.01);
(Continued)

(58) Field of Classification Search
CPC ...... B61B 13/08; B61L 23/002; B61L 11/083; B61L 2210/04; E01B 7/00; E01B 25/34; B60L 13/003
See application file for complete search history.

(56) References Cited

U.S. PATENT DOCUMENTS 3,841,227 A 10/1974 Fink
3,845,720 A 11/1974 Bohn et al.
(Continued)

FOREIGN PATENT DOCUMENTS

DE 2426513 A1 * 12/1975 ............ B60L 13/003
DE 19923161 12/1999
(Continued)

OTHER PUBLICATIONS

International Search Report and Written Opinion in counterpart application No. PCT/US18/42912, dated Oct. 2, 2018.
(Continued)

*Primary Examiner* — Zachary L Kuhfuss
(74) *Attorney, Agent, or Firm* — Greenblum & Bernstein, P.L.C.

(57) ABSTRACT

A track switching arrangement for a track-based guided transportation system, wherein the track switching arrangement forms diverging pathways and enables vehicle-side switching of a vehicle in the guided transportation system. The track switching arrangement includes an upstream pathway; two downstream pathways; and a path switching transition region having the diverging pathways between the upstream pathway and the two downstream pathways. Each of the pathways includes track elements configured to interact with one or more respective bearings of the vehicle to provide levitation to the vehicle and/or guidance for the vehicle.

12 Claims, 57 Drawing Sheets

(51) Int. Cl.
  *B61L 11/08* (2006.01)
  *B61L 23/00* (2006.01)
  *E01B 7/00* (2006.01)
  *E01B 25/34* (2006.01)

(52) U.S. Cl.
  CPC ............... *E01B 7/00* (2013.01); *E01B 25/34* (2013.01); *B61L 2210/04* (2013.01)

(56) References Cited

U.S. PATENT DOCUMENTS

| | | | |
|---|---|---|---|
| 3,847,086 A | 11/1974 | Steenbeck | |
| 3,851,594 A | 12/1974 | Schwarzler et al. | |
| 3,931,767 A | 1/1976 | Karch | |
| 3,939,776 A | 2/1976 | Ross et al. | |
| 3,964,398 A | 6/1976 | Breitling | |
| 4,072,110 A * | 2/1978 | Jayawant | B61B 13/08 104/130.02 |
| 5,291,834 A | 3/1994 | Quaas | |
| 5,732,636 A | 3/1998 | Wang et al. | |
| 6,684,794 B2 * | 2/2004 | Fiske | B60L 13/04 104/281 |
| 7,757,609 B2 * | 7/2010 | Fiske | B60L 13/06 104/130.02 |
| 10,974,909 B2 | 4/2021 | Davidson et al. | |
| 2003/0217668 A1 | 11/2003 | Fiske et al. | |
| 2008/0083346 A1 * | 4/2008 | Fiske | B60L 13/06 104/283 |
| 2009/0114775 A1 | 5/2009 | Wunder | |
| 2011/0271867 A1 | 11/2011 | Liu | |
| 2015/0360580 A1 | 12/2015 | Oster | |
| 2016/0009196 A1 | 1/2016 | Allard | |
| 2016/0059868 A1 | 3/2016 | Allaire | |
| 2017/0183829 A1 | 6/2017 | Wamble, III et al. | |
| 2018/0009333 A1 | 1/2018 | King et al. | |
| 2018/0141459 A1 | 5/2018 | Henderson | |
| 2018/0186389 A1 | 7/2018 | Hosseini | |
| 2018/0212504 A1 | 7/2018 | Kleinikkink | |
| 2019/0023285 A1 * | 1/2019 | Usman | B61L 11/083 |
| 2020/0164750 A1 * | 5/2020 | Kooger | E01B 25/34 |
| 2021/0016814 A1 | 1/2021 | Geuze et al. | |

FOREIGN PATENT DOCUMENTS

| | | |
|---|---|---|
| WO | WO2020/060410 | 3/2020 |
| WO | WO2020/122718 | 6/2020 |

OTHER PUBLICATIONS

Ho, "Is this Chinese protype the shape of maglev train tech to come?" South China Morning Post (Jan. 13, 2021).

Cassat et al., "MAGLEV Projects Technology Aspect and Choices," IEEE Transactions on Applied Superconductivity (Apr. 2002); https://www.researchgate.net/publication/224055510.

Cassat et al., "MAGLEV—Worldwide Status and Technical Review," Electrotechnique du Futur (Dec. 14 & 15, 2011); https://www.researchgate.net/publication/236993225.

Jian, "'Floating' in the struggle—the youth power of China's independent maglev train," Xinhua News Agency (May 3, 2020); www.xinhuanet.com/politics/2020-05/03/c_1125939110.htm.

Extended European Search Report in counterpart EP Application No. 188836064.8, dated Mar. 22, 2021.

Saudi Arabian First Examination Report in counterpart application No. SA520411093, dated Dec. 30, 2021 (along with English translation).

Indian First Examination Report in counterpart application No. 201947054664, dated Mar. 7, 2022.

First Office Action and Search Report in counterpart Chinese Application No. 201880048984.7, dated Nov. 9, 2022 (and translation thereof).

* cited by examiner

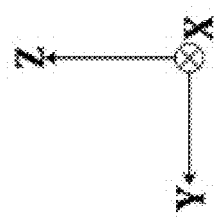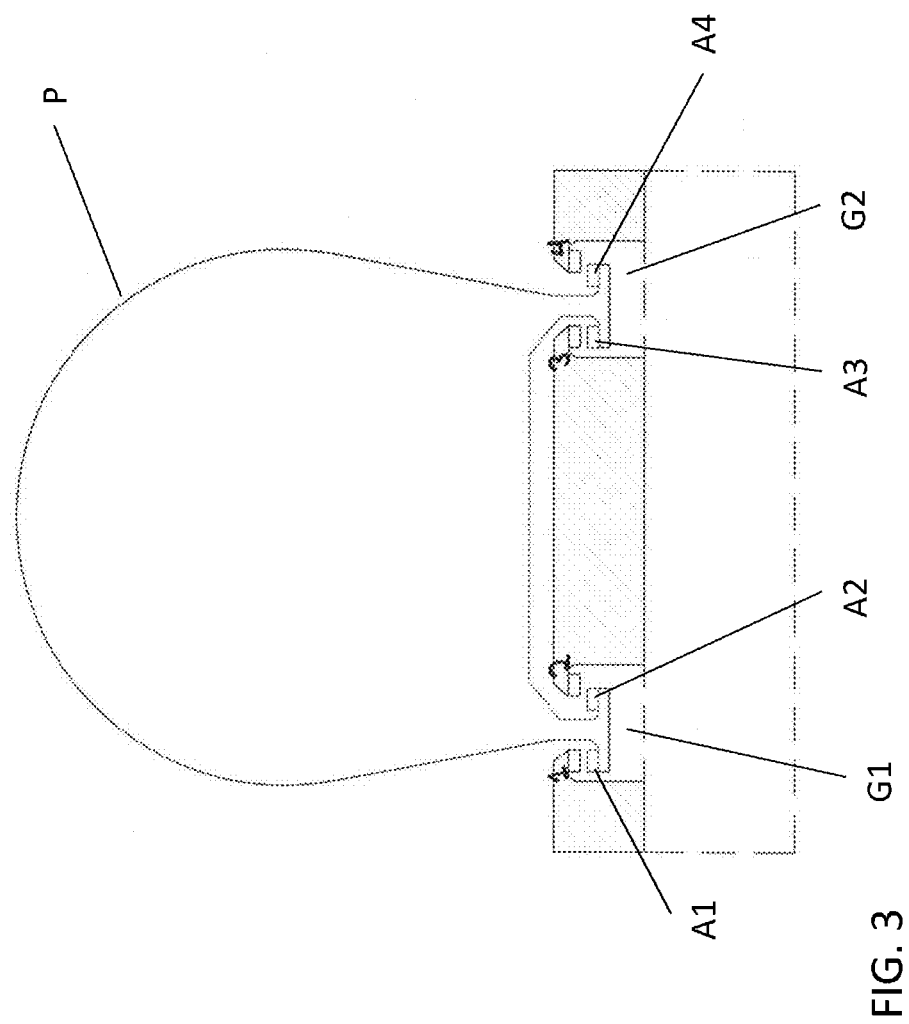
FIG. 3

VEHICLE-BASED GUIDED SWITCHING

CROSS-REFERENCE TO RELATED APPLICATION

The present application claims the benefit of U.S. Provisional Application No. 62/535,595, filed Jul. 21, 2017, the contents of which are expressly incorporated herein by reference in their entireties.

BACKGROUND OF THE DISCLOSURE

1. Field of the Disclosure

The present disclosure relates to guided transportation, namely vehicle-based (or vehicle-side) switching of a vehicle, e.g., at a path divergence or convergence.

2. Background of the Disclosure

The primary goal of transportation is "to go." At first, to go simply indicates moving. Over time, "to go" is refined to moving with purpose—getting from point A to point B. Various forms of transportation have been developed to achieve travel across different terrains, in different amounts of time, and with different comfort levels. A high-speed, high-efficiency transportation system may utilize any number of propulsion systems, for example, in an enclosed low-pressure environment to achieve the high-speed (e.g., 700 MPH) allowed. Such a system may have critical paths that define maximum operating speed and throughput. In a track-based guided system, e.g., such as rail, one such critical path is path-switching. Current forms of switching for track-based guided systems are track-side, are generally mechanical, are slow, and are prone to failure.

For example, two primary causes for derailments in a track-based guided systems include: (1) hazards (e.g., animals, debris) on the track; and (2) track-side switches. With a transportation system having an enclosed environment, hazards on the track may present less of a problem, as for example, animals cannot wander onto the enclosed tracks. Utilizing conventional track-side switching systems in a high-speed transportation system, however, still present the same above-noted drawbacks.

Thus, there is a need for improved switching systems and methods for a track-based guided system that avoids the drawbacks of track-side switching systems.

SUMMARY OF THE EMBODIMENTS OF THE DISCLOSURE

The novel features which are characteristic of the disclosure, both as to structure and method of operation thereof, together with further aims and advantages thereof, will be understood from the following description, considered in connection with the accompanying drawings, in which an embodiment of the disclosure is illustrated by way of example. It is to be expressly understood, however, that the drawings are for the purpose of illustration and description only, and they are not intended as a definition of the limits of the disclosure.

The present disclosure is related to a vehicle-side switching system that allows vehicle-side switching in a guided track-based transportation system. The switching system includes a vehicle with an at least one guidance apparatus (e.g., bearing) that engages with a plurality of track elements to provide focused lateral and vertical guidance to the vehicle, which permits path switching for the vehicle at a divergence (or convergence).

Embodiments include methods of vehicle-based switching with a solid-state track (of various exemplary topologies). The vehicle-based switching utilizes one or more bearings' ability to generate guidance forces (for example, employing an augmented permanent magnet system), coupled with bearing and track layout that allows for generation of active guidance forces. Embodiments of the disclosure include various exemplary track topologies for the vehicle-based switching, including: 1) under-hung with four rails (or tracks); 2) overhung with four rails largely on a single plane; 3) over-hung with four rails largely on a single plane, with a different switching control method; 4) over-hung with four rails largely on a single plane with a third switching method.

Aspects of the present disclosure are directed to a track switching arrangement for a track-based guided transportation system, the track switching arrangement forming diverging pathways and enabling vehicle-side switching of a vehicle in the guided transportation system, the track switching arrangement comprising: an upstream pathway; two downstream pathways; and a path switching transition region having the diverging pathways between the upstream pathway and the two downstream pathways, wherein each of the pathways comprises track elements configured to interact with one or more respective bearings of the vehicle to provide levitation to the vehicle and/or guidance for the vehicle.

In embodiments, the track elements are under-hung.

In further embodiments, the track elements comprise four rails.

In additional embodiments, the track elements are each in the same plane.

In embodiments, the track elements are arranged in respective guideways configured to accommodate respective bearings of the vehicle In some embodiments, at the upstream pathway, the respective guideways have a first width such that the rails arranged therein are each arranged to interact with a respective bearing of the vehicle, and wherein at a beginning portion of the path switching transition region, the respective guideways increase in width from the first width such that such that only some of the rails arranged therein are each arranged to directly interact with a respective bearing of the vehicle.

In some embodiments, at a further portion of the path switching transition region downstream from the beginning portion, the respective guideways further increases in width to accommodate additional track elements of the diverging pathways.

In additional embodiments, the track switching arrangement further comprises a cross-over region.

In embodiments, the track switching arrangement further comprises at least one guideway and at least one track element arranged in the at least one guideway.

In further embodiments, the at least one guideway has a cross section structured to allow a vehicle guidance apparatus of the vehicle to suspend substantially beneath the track element, which is connected to an overhang ceiling of the at least one guideway, such that the at least one bearing of the vehicle guidance apparatus is engaged with the at least one track, such that the track is exerts forces on the bearing, including a lateral force and a vertical force.

In additional embodiments, the at least one guideway comprises a substantially rectangular cross-section with a gap in a top wall configured to accommodate the bearing to provide magnetic levitation to suspend substantially below an overhang ceiling of the guideway while the bearing is connected to the vehicle substantially outside the guideway.

In yet further embodiments, the at least one guideway comprises a substantially rectangular cross-section with a gap in a top wall configured to accommodate the bearing to provide levitation to suspend substantially below an overhang ceiling of the guideway while the bearing is connected to the vehicle substantially outside the guideway.

In some embodiments, the track elements form an overhead bearing surface comprising four tracks configured for respective selective interaction with four combined out-of-plane and in-plane bearings of the vehicle.

In further embodiments, the track elements form an overhead bearing surface comprising four tracks configured for respective selective interaction with two largely out-of-plane bearings (still capable of in-plane force) and two largely in-plane bearings (still capable of out-of-plane force) of the vehicle.

In additional embodiments, the track elements form an overhead bearing surface comprising three tracks configured for respective selective interaction with one out-of-plane bearing, two in-plane bearings of the vehicle.

In embodiments, the track elements form an overhead bearing surface comprising four tracks configured for respective selective interaction with two out-of-plane bearings and two in-plane bearings of the vehicle.

In further embodiments, the track elements form an overhead bearing surface comprising four rails on a single plane configured for respective selective interaction with four in-plane bearings of the vehicle.

In additional embodiments, the track elements form an overhead bearing surface comprising two rails on a single plane and multiple largely guidance rails.

In yet further embodiments, the track elements form an overhead bearing surface comprising two rails on a single plane with a plurality of off-set and angled rails producing both levitation and guidance.

In some embodiments, the track elements form an overhead bearing surface comprising one rail with one out-of-plane bearing and two rails with in-plane bearings.

Additional aspects of the present disclosure are directed to a method of operating the switching system, the method comprising: controlling activation and/or magnitude of operation of one or more respective bearings on the vehicle during travel through the path switching transition region having the diverging pathways between the upstream pathway and the two downstream pathways, to selectively interact with some of the track elements to provide guidance for the vehicle to one of the two downstream pathways.

BRIEF DESCRIPTION OF THE DRAWINGS

The novel features which are characteristic of the systems, both as to structure and method of operation thereof, together with further aims and advantages thereof, will be understood from the following description, considered in connection with the accompanying drawings, in which embodiments of the system are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the embodiments of the disclosure in conjunction with the following exemplary and non-limiting drawings wherein:

FIG. 3 shows an exemplary cross-sectional view at section 3 of FIG. 1 in accordance with aspects of the disclosure;

DETAILED DESCRIPTION OF THE EMBODIMENTS OF THE DISCLOSURE

Figure 1:
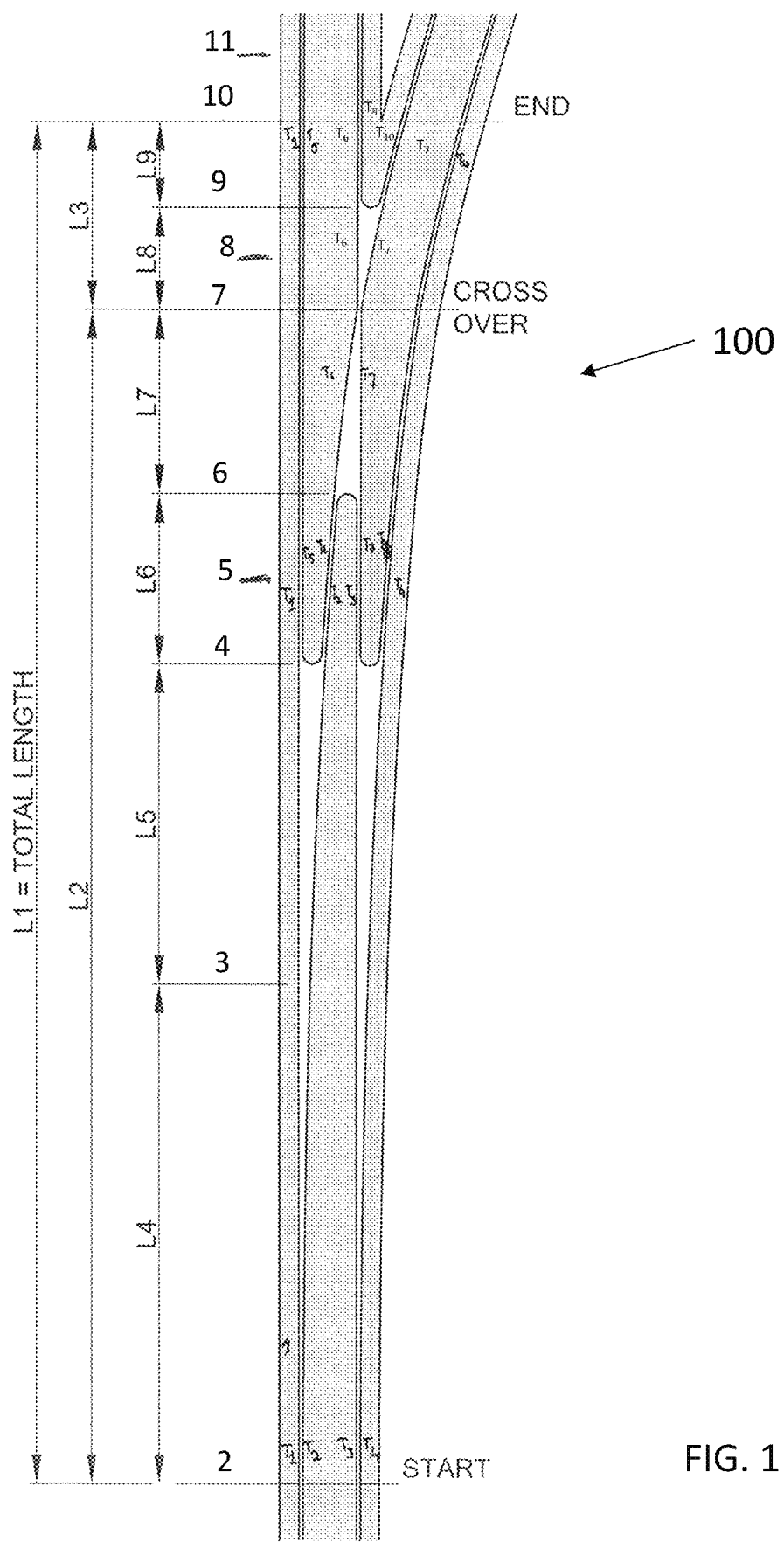
FIG. 1 shows an exemplary schematic illustration of an overview of a switching system in accordance with aspects of the disclosure.

The following detailed description illustrates by way of example, not by way of limitation, the principles of the disclosure. This description will clearly enable one skilled in the art to make and use the disclosure, and describes several embodiments, adaptations, variations, alternatives and uses of the disclosure, including what is presently believed to be the best mode of carrying out the disclosure. It should be understood that the drawings are diagrammatic and schematic representations of exemplary embodiments of the disclosure, and are not limiting of the present disclosure nor are they necessarily drawn to scale.

Embodiments of the present disclosure may be used in a transportation system, for example, as described in commonly-assigned application Ser. No. 15/007,783, titled "Transportation System," the contents of which are hereby expressly incorporated by reference herein in their entirety.

As discussed herein, embodiments of the present disclosure (e.g. track topologies) may be used in conjunction with one or more bearings and guidance controls of the bearings, for example, as described in commonly-assigned U.S. Pat. No. 10,940,764 titled "Augmented Permanent Magnet System," filed on the same day as the instant application, the contents of which are hereby expressly incorporated by reference herein in their entirety. U.S. Pat. No. 10,940,764 titled "Augmented Permanent Magnet System," describes methods and apparatuses for producing non-contact forces (e.g., levitation and/or guidance forces) using a permanent magnet and a coil, including various topologies and the ability to generate guidance forces by offsetting the electromagnet relative to the track, which may be utilized, for example, to direct a vehicle at a pathway divergence towards one or another of the diverging pathways. For example, embodiments of the present disclosure may utilize one or more of: an active guidance configuration (engines offset laterally from centerline of track); active guidance configurations for decoupled axes on a single guideway, and control law for active guidance on single guideway, as well as a multiple guideway arrangement for active guidance with decoupled axes, and a guidance control method for adjustable force distribution on multiple guideways with decoupled axes, as discussed in U.S. Pat. No. 10,940,764 titled "Augmented Permanent Magnet System."

In the following description, the various embodiments of the present disclosure will be described with respect to the enclosed drawings. As required, detailed embodiments of the embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the present disclosure. In this regard, no attempt is made to show structural details of the present disclosure in more detail than is necessary for the fundamental understanding of the present disclosure, such that the description, taken with the drawings, making apparent to those skilled in the art how the forms of the present disclosure may be embodied in practice.

As used herein, the singular forms "a," "an," and "the" include the plural reference unless the context clearly dictates otherwise. For example, reference to "a magnetic material" would also mean that mixtures of one or more magnetic materials can be present unless specifically excluded. As used herein, the indefinite article "a" indicates one as well as more than one and does not necessarily limit its referent noun to the singular.

Except where otherwise indicated, all numbers expressing quantities used in the specification and claims are to be understood as being modified in all examples by the term "about." Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms "about" and "approximately" indicate that the amount or value in question may be the specific value designated or some other value in its neighborhood. Generally, the terms "about" and "approximately" denoting a certain value is intended to denote a range within ±5% of the value. As one example, the phrase "about 100" denotes a range of 100±5, i.e. the range from 95 to 105. Generally, when the terms "about" and "approximately" are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

The present disclosure is related to a switching system that allows vehicle-side switching in a guided transportation system. The switching system includes a pathway and a vehicle guidance apparatus, attached to a vehicle. The vehicle guidance apparatus includes at least one bearing, which in some embodiments may be, by way of non-limiting example, a levitation (or lev) engine (e.g., magnetic levitation engine). In an embodiment, the bearing may also exert guidance force (i.e., y-directed forces), such as by utilizing a magnetic levitation system and/or a wheeled system. In embodiments, a plurality of the bearings may be coupled or non-coupled (or un-coupled), e.g., may be independently controlled. Additionally, the bearings may include non-contact (e.g., magnetic bearings) and/or contact bearings (e.g., wheels). It is noted that, while the description discusses magnetic bearings for providing levitation in various track topologies, it should be understood that the specification contemplates that other types of bearings for providing levitation may be used with any of the exemplary topologies, such as, for example, air bearings and/or liquid bearings, in addition to other fluid bearings. Furthermore, in embodiments, the bearings may include one or more of in-plane and/or out-of-plane bearings. With any reference to in-plane and out-of-plane bearings, it should be understood that these bearings can still produce some amount of force in the other direction, and that the label of in-plane or out-of-plane is meant to imply operational choice, and not intended to limit the possible modes of operation. In other words, it should be understood that all bearings may be capable of both in and out-of-plane forces, and an indication of in-plane or out-of-plane is merely indicative of a particular mode of operation of the bearing as in-plane or out-of-plane.

In an embodiment, the pathway is configured such that there is an at least one guideway, including at least one track element. In embodiments, the guideway has a cross section structured to allow the vehicle guidance apparatus to suspend substantially beneath a track connected to an overhang ceiling, such that the at least one bearing is engaged with the at least one track, such that the track is exerting a force on the bearing, including a lateral force and a vertical force. In an embodiment, the cross section of the guideway may be substantially rectangular with a gap in a top wall that allows the magnetic levitation system to suspend substantially below an overhang ceiling while connected to a vehicle P substantially outside the guideway. In different contemplated embodiments, the guideway may be located above, below, or laterally to the vehicle, so long as there is a counterbalancing force.

FIG. 1 shows an exemplary schematic illustration of an overview of vehicle track 100 with elements of a switching system and diverging pathways in accordance with aspects of the disclosure. As shown in FIG. 1, the pathways may include a plurality of track segments. In accordance with aspects of the disclosure, the length L1 of the transition of the diverging pathways may be designed, for example, to provide little discomfort to a passenger (e.g., subject the passenger to low G-forces). That is, with a shorter length of transition, the turn of the transition will be sharper, and thus, subjecting a passenger to greater G-forces (which may only be suitable for non-living cargo). Conversely, with a longer length of transition, the turn of the transition will be flatter, and thus, subjecting a passenger to lower G-forces. Thus, the length of the transition may be determined, at least in part, based on the needs of the system (e.g., passenger cargo versus non-passenger cargo). In comparing the transition lengths of over-hung levitation systems (e.g., of FIG. 12) versus under-hung levitation systems (e.g., of FIG. 2), the transition lengths of over-hung levitation systems can be less than the transition lengths of under-hung levitation systems by a factor of five, which in accordance with aspects of the disclosure, may provide some advantages of over-hung levitation systems as compared to under-hung levitation systems.

Figure 2:
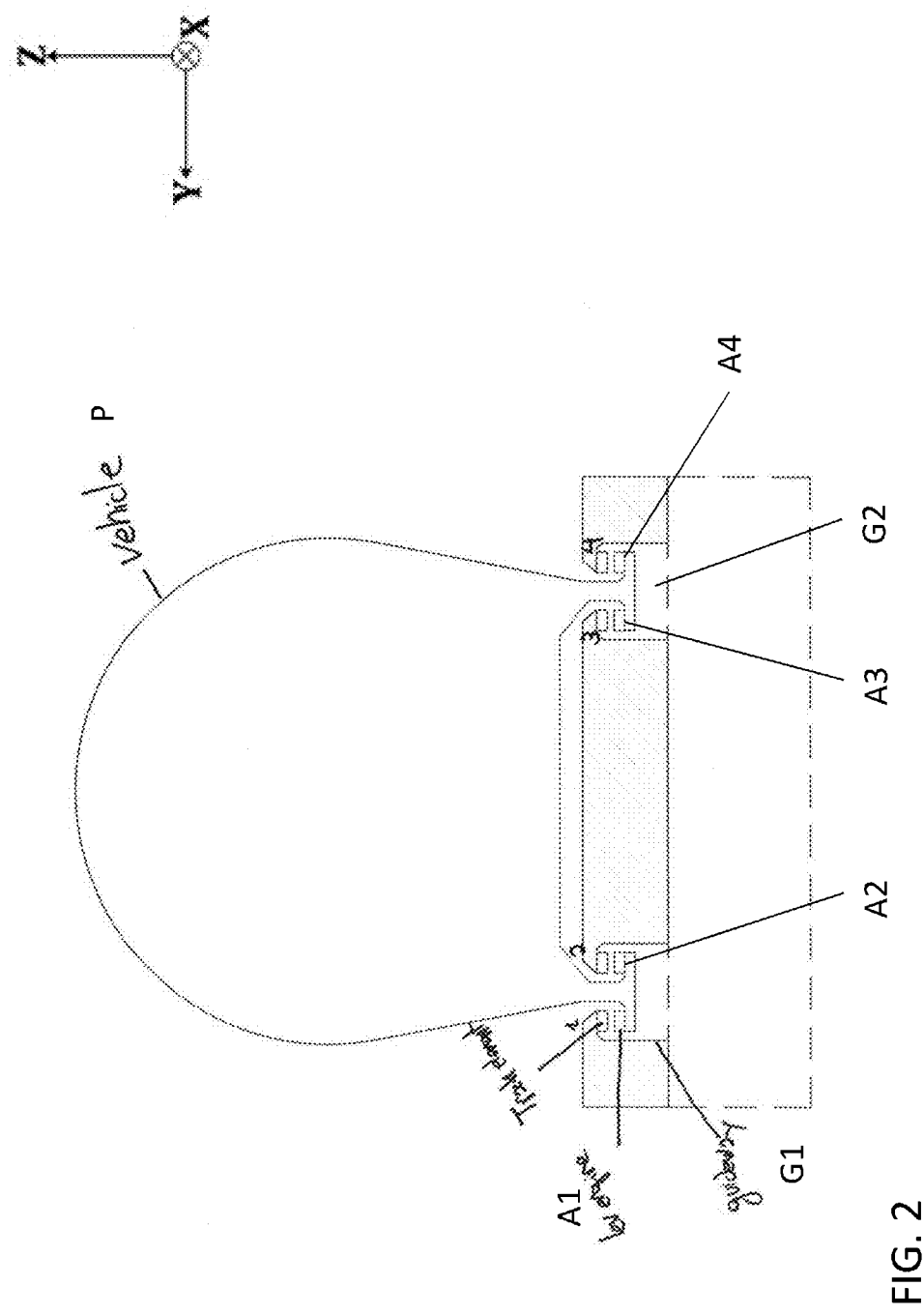
FIG. 2 shows an exemplary cross-sectional view at section 2 of FIG. 1 in accordance with aspects of the disclosure.

FIG. 2 shows an exemplary cross-sectional view at section 2 of FIG. 1 in accordance with aspects of the disclosure. As shown in FIG. 2, at the exemplary cross section at section 2, a track system may include four track elements (1, 2, 3, 4) to which a vehicle P may be engaged. FIG. 2 is an example of an under-hung levitation system. That is, the exemplary and non-limiting embodiment of FIGS. 1-11 shows an underhung track topology having four rails. As shown in FIG. 2, track element 1 and track element 2 are engaged with bearings A1, A2 arranged in a left-side guideway G1, and track element 3 and track element 4 are engaged with bearings A3, A4 arranged in a right-side guideway (e.g., substantially mirrored to the left side). In accordance with aspects of the disclosure, the bearings A1-A4 are operable to provide levitation (e.g., in the vertical direction and lateral direction) and guidance relative to the track elements (i.e., a force in the positive or negative y-direction), for example, based on a coordinate fixed to the vehicle P. An example of such a bearing configuration is disclosed in commonly-assigned U.S. Pat. No. 10,940,764, entitled "Augmented Permanent Magnet System," the entire contents of which are incorporated herein by reference. For example, FIGS. 12-16 (and corresponding description) of U.S. Pat. No. 10,940,764, entitled "Augmented Permanent Magnet System" teaches guidance control systems and methods for adjustable force distribution, which may be utilized to provide y-directed guidance forces (e.g., positive or negative y-directed forces) so as to guide a vehicle, e.g., towards a selected pathway of diverging pathways, for example, by offsetting the bearing (e.g., electromagnet) relative to the track.

FIG. 3 shows an exemplary cross-sectional view at section 3 of FIG. 1 in accordance with aspects of the disclosure. More specifically, FIG. 3 shows a cross section at section 3, wherein the width of the cross section of the guideway G1, G2 increases, causing the distance between track element 1 and track element 2 to increase, and causing the distance between track element 3 and track element 4 to increase. If, for example, a vehicle is configured to follow a leftward divergent path (as shown in FIG. 3), a right bearing A2, A4 on each vehicle guidance apparatus disengages (e.g., partially, with some degree of reduced power, for example, or completely) with track element 2 and track element 4, respectively. With a top-lev configuration, for example, disengagement may occur by reducing the net guidance force (e.g., lateral force) on a ski of a bearing to zero, while maintaining the "lift" force. In accordance with aspects of the disclosure, turning in a guidance direction is accomplished by adjustment of a net guidance force.

As shown in FIG. 3, a left bearing A1, A3 on each vehicle guidance apparatus will remain engaged with track element 1 and track element 3, respectively. As should be understood, if a vehicle is configured to follow a rightward divergent path (not shown), a left bearing A1, A3 on each vehicle guidance apparatus disengages with track element 1 and track element 3, respectively. A right bearing A2, A4 on each vehicle guidance apparatus will remain engaged with track element 2 and track element 4, respectively, and in accordance with aspects of the disclosure, the vehicle P will follow the rightward pathway.

Figure 4:
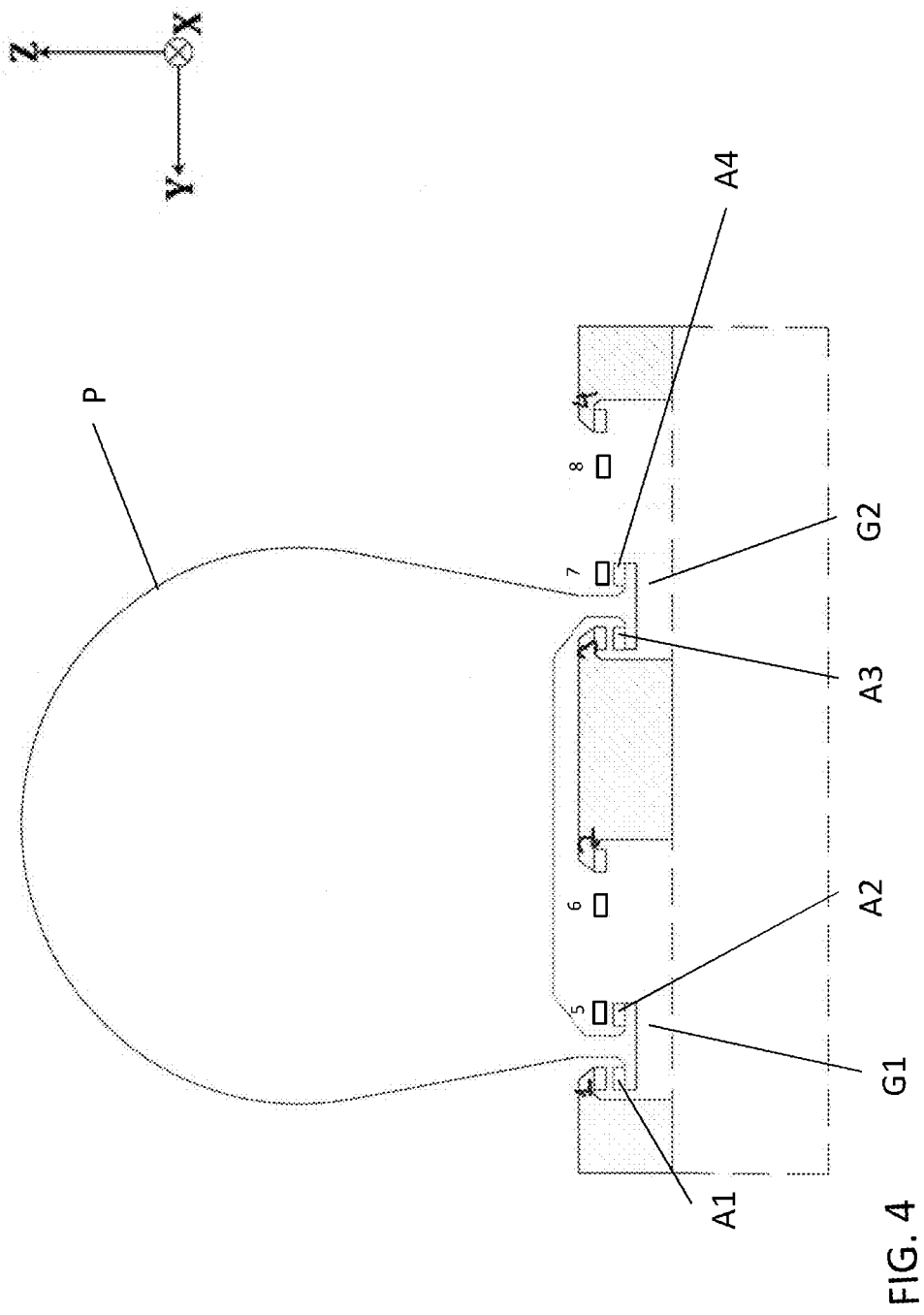
FIG. 4 shows an exemplary cross-sectional view at section 4 of FIG. 1 in accordance with aspects of the disclosure.

FIG. 4 shows an exemplary cross-sectional view at section 4 of FIG. 1 in accordance with aspects of the disclosure. More specifically, FIG. 4 shows a cross section at section 4, just upstream of where two additional guideways begin introducing track elements 5, 6, 7, and 8 (see also, e.g., FIG. 5). As shown in FIG. 4, the width of the cross section of the guideway G1, G2 increases further, causing the distance between track element 1 and track element 2 to increase further, and causing the distance between track element 3 and track element 4 to increase further.

As shown, if a vehicle P is configured to follow a left path, a left bearing A1, A3 will remain engaged with track element 1 and track element 3 while the right bearing A2, A4 will be inactive, until it has exited a zone of engagement, which is a sufficient distance far enough from track element 2 and track element 4 that there is no guidance force. A right bearing A2, A4 on each vehicle guidance apparatus may repower, so that it may engage to emerging track element 5 and track element 7 (see also, e.g., FIG. 5). As should be understood, if a vehicle P is configured to follow a rightward divergent path (not shown), respective right bearings A2, A4 of the vehicle P will remain engaged with track element 2 and track element 4, while the left bearings A1, A3 will be inactive (e.g., partially, with some degree of reduced power, for example, or completely). The respective left bearing A1, A3 may repower at this point (or subsequently), so that they are operable to engage the emerging track element 6 and track element 8 (see also e.g., FIG. 5).

Figure 5:
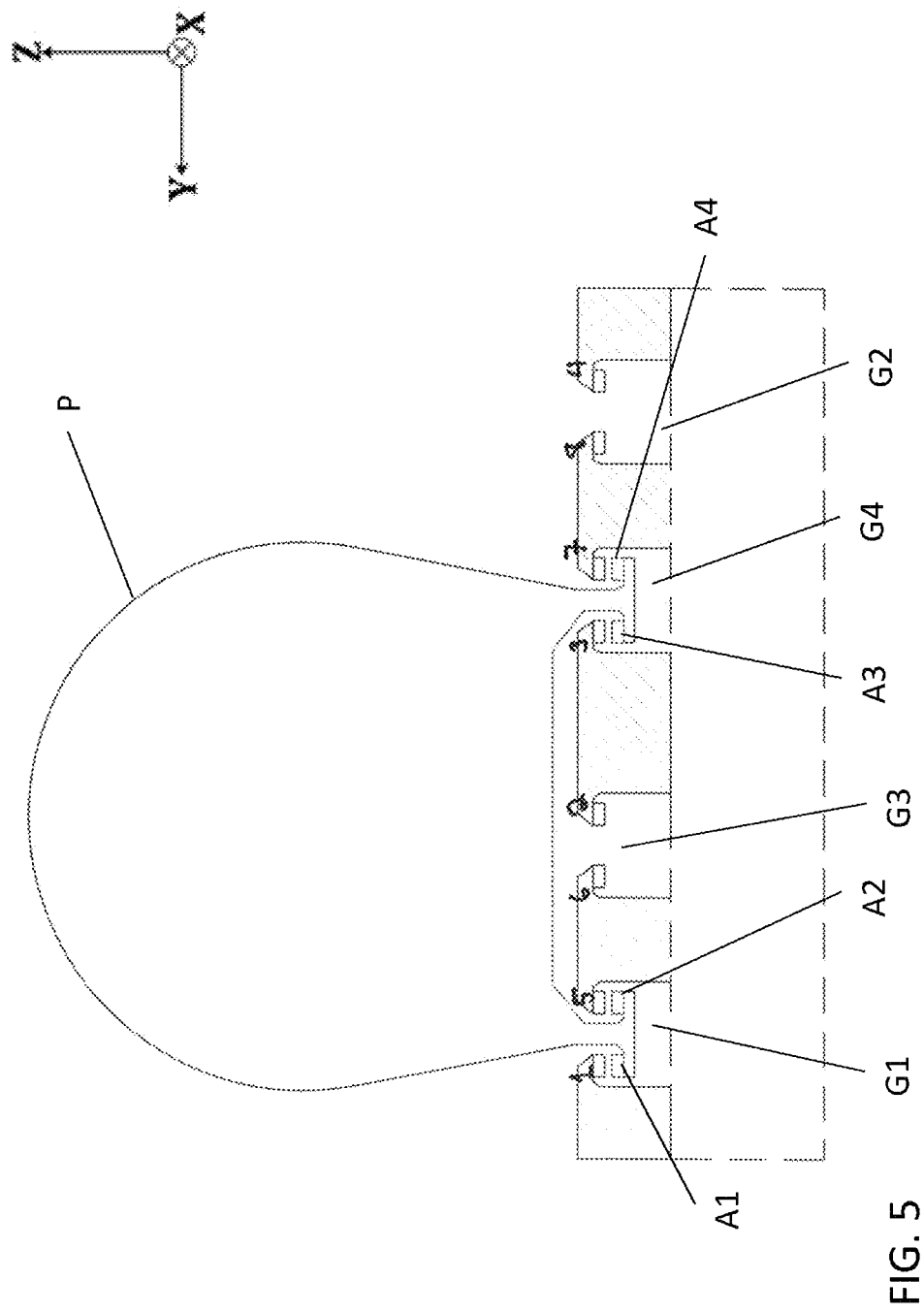
FIG. 5 shows an exemplary cross-sectional view at section 5 of FIG. 1 in accordance with aspects of the disclosure.

FIG. 5 shows an exemplary cross-sectional view at section 5 of FIG. 1 in accordance with aspects of the disclosure. More specifically, FIG. 5 shows a cross section at section 5, wherein two additional guideways G3, G4 introduce track elements 5, 6, 7, and 8. As shown, if a vehicle P is configured to follow a leftward divergent path, respective left bearings A1, A3 will remain engaged with track element 1 and track element 3 while the right bearings A2, A4 on each vehicle guidance apparatus engage with track element 5 and track element 7, respectively. If a vehicle P is configured to follow a rightward divergent path (not shown), the right bearings A2, A4 will remain engaged with track element 2 and track element 4, respectively, while the left bearings A1, A3 will engage track element 6 and track element 8, respectively.

Figure 6:
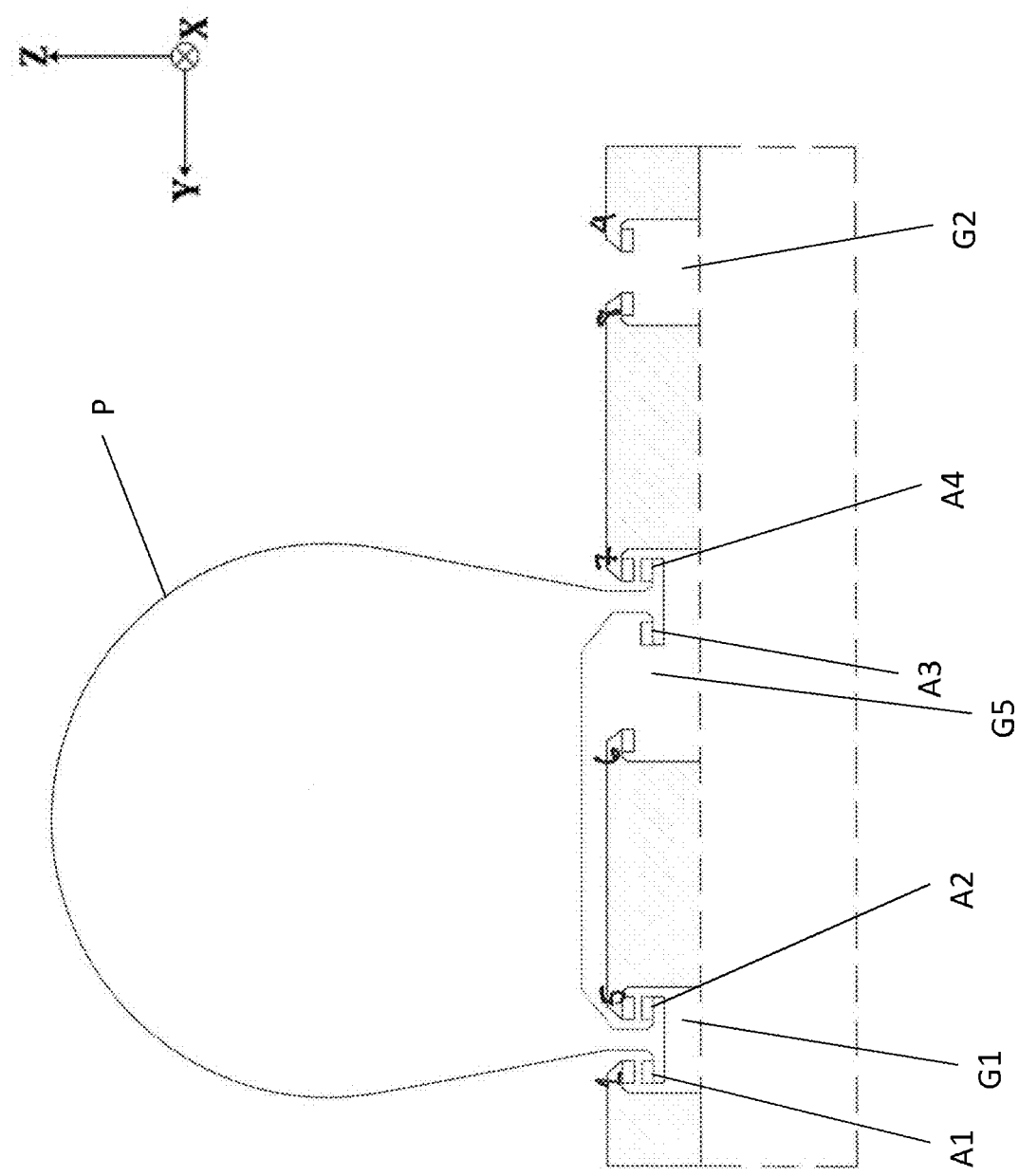
FIG. 6 shows an exemplary cross-sectional view at section 6 of FIG. 1 in accordance with aspects of the disclosure.

FIG. 6 shows an exemplary cross-sectional view at section 6 of FIG. 1 in accordance with aspects of the disclosure. FIG. 6 shows a cross section at section 6, wherein track elements 2 and 3 are discontinued in the direction of travel in accordance with aspects of the disclosure. As shown, if a vehicle P is configured to follow a leftward divergent path, the bearings A1, A2 of the left vehicle guidance apparatus is engaged with track element 1 and track element 5, and a right vehicle guidance apparatus has a right bearing A4 that is engaged with track element 7 in guideway G5. If a vehicle P is configured to follow the rightward divergent path, the bearings A3, A4 of the right vehicle guidance apparatus are engaged with track element 8 and track element 4, respectively, and a left vehicle guidance apparatus has a left bearing A1 that is engaged with track element 6 in guideway G5.

Figure 7:
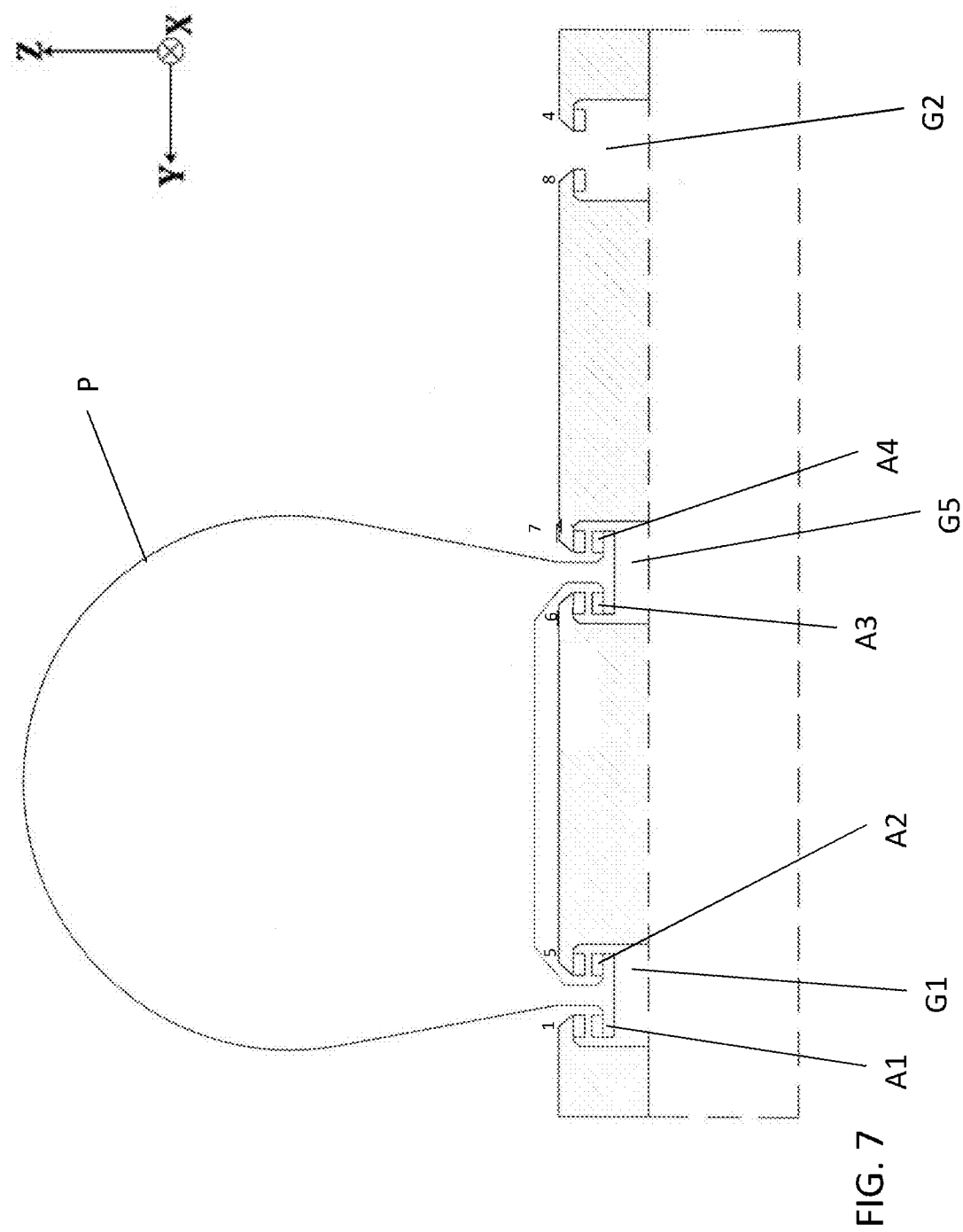
FIG. 7 shows an exemplary cross-sectional view at section 7 of FIG. 1 in accordance with aspects of the disclosure.

FIG. 7 shows an exemplary cross-sectional view at section 7 of FIG. 1 in accordance with aspects of the disclosure. FIG. 7 shows a cross section at section 7, wherein the pathways crossover. As shown in FIG. 7, at this section, the distance between track element 6 and track element 7 in guideway G5 decreases, until a crossover point is reached (see, e.g., FIG. 1). At the crossover point, the bearings A1, A2 of the left vehicle guidance apparatus are engaged with track element 1 and track element 5, and the bearings A3, A4 of the right vehicle guidance apparatus are engaged with track element 6 and track element 7. If a vehicle P is configured to follow a rightward divergent path, the bearings A3, A4 of the right guideway apparatus may be engaged with track element 4 and track element 8, while the bearings A1, A2 of the left guideway apparatus may be engaged with track element 6 and track element 7 of guideway G5. In contrast to the track topology of FIG. 1 which includes a crossover, as described with top-levitation track configurations (topologies) further below, in some embodiments (e.g., top-levitation track configurations) there is no cross-over point where the vehicle loses levitation on one set of skis of a bearing and then regains levitation on the other set of skis of a bearing.

Figure 8:
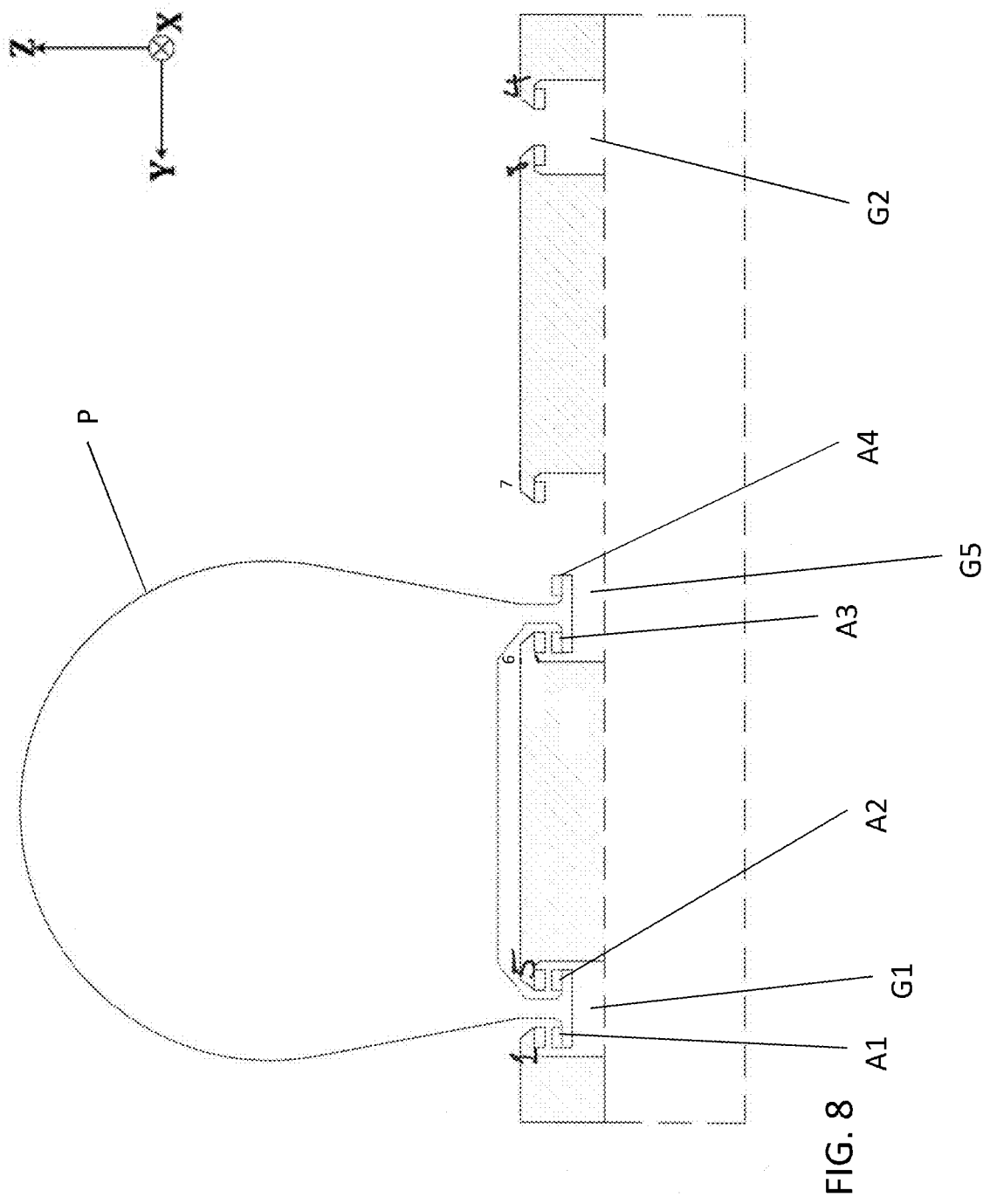
FIG. 8 shows an exemplary cross-sectional view at section 8 of FIG. 1 in accordance with aspects of the disclosure.

FIG. 8 shows an exemplary cross-sectional view at section 8 of FIG. 1 in accordance with aspects of the disclosure. FIG. 8 shows a cross section at section 8, wherein the width of the cross section increases, such that the distance between the first guideway G1 and the second guideway G2 increases, with a widening gap in guideway G5 between track element 6 and track element 7. As shown, if a vehicle P is configured to follow a leftward divergent path, the bearings A1, A2 of the left vehicle guidance apparatus are engaged with track element 1 and track element 5, and the right vehicle guidance apparatus has a left bearing A3 engaged with track element 6. If, on the other hand, a vehicle P is configured to follow the rightward divergent path (not shown), the bearings A3, A4, of the right vehicle guidance apparatus are engaged with track element 8 and track element 4, respectively, and a left vehicle guidance apparatus has a right bearing A2 engaged with track element 7.

Figure 9:
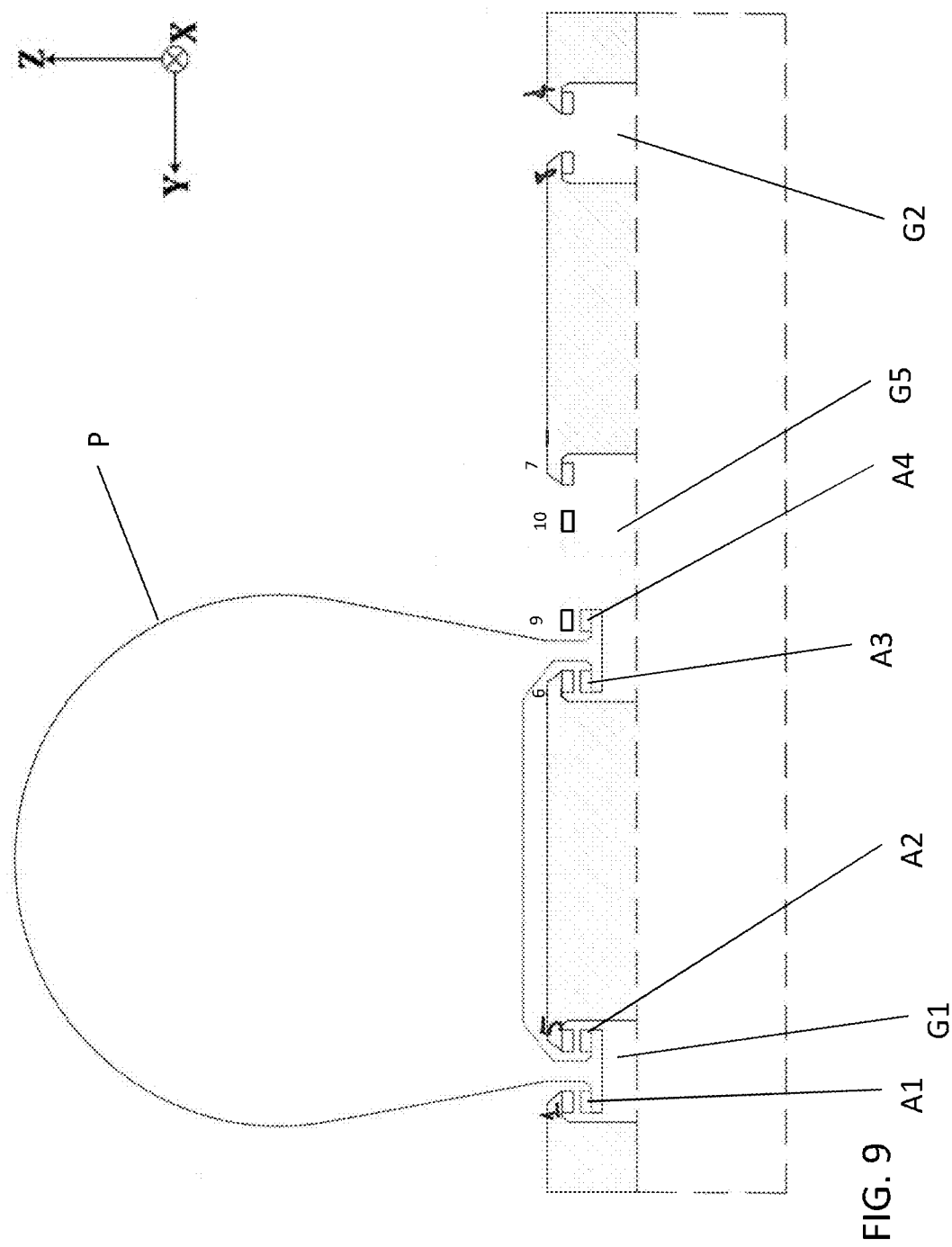
FIG. 9 shows an exemplary cross-sectional view at section 9 of FIG. 1 in accordance with aspects of the disclosure.

FIG. 9 shows an exemplary cross-sectional view at section 9 of FIG. 1 in accordance with aspects of the disclosure. As shown in FIG. 9, a supporting structure for track element 9 and track element 10 emerges. As shown, if a vehicle P is configured to follow the leftward divergent path, the bearings A1, A2 of the left vehicle guidance apparatus are engaged with track element 1 and track element 5, and a right vehicle guidance apparatus has a left bearing A3 engaged with track element 6 in guideway G5 and the right bearing A4 can begin to engage with track element 9. If the vehicle P is configured to follow the rightward divergent path (not shown), the bearings A3, A4 of the right vehicle guidance apparatus are engaged with track element 8 and track element 4, respectively, and a left vehicle guidance apparatus has a right bearing A2 engaged with track element 7 in guideway G5 and the left bearing A1 can begin to engage with track element 10.

Figure 10:
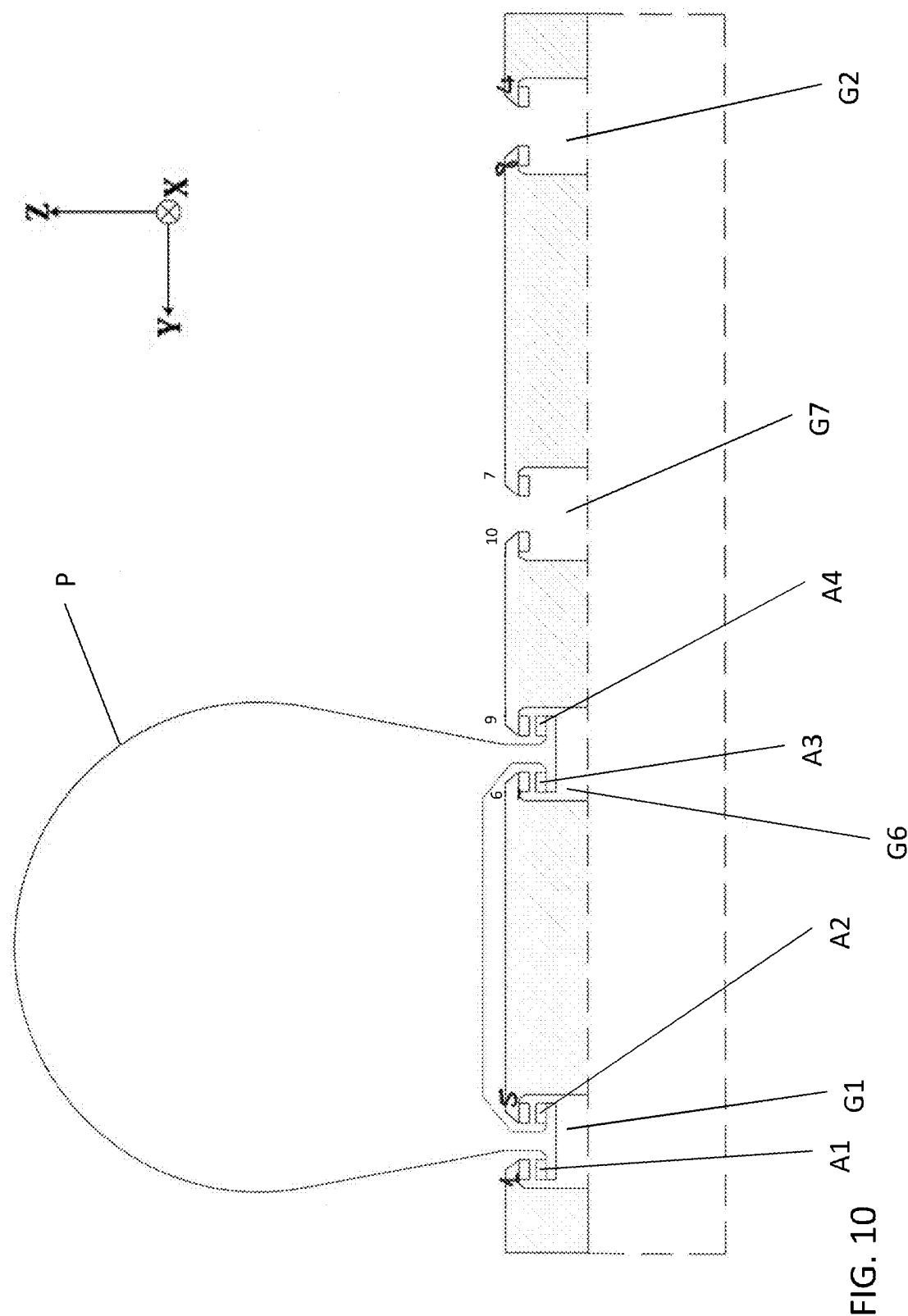
FIG. 10 shows an exemplary cross-sectional view at section 10 of FIG. 1 in accordance with aspects of the disclosure.

FIG. 10 shows an exemplary cross-sectional view at section 10 of FIG. 1 in accordance with aspects of the disclosure. As shown in FIG. 10, at section 10, track element 9 and track element 10 are present in guideways G6 and G7, respectively, and a distance between track element 9 in guideway G6 and track element 10 in guideway G7 is increased. As shown in FIG. 10, if a vehicle P is configured to follow the leftward divergent path, the bearings A1, A2, of the left vehicle guidance apparatus are engaged with track element 1 and track element 5, respectively, and a right vehicle guidance apparatus has a left bearing A3 engaged with track element 6 and the right bearing A4 engaged with track element 9. If a vehicle P is configured to follow the rightward divergent path (not shown), the bearings A3, A4 of the right vehicle guidance apparatus are engaged with track element 8 and track element 4, respectively, and a left vehicle guidance apparatus has a right bearing A2 engaged with track element 7 and the left bearing A1 engaged with track element 10.

Figure 11:
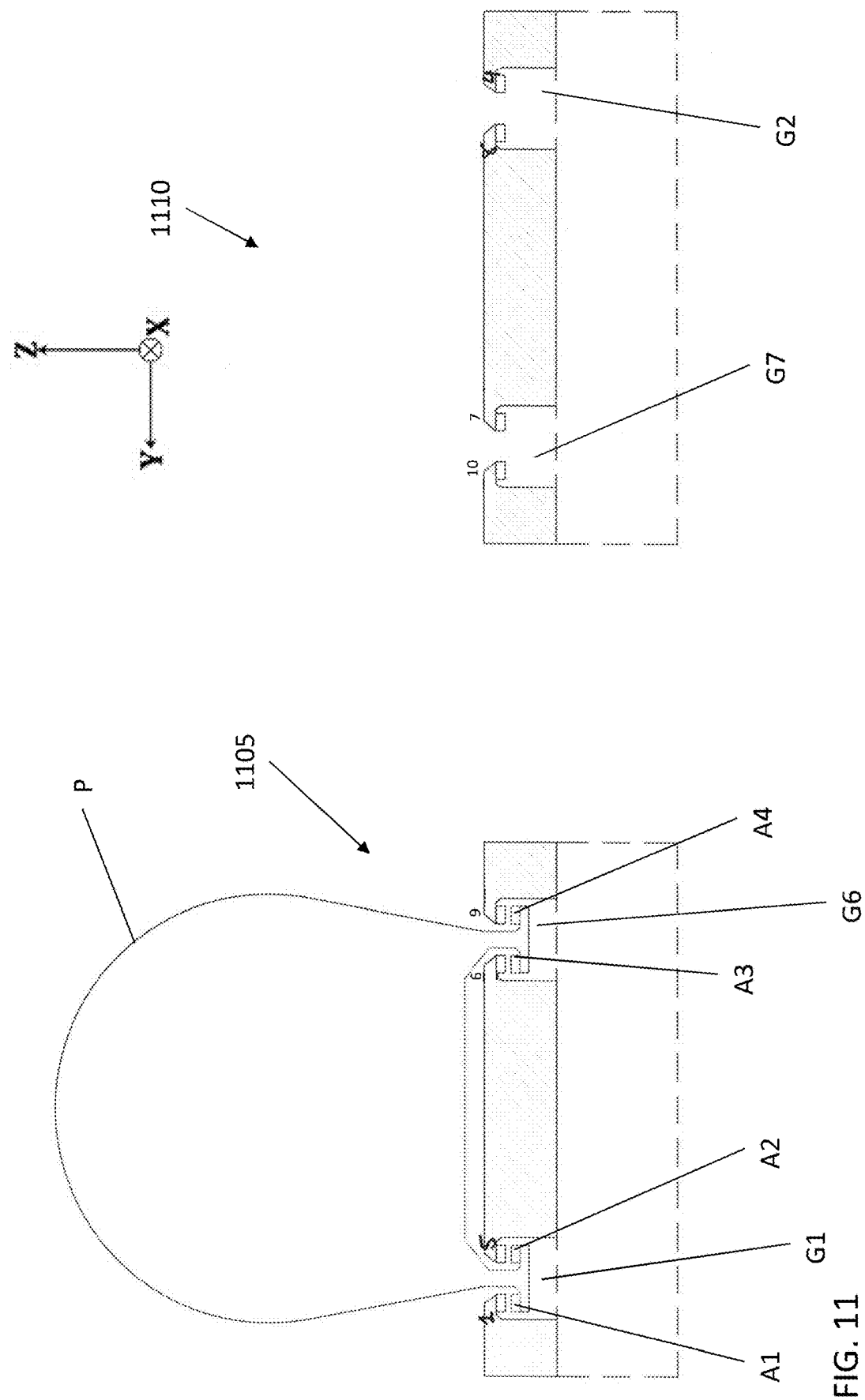
FIG. 11 shows an exemplary cross-sectional view at section 11 of FIG. 1 in accordance with aspects of the disclosure.

FIG. 11 shows an exemplary cross-sectional view at section 11 of FIG. 1 in accordance with aspects of the disclosure. FIG. 11 shows a cross section at segment 11, wherein the pathway is shown post-switch (or downstream of the "switch" or divergence). As shown in FIG. 11, the pathway at segment 11 includes a left pathway 1105 formed by guideways G1, G6 and a right pathway 1110 formed by guideways G7, G2, wherein each of the left pathway 1105 and the right pathway 1110 includes a configuration that is substantially similar to the configuration section 1 of FIG. 2, such that each of the left post-switch pathway segment 1105 and the right post-switch pathway segment 1110 could individually also be a starting segment for a further switching (e.g., divergence or convergence) system.

In an embodiment, the switching system may have passive steering such that the vehicle utilizing the switching system will default to switching to one direction, such as leftwardly, when passing through a switching event unless action is taken to switch to a second direction, such as rightwardly. For example, in such embodiments, when all bearings are engaged with tracks through all pathway segments, the vehicle will follow the left pathway. If the left bearing of each guidance assembly is disengaged from the left track of each guideway during the turning decision point, such as at the pre-switch segment, the vehicle will follow the right pathway.

Figure 12:
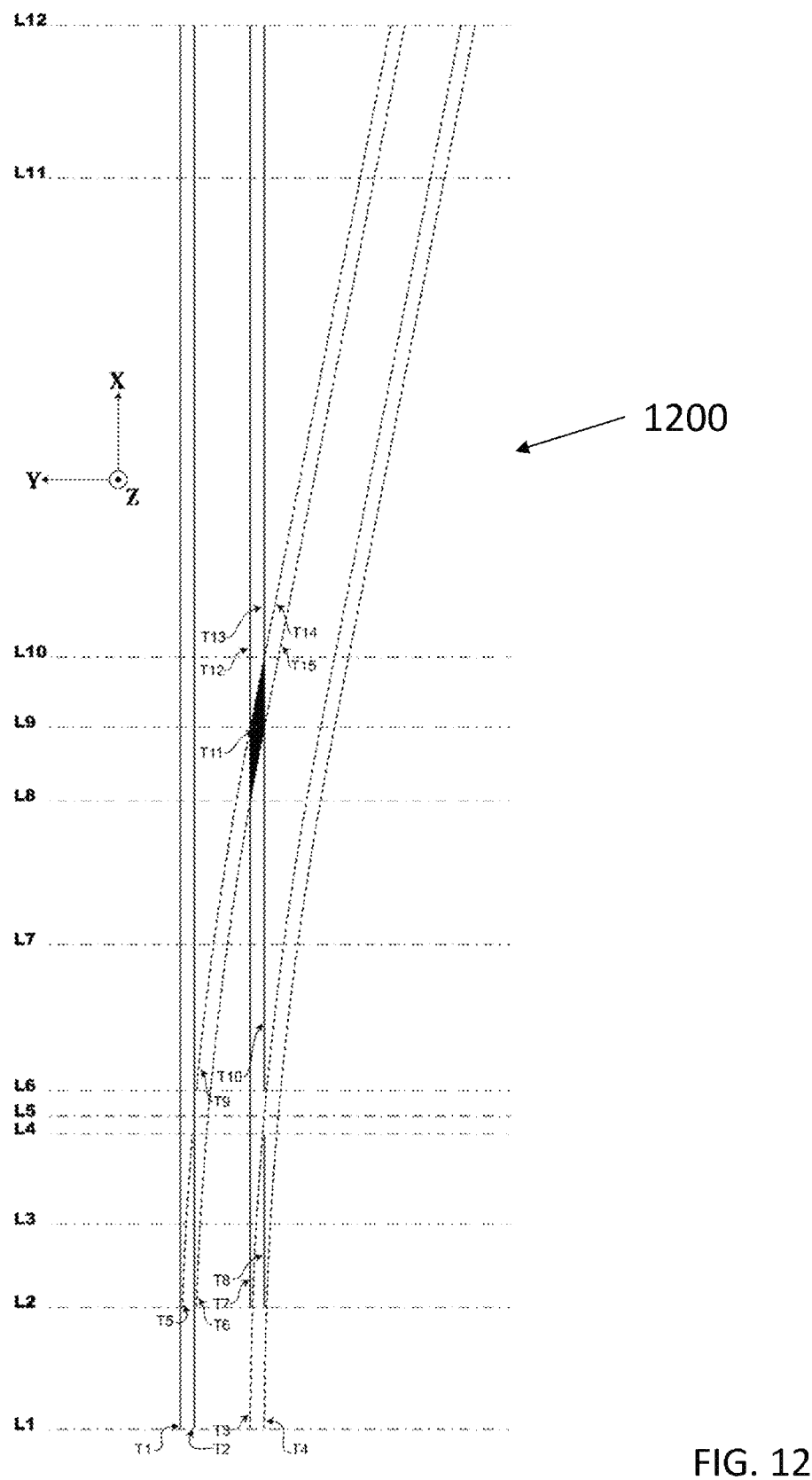
FIG. 12 shows an exemplary schematic illustration of an overview of a switching system for an exemplary track arrangement (or topology) with an overhead bearing surface having four combined out-of-plane and in-plane bearings in accordance with aspects of the disclosure.

FIG. 12 shows an exemplary schematic illustration of an overview of a switching system for an exemplary track arrangement (or topology) 1200 with an overhead bearing surface having four combined out-of-plane and in-plane bearings in accordance with aspects of the disclosure. As shown in FIG. 12, track arrangement 1200 includes track elements (T1-T15). With the exemplary embodiment, the assumed direction of travel is largely either in the positive X-direction or the negative X-direction. With the present disclosure, all descriptions for operation will be describing examples of operation in the positive X-direction, but as should be understood, all track topologies allow for bi-directional travel.

Figure 13:
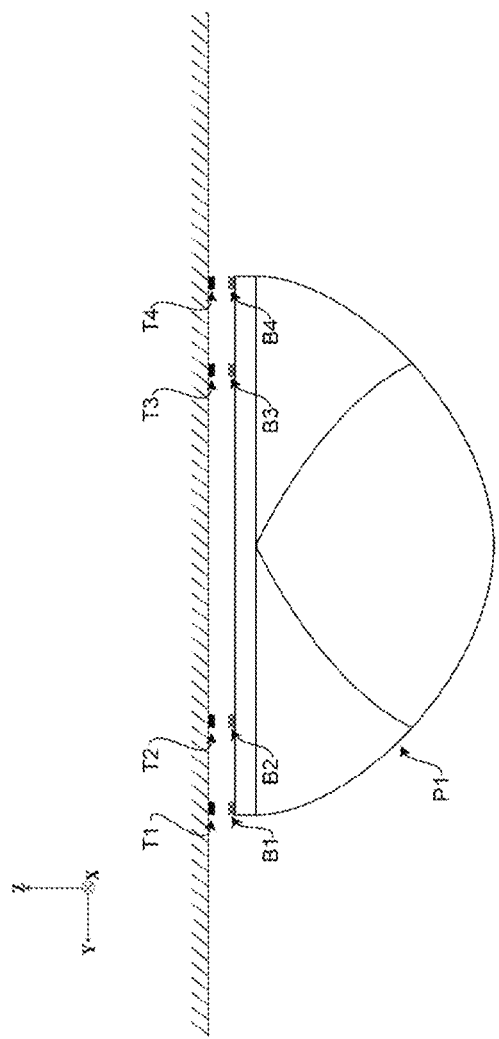
FIG. 13 shows an exemplary cross-sectional view at section L1 of FIG. 12 in accordance with aspects of the disclosure.

FIG. 13 shows an exemplary cross-sectional view at section L1 of the track arrangement (or topology) 1200 of FIG. 12 in accordance with aspects of the disclosure. That is, the exemplary and non-limiting embodiment of FIGS. 12-23 shows an overhung track topology having four rails largely on a single plane. As shown in FIG. 13, a vehicle (e.g., pod, capsule) P1 includes four bearings B1-B4 travelling in the largely X-direction. As noted above, each bearing is capable of providing an IN-PLANE (or Y-direction) and OUT-OF-PLANE (or Z-direction) force. An example of such a bearing configuration is disclosed in commonly-assigned U.S. Pat. No. 10,940,764, entitled "Augmented Permanent Magnet System," the entire contents of which are incorporated herein by reference. For example, FIGS. 12-16 of U.S. Pat. No. 10,940,764, entitled "Augmented Permanent Magnet System" teaches guidance control methods and systems for adjustable force distribution, which may be utilized to provide y-directed guidance forces (e.g., positive or negative y-directed forces) so as to guide a vehicle, e.g., towards a selected pathway of diverging pathways, for example, by offsetting the bearing (e.g., electromagnet) relative to the track. In embodiments, each track element is at least capable of providing reaction forces in the (YZ) plane on each bearing, as long as the bearings are within some region of interaction of the track element close to the track elements (which is not shown, as the spaced distances between the track elements and bearings are not to scale).

FIG. 13 shows the pod P1 at section L1 of the track arrangement (or topology) 1200 prior to a divergence in the path (as shown in FIG. 12) in accordance with aspects of the disclosure. As shown in FIG. 13, the LEFT primary force interactions (not limited to but providing the majority of the forces acting on bearings) are:

(B1) interacting with (T1) to provide Y- and Z-directed forces (providing guidance);

(B2) interacting with (T2) to provide Y- and Z-directed forces (providing guidance);

(B3) interacting with (T3) to provide at least Z-directed forces (providing reduced guidance); and (B4) interacting with (T4) to provide at least Z-directed forces (providing reduced guidance). In accordance with aspects of the disclosure, net guidance force from (B3 and B4) should be less than (B1 and B2).

As shown in FIG. 13, the RIGHT primary force interactions (not limited to but providing the majority of the forces acting on bearings) are:

(B1) interacting with (T1) to provide at least Z-directed forces (providing reduced guidance);

(B2) interacting with (T2) to provide at least Z-directed forces (providing reduced guidance);

(B3) interacting with (T3) to provide Y- and Z-directed forces (providing guidance); and (B4) interacting with (T4) to provide Y- and Z-directed forces (providing guidance).

In accordance with aspects of the disclosure, net guidance force from (B3 and B4) should be greater than (B1 and B2).

Figure 14:
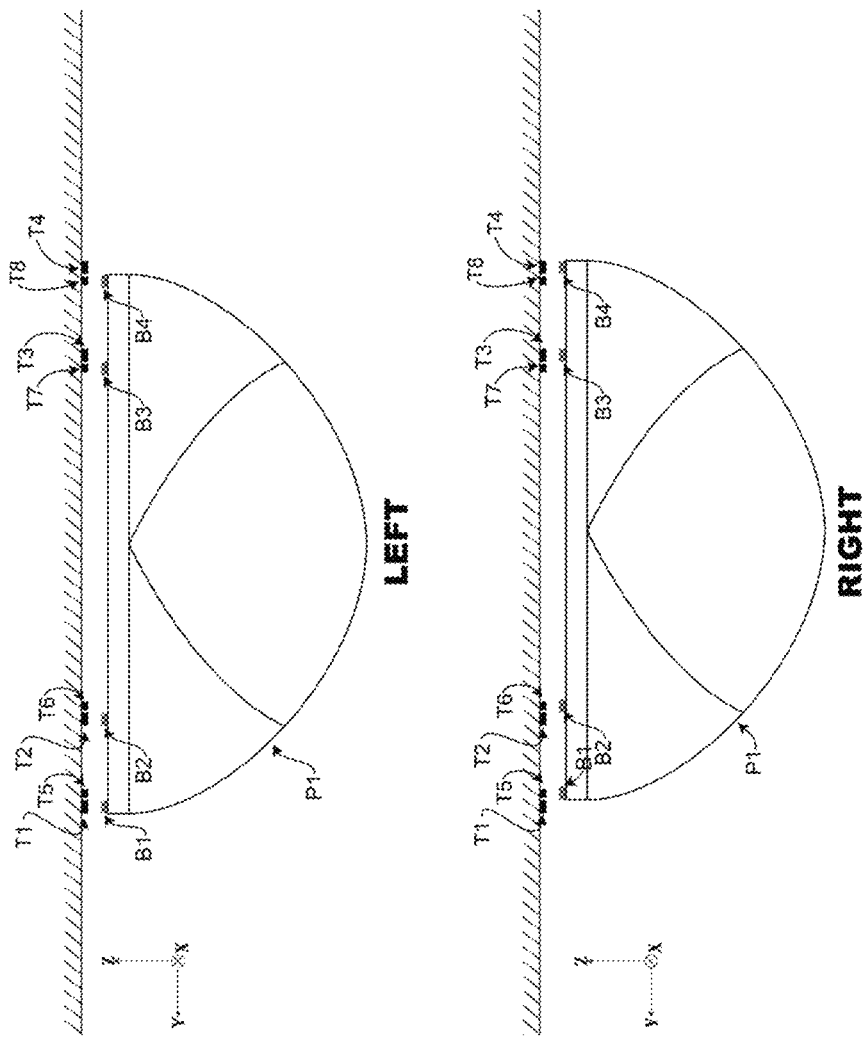
FIG. 14 shows an exemplary cross-sectional view at section L2 of FIG. 12 in accordance with aspects of the disclosure.

FIG. 14 shows an exemplary cross-sectional view at section L2 of the track arrangement (or topology) 1200 (as shown in FIG. 12) in accordance with aspects of the disclosure. As shown in FIG. 14, if the pod P1 is directed leftward, the LEFT primary force interactions (not limited to but providing the majority of the forces acting on bearings) are:

(B1) interacting with (T1) to provide Y- and Z-directed forces (providing guidance);

(B2) interacting with (T2) to provide Y- and Z-directed forces (providing guidance);

(B3) interacting with (T7) to provide at least Z-directed forces (providing reaction Y-directed forces as required); and (B4) interacting with (T8) to provide at least Z-directed forces (providing reaction Y-directed forces as required).

In accordance with aspects of the disclosure, net guidance force from (B3 and B4) should be less than (B1 and B2)

As shown in FIG. 14, if the pod P1 is directed rightward, the RIGHT primary force interactions (not limited to but providing the majority of the forces acting on bearings) are:

(B1) interacting with (T5) to provide at least Z-directed forces (providing reaction Y-directed forces as required);

(B2) interacting with (T6) to provide at least Z-directed forces (providing reaction Y-directed forces as required);

(B3) interacting with (T3) to provide Y- and Z-directed forces (providing guidance); and (B4) interacting with (T4) to provide Y- and Z-directed forces (providing guidance).

In accordance with aspects of the disclosure, net guidance force from (B3 and B4) should be greater than (B1 and B2)

Figure 15:
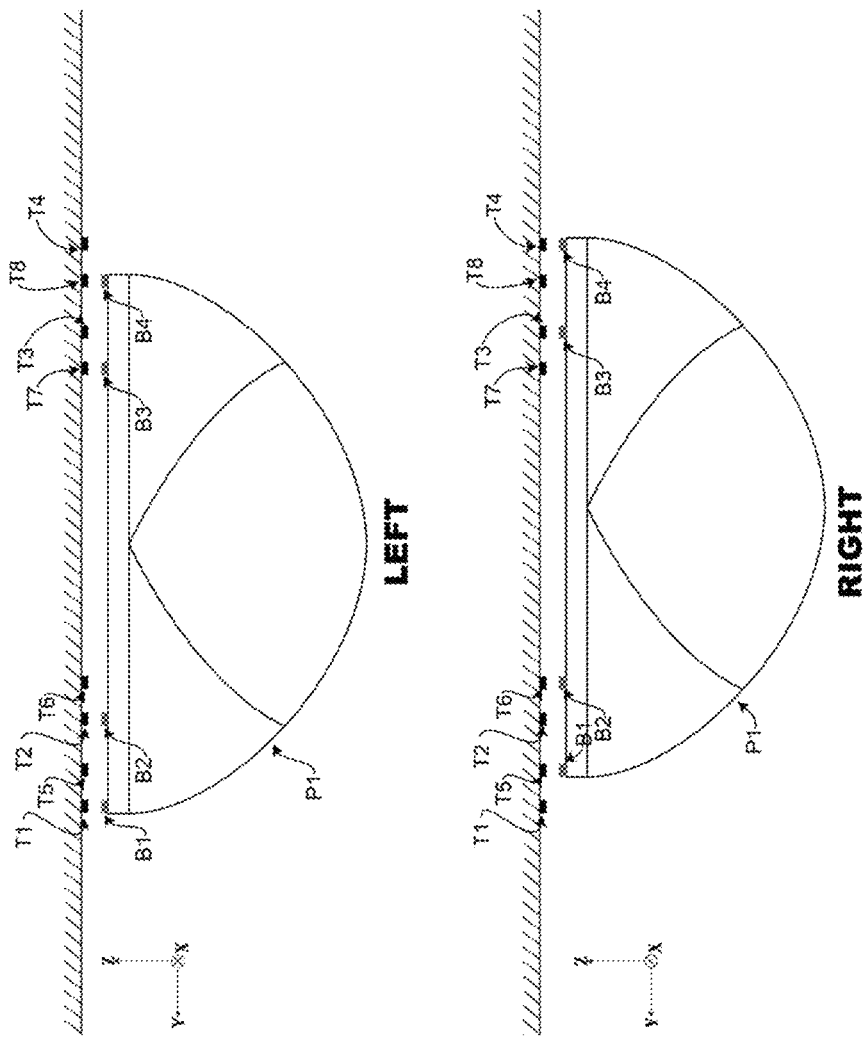
FIG. 15 shows an exemplary cross-sectional view at section L3 of FIG. 12 in accordance with aspects of the disclosure.

FIG. 15 shows an exemplary cross-sectional view at section L3 of the track arrangement (or topology) 1200 (as shown in FIG. 12) in accordance with aspects of the disclosure. As shown in FIG. 15, if the pod P1 is directed leftward, the LEFT primary force interactions (not limited to but providing the majority of the forces acting on bearings) are:

(B1) interacting with (T1) to provide Y- and Z-directed forces (providing guidance);

(B2) interacting with (T2) to provide Y- and Z-directed forces (providing guidance);

(B3) interacting with (T7) to provide at least Z-directed forces (providing reaction Y-directed forces as required); and (B4) interacting with (T8) to provide at least Z-directed forces (providing reaction Y-directed forces as required)

In accordance with aspects of the disclosure, net guidance force from (B3 and B4) should be less than (B1 and B2).

As shown in FIG. 15, if the pod P1 is directed rightward, the RIGHT primary force interactions (not limited to but providing the majority of the forces acting on bearings) are:

(B1) interacting with (T5) to provide at least Z-directed forces (providing reaction Y-directed forces as required);

(B2) interacting with (T6) to provide at least Z-directed forces (providing reaction Y-directed forces as required);

(B3) interacting with (T3) to provide Y- and Z-directed forces (providing guidance); and (B4) interacting with (T4) to provide Y- and Z-directed forces (providing guidance).

In accordance with aspects of the disclosure, net guidance force from (B3 and B4) should be greater than (B1 and B2).

Figure 16:
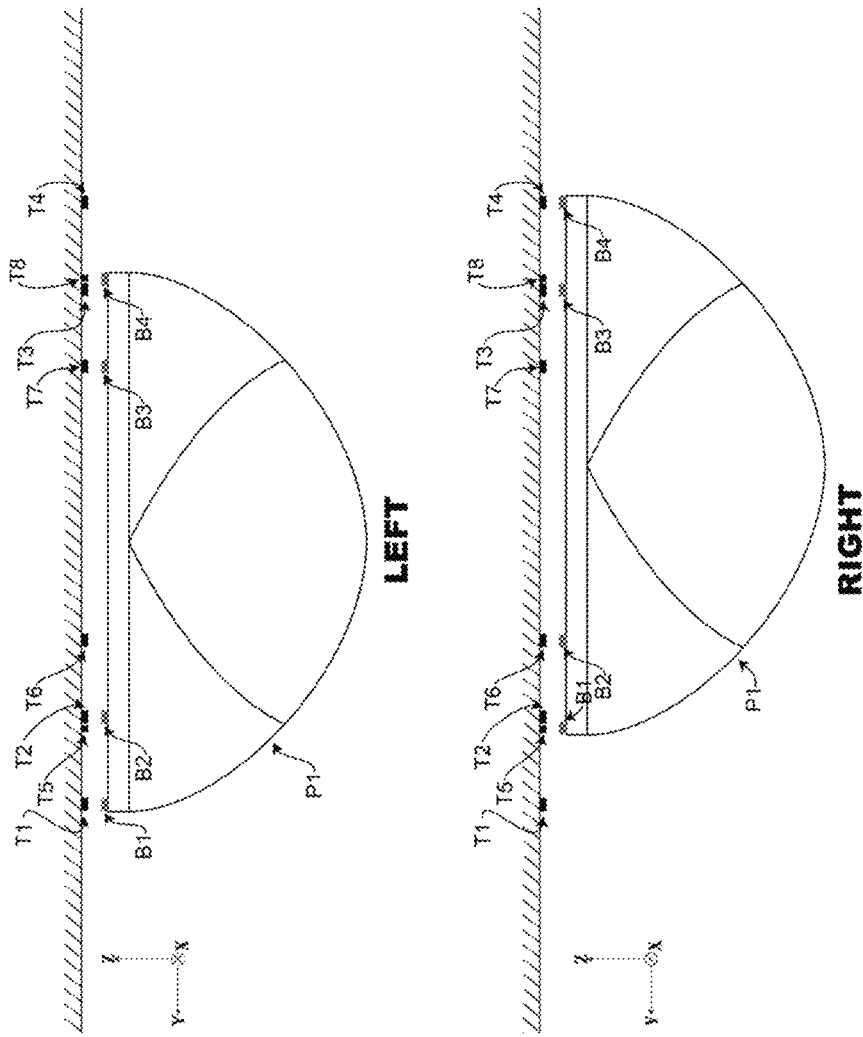
FIG. 16 shows an exemplary cross-sectional view at section L4 of FIG. 12 in accordance with aspects of the disclosure.

FIG. 16 shows an exemplary cross-sectional view at section L4 of the track arrangement (or topology) 1200 (as shown in FIG. 12) in accordance with aspects of the disclosure. As shown in FIG. 16, if the pod P1 is directed leftward, the LEFT primary force interactions (not limited to but providing the majority of the forces acting on bearings) are:

(B1) interacting with (T1) to provide Y- and Z-directed forces (providing guidance);

(B2) interacting with (T2) to provide Y- and Z-directed forces (providing guidance);

(B3) interacting with (T7) to provide at least Z-directed forces (providing reaction Y-directed forces as required); and (B4) interacting with (T8) to provide at least Z-directed forces (providing reaction Y-directed forces as required).

In accordance with aspects of the disclosure, net guidance force from (B3 and B4) should be less than (B1 and B2).

As shown in FIG. 16, if the pod P1 is directed rightward, the RIGHT primary force interactions (not limited to but providing the majority of the forces acting on bearings) are:

(B1) interacting with (T5) to provide at least Z-directed forces (providing reaction Y-directed forces as required);

(B2) interacting with (T6) to provide at least Z-directed forces (providing reaction Y-directed forces as required);

(B3) interacting with (T3) to provide Y- and Z-directed forces (providing guidance); and (B4) interacting with (T4) to provide Y- and Z-directed forces (providing guidance).

In accordance with aspects of the disclosure, net guidance force from (B3 and B4) should be greater than (B1 and B2).

Figure 17:
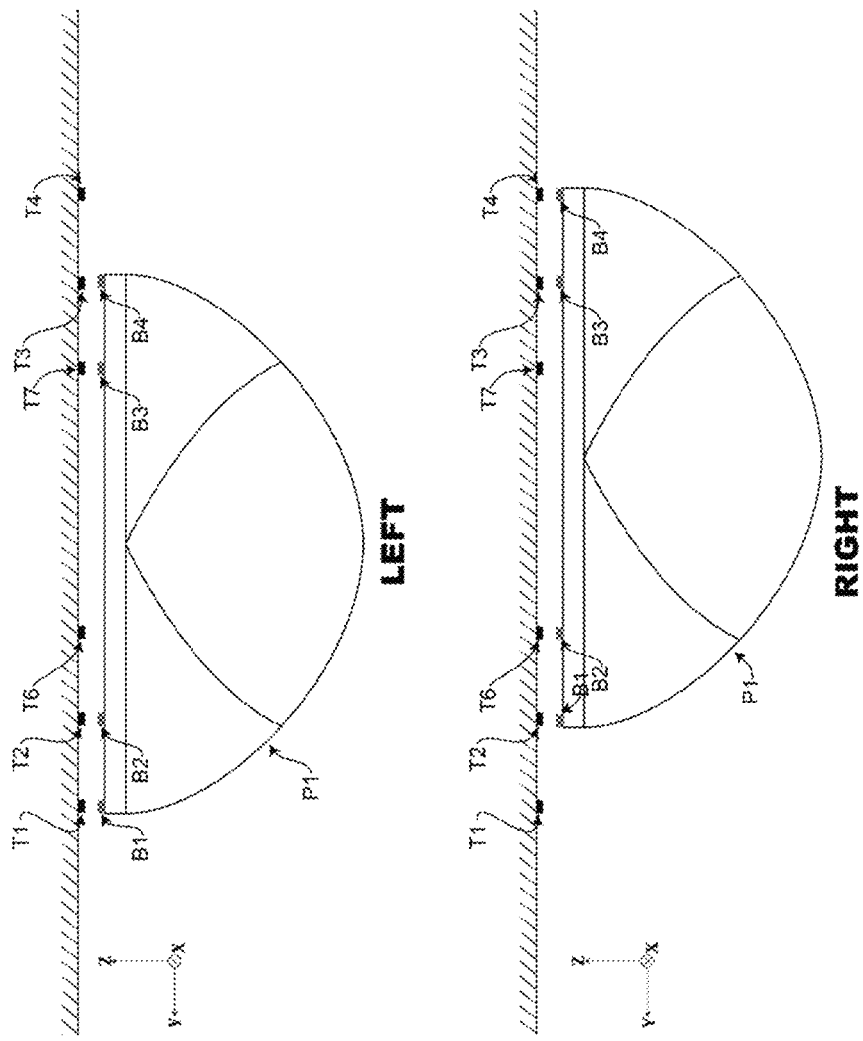
FIG. 17 shows an exemplary cross-sectional view at section L5 of FIG. 12 in accordance with aspects of the disclosure.

FIG. 17 shows an exemplary cross-sectional view at section L5 of the track arrangement (or topology) 1200 (as shown in FIG. 12) in accordance with aspects of the disclosure. As shown in FIG. 17, if the pod P1 is directed leftward, the LEFT primary force interactions (not limited to but providing the majority of the forces acting on bearings) are:

(B1) interacting with (T1) to provide Y- and Z-directed forces (providing guidance);

(B2) interacting with (T2) to provide Y- and Z-directed forces (providing guidance);

(B3) interacting with (T7) to provide at least Z-directed forces (providing reaction Y-directed forces as required); and (B4) interacting with (T3) to provide at least Z-directed forces (providing reaction Y-directed forces as required).

In accordance with aspects of the disclosure, net guidance force from (B3 and B4) should be less than (B1 and B2).

As shown in FIG. 17, if the pod P1 is directed rightward, the RIGHT primary force interactions (not limited to but providing the majority of the forces acting on bearings) are:

(B1) interacting with (T2) to provide at least Z-directed forces (providing reaction Y-directed forces as required);

(B2) interacting with (T6) to provide at least Z-directed forces (providing reaction Y-directed forces as required);

(B3) interacting with (T3) to provide Y- and Z-directed forces (providing guidance); and (B4) interacting with (T4) to provide Y- and Z-directed forces (providing guidance).

In accordance with aspects of the disclosure, net guidance force from (B3 and B4) should be greater than (B1 and B2).

Figure 18:
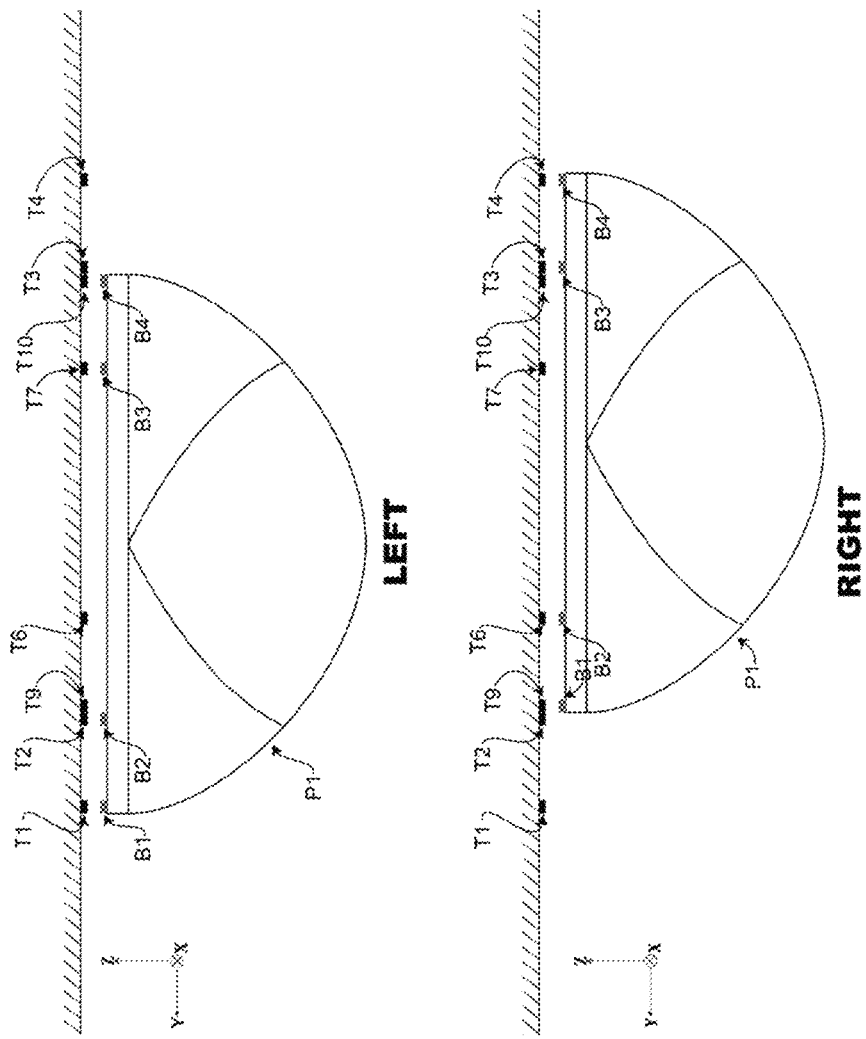
FIG. 18 shows an exemplary cross-sectional view at section L6 of FIG. 12 in accordance with aspects of the disclosure.

FIG. 18 shows an exemplary cross-sectional view at section L6 of the track arrangement (or topology) 1200 (as shown in FIG. 12) in accordance with aspects of the disclosure. As shown in FIG. 18, if the pod P1 is directed leftward, the LEFT primary force interactions (not limited to but providing the majority of the forces acting on bearings) are:

(B1) interacting with (T1) to provide Y- and Z-directed forces (providing guidance);

(B2) interacting with (T2) to provide Y- and Z-directed forces (providing guidance);

(B3) interacting with (T7) to provide at least Z-directed forces (providing reaction Y-directed forces as required); and (B4) interacting with (T10) to provide at least Z-directed forces (providing reaction Y-directed forces as required).

In accordance with aspects of the disclosure, net guidance force from (B3 and B4) should be less than (B1 and B2).

As shown in FIG. 18, if the pod P1 is directed rightward, the RIGHT primary force interactions (not limited to but providing the majority of the forces acting on bearings) are:

(B1) interacting with (T9) to provide at least Z-directed forces (providing reaction Y-directed forces as required);

(B2) interacting with (T6) to provide at least Z-directed forces (providing reaction Y-directed forces as required);

(B3) interacting with (T3) to provide Y- and Z-directed forces (providing guidance); and (B4) interacting with (T4) to provide Y- and Z-directed forces (providing guidance).

In accordance with aspects of the disclosure, net guidance force from (B3 and B4) should be greater than (B1 and B2).

Figure 19:
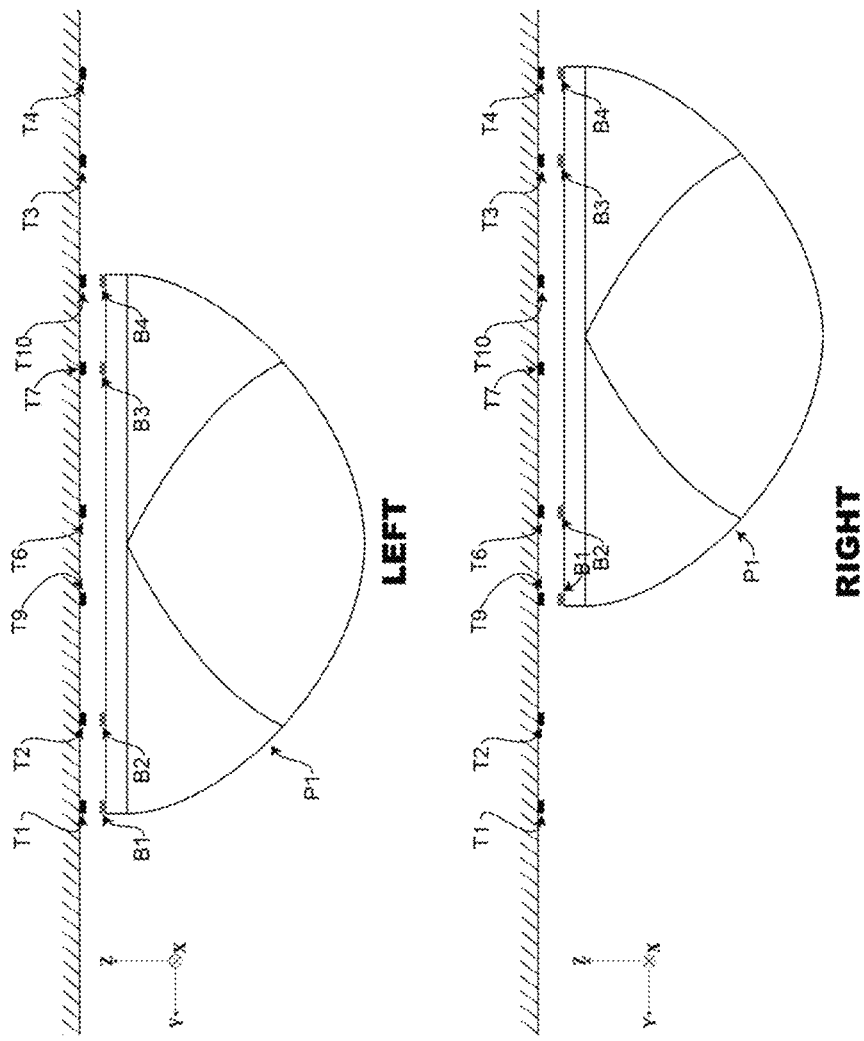
FIG. 19 shows an exemplary cross-sectional view at section L7 of FIG. 12 in accordance with aspects of the disclosure.

FIG. 19 shows an exemplary cross-sectional view at section L7 of the track arrangement (or topology) 1200 (as shown in FIG. 12) in accordance with aspects of the disclosure. As shown in FIG. 19, if the pod P1 is directed leftward, the LEFT primary force interactions (not limited to but providing the majority of the forces acting on bearings) are:

(B1) interacting with (T1) to provide Y- and Z-directed forces (providing guidance);

(B2) interacting with (T2) to provide Y- and Z-directed forces (providing guidance);

(B3) interacting with (T7) to provide at least Z-directed forces (providing reaction Y-directed forces as required); and (B4) interacting with (T10) to provide at least Z-directed forces (providing reaction Y-directed forces as required).

In accordance with aspects of the disclosure, net guidance force from (B3 and B4) should be less than (B1 and B2).

As shown in FIG. 19, if the pod P1 is directed rightward, the RIGHT primary force interactions (not limited to but providing the majority of the forces acting on bearings) are:

(B1) interacting with (T9) to provide at least Z-directed forces (providing reaction Y-directed forces as required);

(B2) interacting with (T6) to provide at least Z-directed forces (providing reaction Y-directed forces as required);

(B3) interacting with (T3) to provide Y- and Z-directed forces (providing guidance); and (B4) interacting with (T4) to provide Y- and Z-directed forces (providing guidance).

In accordance with aspects of the disclosure, net guidance force from (B3 and B4) should be greater than (B1 and B2).

Figure 20:
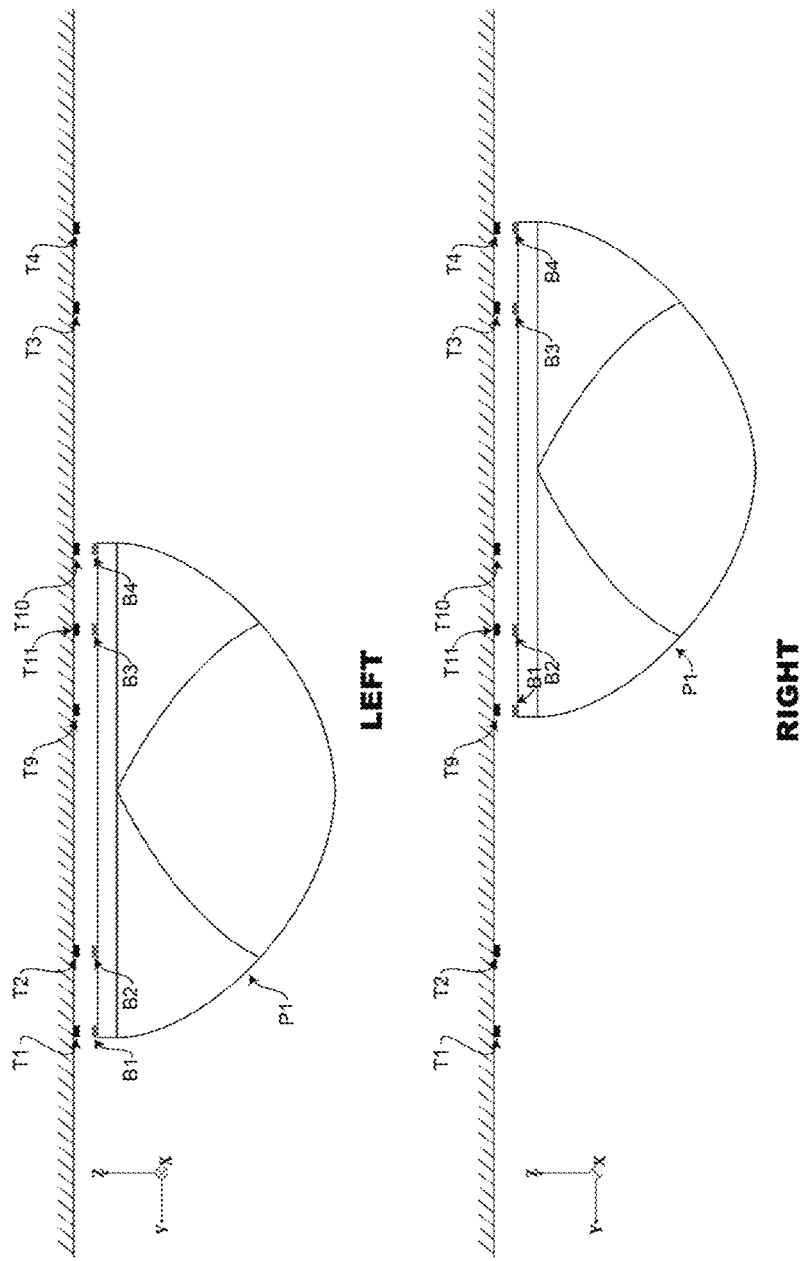
FIG. 20 shows an exemplary cross-sectional view at section L8 of FIG. 12 in accordance with aspects of the disclosure.

FIG. 20 shows an exemplary cross-sectional view at section L8 of the track arrangement (or topology) 1200 (as shown in FIG. 12) in accordance with aspects of the disclosure. As shown in FIG. 20, if the pod P1 is directed leftward, the LEFT primary force interactions (not limited to but providing the majority of the forces acting on bearings) are:

(B1) interacting with (T1) to provide Y- and Z-directed forces (providing guidance);

(B2) interacting with (T2) to provide Y- and Z-directed forces (providing guidance);

(B3) interacting with (T11) to provide at least Z-directed forces (providing reaction Y-directed forces as required); and (B4) interacting with (T10) to provide at least Z-directed forces (providing reaction Y-directed forces as required).

In accordance with aspects of the disclosure, net guidance force from (B3 and B4) should be less than (B1 and B2).

As shown in FIG. 20, if the pod P1 is directed rightward, the RIGHT primary force interactions (not limited to but providing the majority of the forces acting on bearings) are:

(B1) interacting with (T9) to provide at least Z-directed forces (providing reaction Y-directed forces as required);

(B2) interacting with (T11) to provide at least Z-directed forces (providing reaction Y-directed forces as required);

(B3) interacting with (T3) to provide Y- and Z-directed forces (providing guidance); and (B4) interacting with (T4) to provide Y- and Z-directed forces (providing guidance).

In accordance with aspects of the disclosure, net guidance force from (B3 and B4) should be greater than (B1 and B2).

Figure 21:
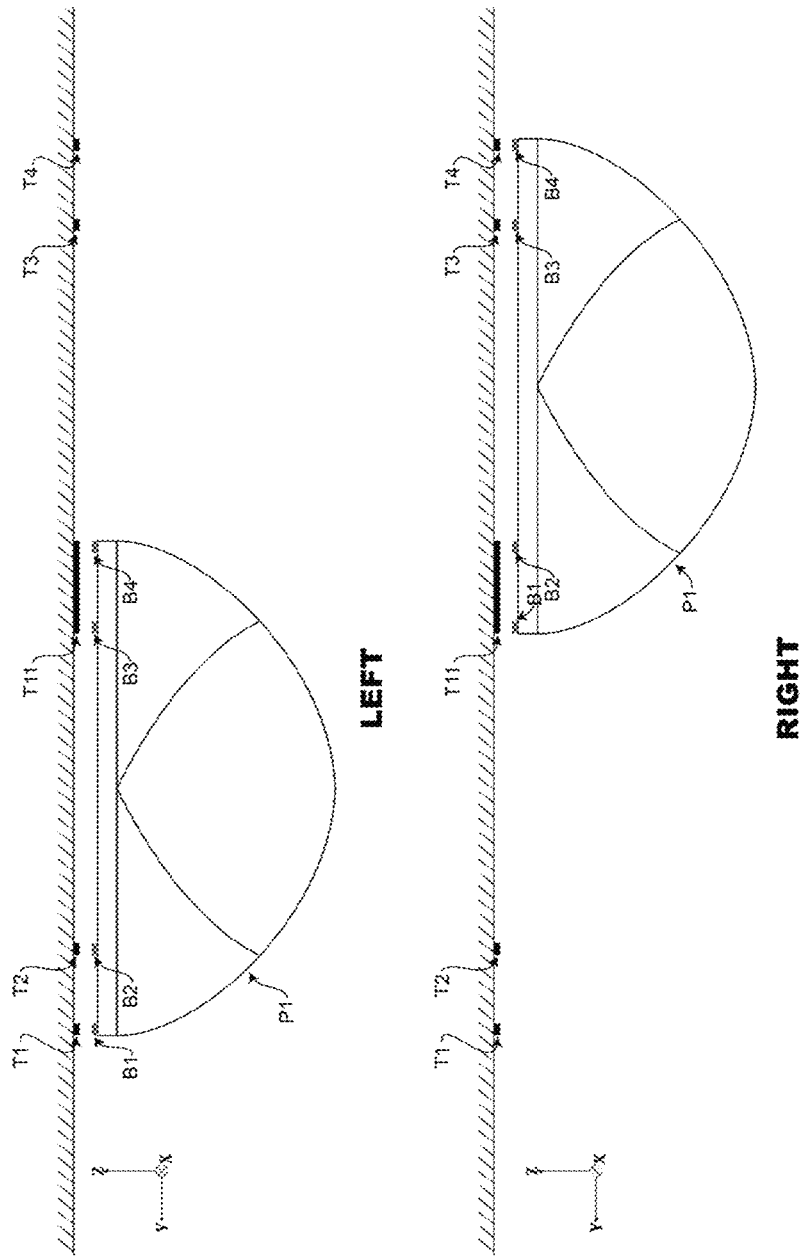
FIG. 21 shows an exemplary cross-sectional view at section L9 of FIG. 12 in accordance with aspects of the disclosure.

FIG. 21 shows an exemplary cross-sectional view at section L9 of the track arrangement (or topology) 1200 (as shown in FIG. 12) in accordance with aspects of the disclosure. As shown in FIG. 21, if the pod P1 is directed leftward, the LEFT primary force interactions (not limited to but providing the majority of the forces acting on bearings) are:

(B1) interacting with (T1) to provide Y- and Z-directed forces (providing guidance);

(B2) interacting with (T2) to provide Y- and Z-directed forces (providing guidance);

(B3) interacting with (T11) to provide at least Z-directed forces (providing reaction Y-directed forces as required; and (B4) interacting with (T11) to provide at least Z-directed forces (providing reaction Y-directed forces as required).

In accordance with aspects of the disclosure, net guidance force from (B3 and B4) should be less than (B1 and B2).

As shown in FIG. 21, if the pod P1 is directed rightward, the RIGHT primary force interactions (not limited to but providing the majority of the forces acting on bearings) are:

(B1) interacting with (T11) to provide at least Z-directed forces (providing reaction Y-directed forces as required);

(B2) interacting with (T11) to provide at least Z-directed forces (providing reaction Y-directed forces as required);

(B3) interacting with (T3) to provide Y- and Z-directed forces (providing guidance); and (B4) interacting with (T4) to provide Y- and Z-directed forces (providing guidance).

In accordance with aspects of the disclosure, net guidance force from (B3 and B4) should be greater than (B1 and B2).

Figure 22:
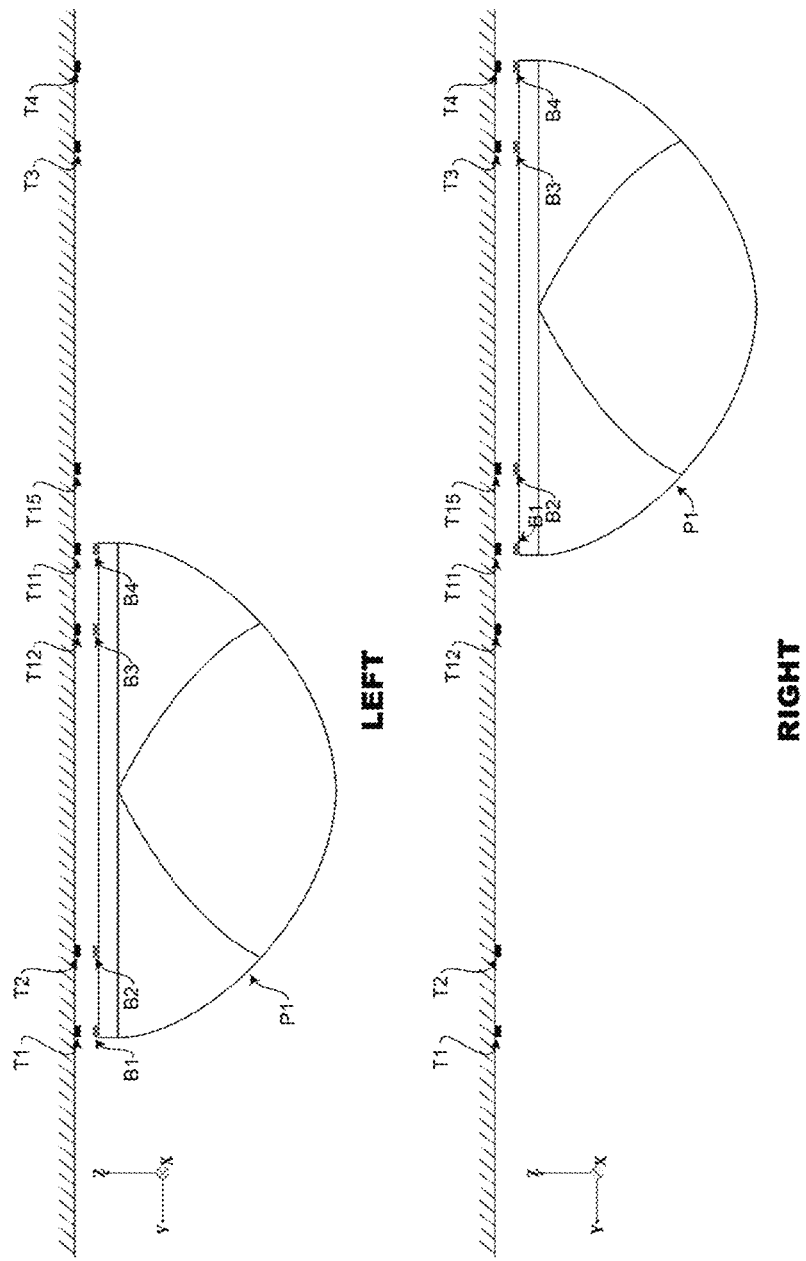
FIG. 22 shows an exemplary cross-sectional view at section L10 in of FIG. 12 accordance with aspects of the disclosure.

FIG. 22 shows an exemplary cross-sectional view at section L10 of the track arrangement (or topology) 1200 (as shown in FIG. 12) in accordance with aspects of the disclosure. As shown in FIG. 22, if the pod P1 is directed leftward, the LEFT primary force interactions (not limited to but providing the majority of the forces acting on bearings) are:

(B1) interacting with (T1) to provide Y- and Z-directed forces (providing guidance);

(B2) interacting with (T2) to provide Y- and Z-directed forces (providing guidance);

(B3) interacting with (T12) to provide at least Z-directed forces (providing reaction Y-directed forces as required); and (B4) interacting with (T11) to provide at least Z-directed forces (providing reaction Y-directed forces as required).

In accordance with aspects of the disclosure, net guidance force from (B3 and B4) should be less than (B1 and B2).

As shown in FIG. 22, if the pod P1 is directed rightward, the RIGHT primary force interactions (not limited to but providing the majority of the forces acting on bearings) are:

(B1) interacting with (T11) to provide at least Z-directed forces (providing reaction Y-directed forces as required);

(B2) interacting with (T15) to provide at least Z-directed forces (providing reaction Y-directed forces as required);

(B3) interacting with (T3) to provide Y- and Z-directed forces (providing guidance); and (B4) interacting with (T4) to provide Y- and Z-directed forces (providing guidance).

In accordance with aspects of the disclosure, net guidance force from (B3 and B4) should be greater than (B1 and B2).

Figure 23:
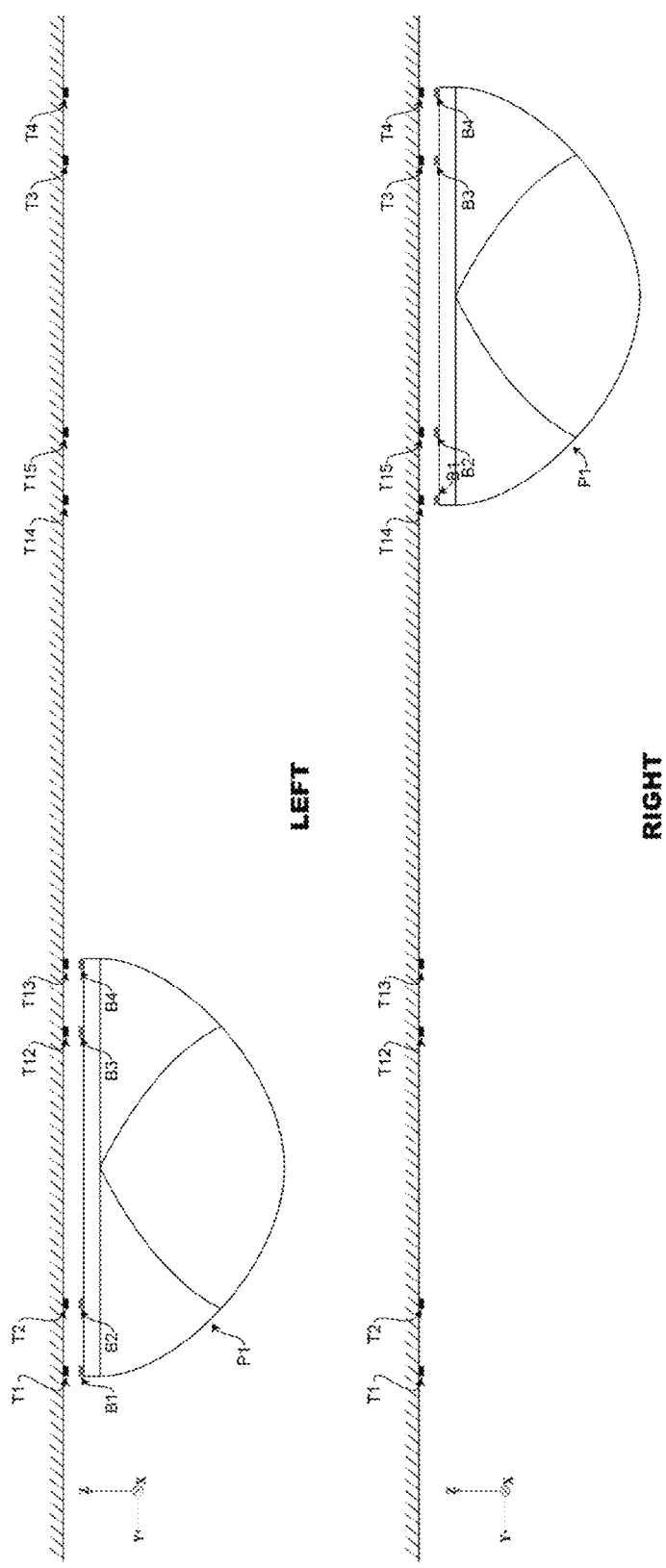
FIG. 23 shows an exemplary cross-sectional view at section L11 of FIG. 12 in accordance with aspects of the disclosure.

FIG. 23 shows an exemplary cross-sectional view at section L11 of the track arrangement (or topology) 1200 (as shown in FIG. 12) in accordance with aspects of the disclosure. As shown in FIG. 23, if the pod P1 is directed leftward, the LEFT primary force interactions (not limited to but providing the majority of the forces acting on bearings) are:

(B1) interacting with (T1) to provide Y- and Z-directed forces;

(B2) interacting with (T2) to provide Y- and Z-directed forces;

(B3) interacting with (T12) to provide Y- and Z-directed forces; and (B4) interacting with (T13) to provide Y- and Z-directed forces.

At this point along the path of travel downstream of the divergence, operation of the pod P1 is nominal (e.g., a cruise configuration is established where required forces are distributed as required among all four bearings).

As shown in FIG. 23, if the pod P1 is directed rightward, the RIGHT primary force interactions (not limited to but providing the majority of the forces acting on bearings) are:

(B1) interacting with (T14) to provide Y- and Z-directed forces;

(B2) interacting with (T15) to provide Y- and Z-directed forces;

(B3) interacting with (T3) to provide Y- and Z-directed forces; and (B4) interacting with (T4) to provide Y- and Z-directed forces.

At this point along the path of travel downstream of the divergence, operation of the pod P1 is nominal (e.g., a cruise configuration is established where required forces are distributed as required among all four bearings).

Figure 24:
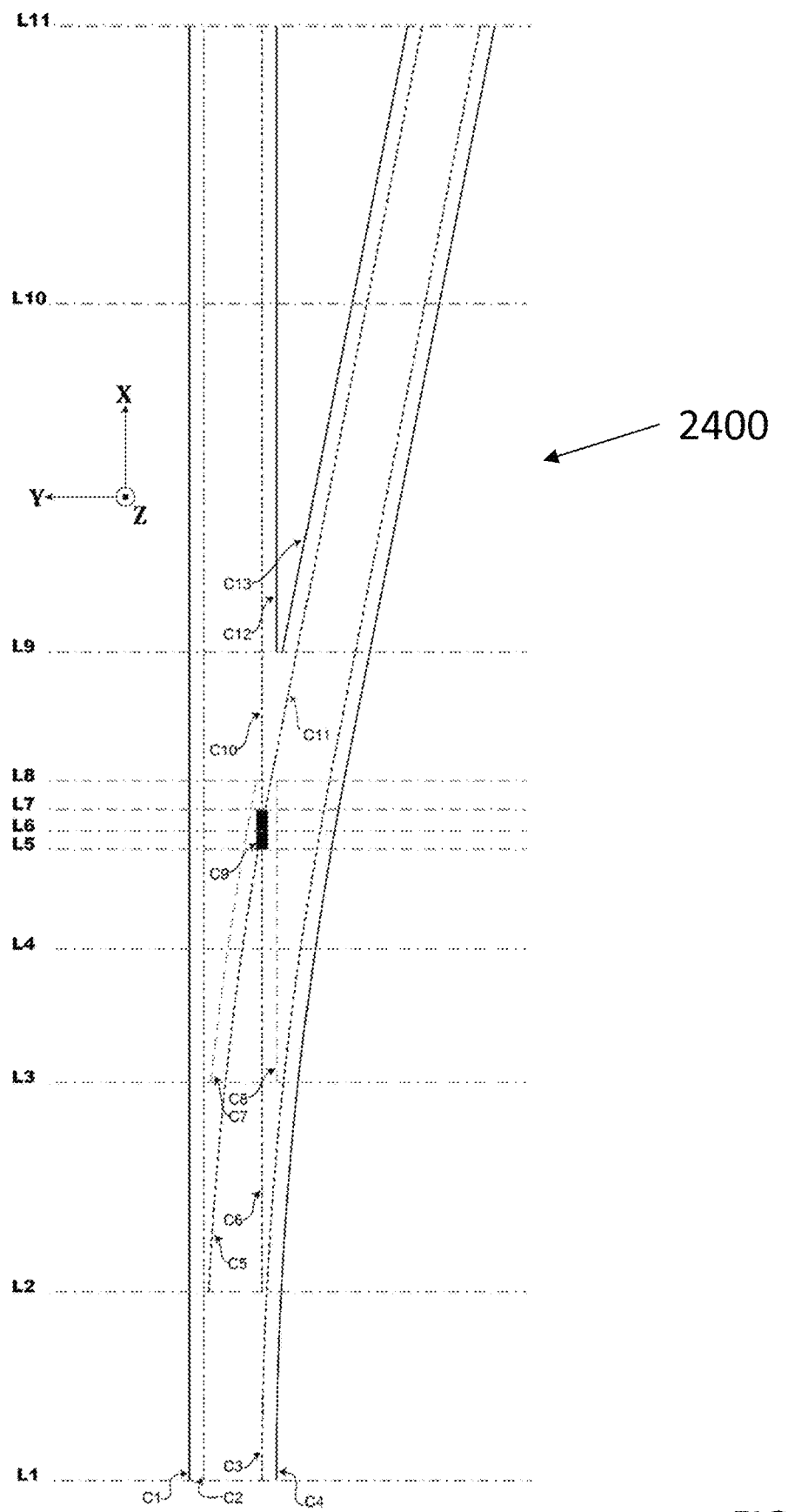
FIG. 24 shows an exemplary schematic illustration of an overview of a switching system for an exemplary track arrangement (or topology) with an overhead bearing surface with two out-of-plane bearings and two in-plane bearings in accordance with aspects of the disclosure.

FIG. 24 shows an exemplary schematic illustration of an overview of a switching system for an exemplary track arrangement (or topology) 2400 with an overhead bearing surface with two out-of-plane bearings and two in-plane bearings in accordance with aspects of the disclosure. As shown in FIG. 24, track arrangement 1200 includes track elements (C1-C13). With the exemplary embodiment, the assumed direction of travel is largely either in the positive X-direction or the negative X-direction. With the present disclosure, all descriptions for operation will be describing examples of operation in the positive X-direction, but as should be understood, all track topologies allow for bi-directional travel.

Figure 25:
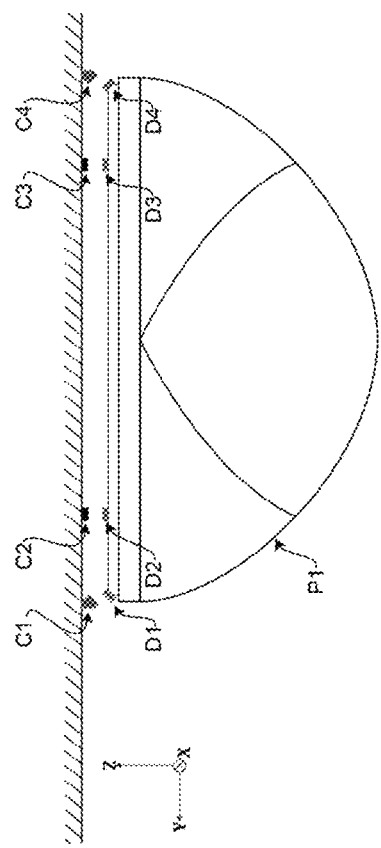
FIG. 25 shows an exemplary cross-sectional view at section L1 of FIG. 24 in accordance with aspects of the disclosure.

FIG. 25 shows an exemplary cross-sectional view at section L1 of the track arrangement (or topology) 2400 of FIG. 24 in accordance with aspects of the disclosure. That is, the exemplary and non-limiting embodiment of FIGS. 24-34 shows an overhung track topology having four rails largely on a single plane, which utilizes a different switching control method than the embodiment of FIGS. 12-23, as described below. As shown in FIG. 25, a vehicle (e.g., pod, capsule) P1 includes four bearings D1-D4 travelling in the largely X-direction. Each bearing is capable of providing an IN-PLANE (or Y-direction) and OUT-OF-PLANE (or Z-direction) force. An example of such a bearing configuration is disclosed in commonly-assigned U.S. Pat. No. 10,940,764, entitled "Augmented Permanent Magnet System," the entire contents of which are incorporated herein by reference. For example, FIGS. 12-16 of U.S. Pat. No. 10,940,764, entitled "Augmented Permanent Magnet System" teaches guidance control methods and systems for adjustable force distribution, which may be utilized to provide y-directed guidance forces (e.g., positive or negative y-directed forces) so as to guide a vehicle, e.g., towards a selected pathway of diverging pathways, for example, by offsetting the bearing (e.g., electromagnet) relative to the track. In embodiments, each track element is at least capable of providing reaction forces in the (YZ) plane on each hearing, as long as the bearings are within some region of interaction of the track element, e.g., close to the track elements (which is not shown, as the spaced distances between the track elements and bearings are not to scale).

FIG. 25 shows the pod P1 at section L1 of the track arrangement (or topology) 2400 prior to a divergence in the path (as shown in FIG. 24) in accordance with aspects of the disclosure. As shown in FIG. 25, the LEFT primary force interactions (not limited to but providing the majority of the forces acting on bearings) are:

(D1) interacting with (C1) to provide Y- and Z-directed forces (providing guidance);

(D2) interacting with (C2) to provide at least Z-directed forces (providing reaction Y-directed forces as required);

(D3) interacting with (C3) to provide at least Z-directed forces (providing reaction Y-directed forces as required); and (D4) interacting with (C4) to provide reduced guidance force such that D1/C1 guidance is larger than D4/C4 guidance.

As shown in FIG. 25, the RIGHT primary force interactions (not limited to but providing the majority of the forces acting on bearings) are:

(D1) interacting with (C1) to provide reduced guidance force such that D1/C1 guidance is smaller than D4/C4 guidance;

(D2) interacting with (C2) to provide at least Z-directed forces (providing reaction Y-directed forces as required);

(D3) interacting with (C3) to provide at least Z-directed forces (providing reaction Y-directed forces as required); and (D4) interacting with (C4) to provide Y- and Z-directed forces (providing guidance).

Figure 26:
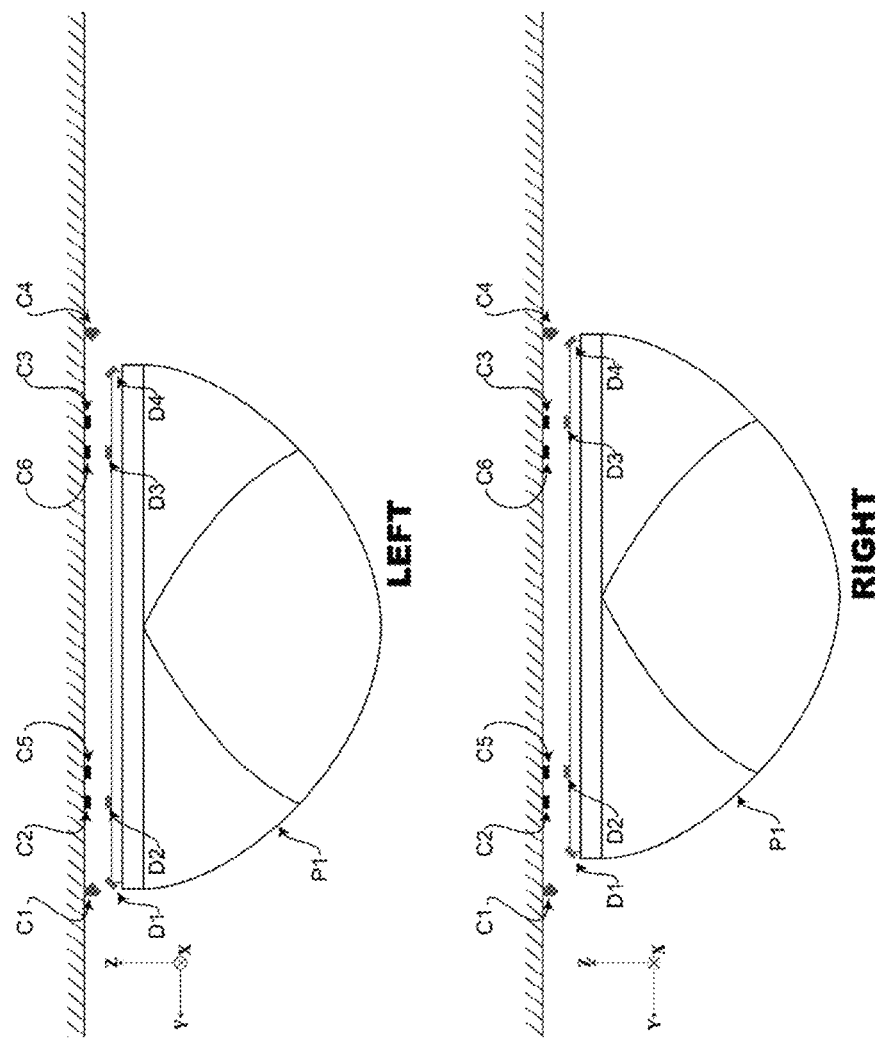
FIG. 26 shows an exemplary cross-sectional view at section L2 of FIG. 24 in accordance with aspects of the disclosure.

FIG. 26 shows an exemplary cross-sectional view at section L2 of the track arrangement (or topology) 2400 (as shown in FIG. 24) in accordance with aspects of the disclosure. As shown in FIG. 26, if the pod P1 is directed leftward, the LEFT primary force interactions (not limited to but providing the majority of the forces acting on bearings) are:

(D1) interacting with (C1) to provide Y- and Z-directed forces (providing guidance);

(D2) interacting with (C2) to provide at least Z-directed forces (providing reaction Y-directed forces as required);

(D3) interacting with (C6) to provide at least Z-directed forces (providing reaction Y-directed forces as required); and (D4) interacting with (NOTHING) to provide zero force.

As shown in FIG. 26, if the pod P1 is directed rightward, the RIGHT primary force interactions (not limited to but providing the majority of the forces acting on bearings) are:

(D1) interacting with (NOTHING) to provide zero force;

(D2) interacting with (C5) to provide at least Z-directed forces (providing reaction Y-directed forces as required);

(D3) interacting with (C3) to provide at least Z-directed forces (providing reaction Y-directed forces as required); and (D4) interacting with (C4) to provide Y- and Z-directed forces (providing guidance).

Figure 27:
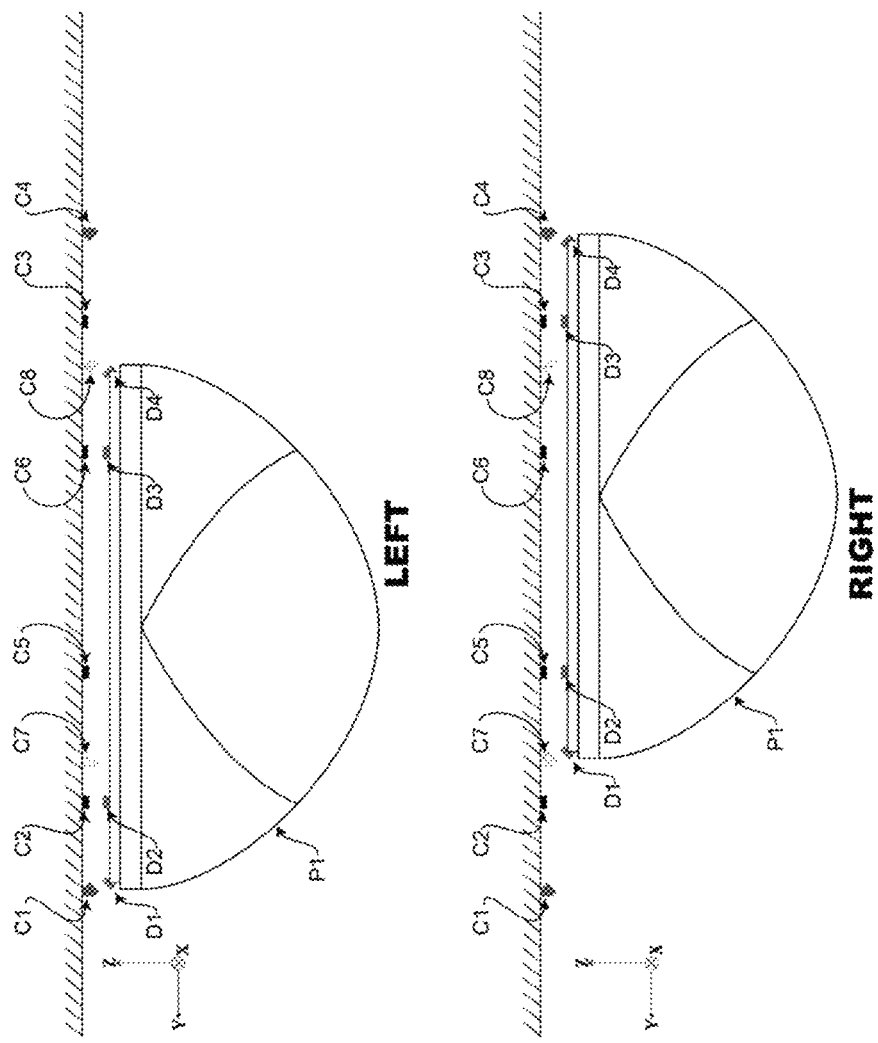
FIG. 27 shows an exemplary cross-sectional view at section L3 of FIG. 24 in accordance with aspects of the disclosure.

FIG. 27 shows an exemplary cross-sectional view at section L3 of the track arrangement (or topology) 2400 (as shown in FIG. 24) in accordance with aspects of the disclosure. As shown in FIG. 27, if the pod P1 is directed leftward, the LEFT primary force interactions (not limited to but providing the majority of the forces acting on bearings) are:

(D1) interacting with (Cl) to provide Y- and Z-directed forces (providing guidance)

(D2) interacting with (C2) to provide at least Z-directed forces (providing reaction Y-directed forces as required)

(D3) interacting with (C6) to provide at least Z-directed forces (providing reaction Y-directed forces as required)

(D4) interacting with (C8) to provide Y- and Z-directed forces (providing guidance); it should be understood, however, that this track element (C8) is optional and not necessary for operation but may be utilized, for example, to provide additional capacity.

As shown in FIG. 27, if the pod P1 is directed rightward, the RIGHT primary force interactions (not limited to but providing the majority of the forces acting on bearings) are:

(D1) interacting with (C7) to provide Y- and Z-directed forces (providing guidance); it should be understood, however, that this track element (C7) is optional and not necessary for operation but may be utilized, for example, to provide additional capacity;

(D2) interacting with (C5) to provide at least Z-directed forces (providing reaction Y-directed forces as required);

(D3) interacting with (C3) to provide at least Z-directed forces (providing reaction Y-directed forces as required); and (D4) interacting with (C4) to provide Y- and Z-directed forces (providing guidance)

Figure 28:
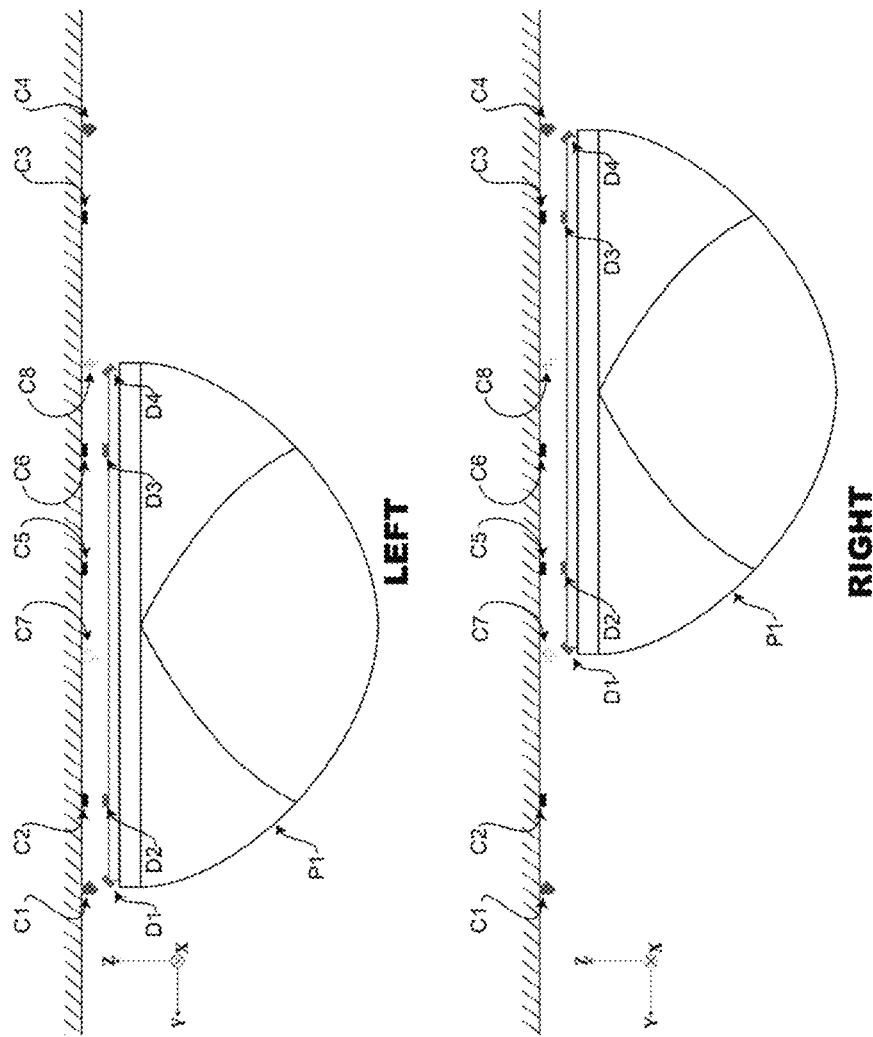
FIG. 28 shows an exemplary cross-sectional view at section L4 of FIG. 24 in accordance with aspects of the disclosure.

FIG. 28 shows an exemplary cross-sectional view at section L4 of the track arrangement (or topology) 2400 (as shown in FIG. 24) in accordance with aspects of the disclosure. As shown in FIG. 28, if the pod P1 is directed leftward, the LEFT primary force interactions (not limited to but providing the majority of the forces acting on bearings) are:

(D1) interacting with (Cl) to provide Y- and Z-directed forces (providing guidance)

(D2) interacting with (C2) to provide at least Z-directed forces (providing reaction Y-directed forces as required)

(D3) interacting with (C6) to provide at least Z-directed forces (providing reaction Y-directed forces as required)

(D4) interacting with (C8) to provide Y- and Z-directed forces (providing guidance); it should be understood, however, that this track element (C8) is optional and not necessary for operation but may be utilized, for example, to provide additional capacity.

As shown in FIG. 28, if the pod P1 is directed rightward, the RIGHT primary force interactions (not limited to but providing the majority of the forces acting on bearings) are:

(D1) interacting with (C7) to provide Y- and Z-directed forces (providing guidance); it should be understood, however, that this track element (C7) is optional and not necessary for operation but may be utilized, for example, to provide additional capacity;

(D2) interacting with (C5) to provide at least Z-directed forces (providing reaction Y-directed forces as required);

(D3) interacting with (C3) to provide at least Z-directed forces (providing reaction Y-directed forces as required); and (D4) interacting with (C4) to provide Y- and Z-directed forces (providing guidance).

Figure 29:
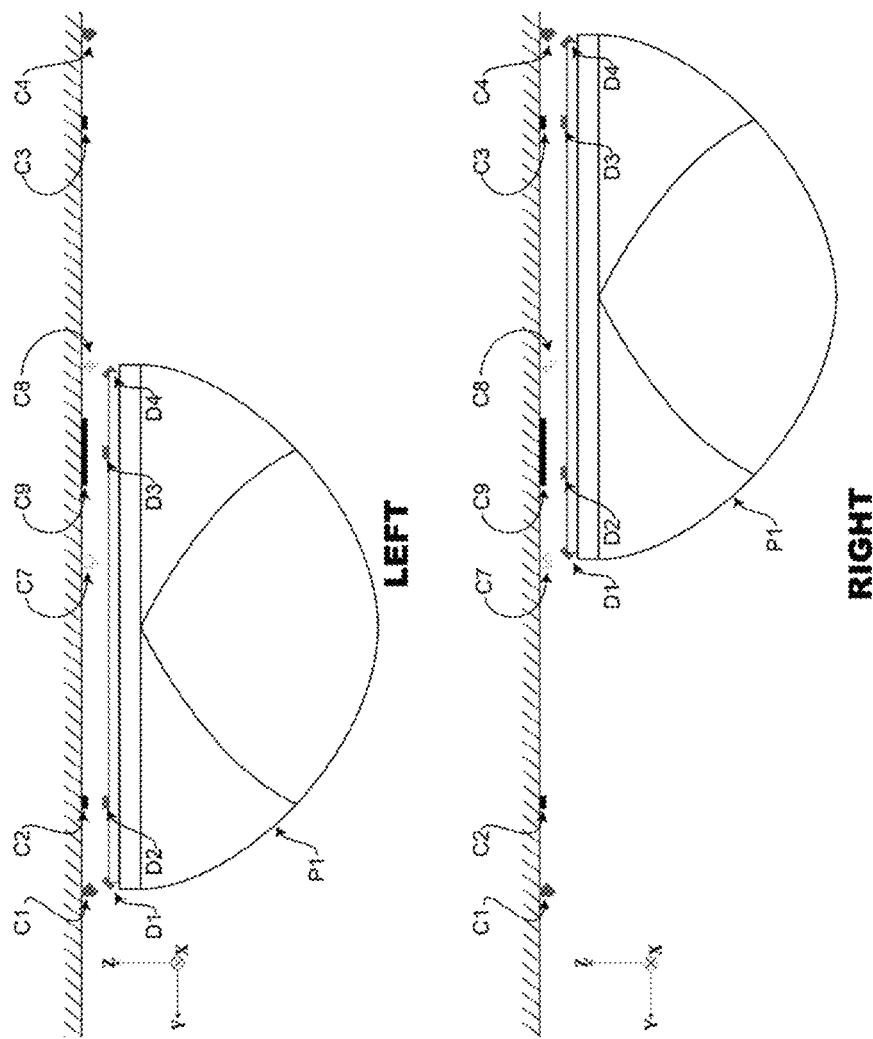
FIG. 29 shows an exemplary cross-sectional view at section L5 of FIG. 24 in accordance with aspects of the disclosure.

FIG. 29 shows an exemplary cross-sectional view at section L5 of the track arrangement (or topology) 2400 (as shown in FIG. 24) in accordance with aspects of the disclosure. As shown in FIG. 29, if the pod P1 is directed leftward, the LEFT primary force interactions (not limited to but providing the majority of the forces acting on bearings) are:

(D1) interacting with (C1) to provide Y- and Z-directed forces (providing guidance);

(D2) interacting with (C2) to provide at least Z-directed forces (providing reaction Y-directed forces as required);

(D3) interacting with (C9) to provide at least Z-directed forces (providing reaction Y-directed forces as required); and (D4) interacting with (C8) to provide Y- and Z-directed forces (providing guidance); it should be understood, however, that this track element (C8) is optional and not necessary for operation but may be utilized, for example, to provide additional capacity.

As shown in FIG. 29, if the pod P1 is directed rightward, the RIGHT primary force interactions (not limited to but providing the majority of the forces acting on bearings) are:

(D1) interacting with (C7) to provide Y- and Z-directed forces (providing guidance); it should be understood, however, that this track element (C7) is optional and not necessary for operation but may be utilized, for example, to provide additional capacity;

(D2) interacting with (C9) to provide at least Z-directed forces (providing reaction Y-directed forces as required);

(D3) interacting with (C3) to provide at least Z-directed forces (providing reaction Y-directed forces as required); and (D4) interacting with (C4) to provide Y- and Z-directed forces (providing guidance)

Figure 30:
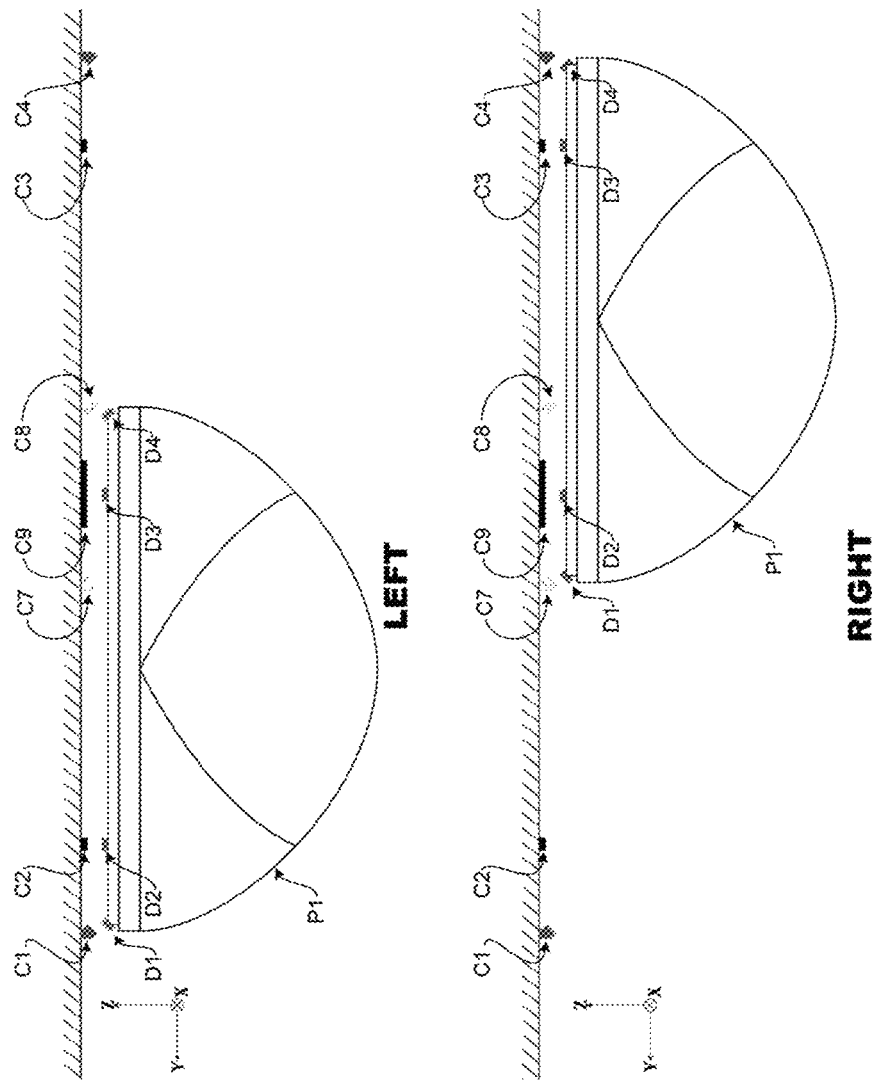
FIG. 30 shows an exemplary cross-sectional view at section L6 of FIG. 24 in accordance with aspects of the disclosure.

FIG. 30 shows an exemplary cross-sectional view at section L6 of the track arrangement (or topology) 2400 (as shown in FIG. 24) in accordance with aspects of the disclosure. As shown in FIG. 30, if the pod P1 is directed leftward, the LEFT primary force interactions (not limited to but providing the majority of the forces acting on bearings) are:

(D1) interacting with (C1) to provide Y- and Z-directed forces (providing guidance);

(D2) interacting with (C2) to provide at least Z-directed forces (providing reaction Y-directed forces as required);

(D3) interacting with (C9) to provide at least Z-directed forces (providing reaction Y-directed forces as required); and (D4) interacting with (C8) to provide Y- and Z-directed forces (providing guidance); it should be understood, however, that this track element (C8) is optional and not necessary for operation but may be utilized, for example, to provide additional capacity.

As shown in FIG. 30, if the pod P1 is directed rightward, the RIGHT primary force interactions (not limited to but providing the majority of the forces acting on bearings) are:

(D1) interacting with (C7) to provide Y- and Z-directed forces (providing guidance); it should be understood, however, that this track element (C7) is optional and not necessary for operation but may be utilized, for example, to provide additional capacity;

(D2) interacting with (C9) to provide at least Z-directed forces (providing reaction Y-directed forces as required);

(D3) interacting with (C3) to provide at least Z-directed forces (providing reaction Y-directed forces as required); and (D4) interacting with (C4) to provide Y- and Z-directed forces (providing guidance).

Figure 31:
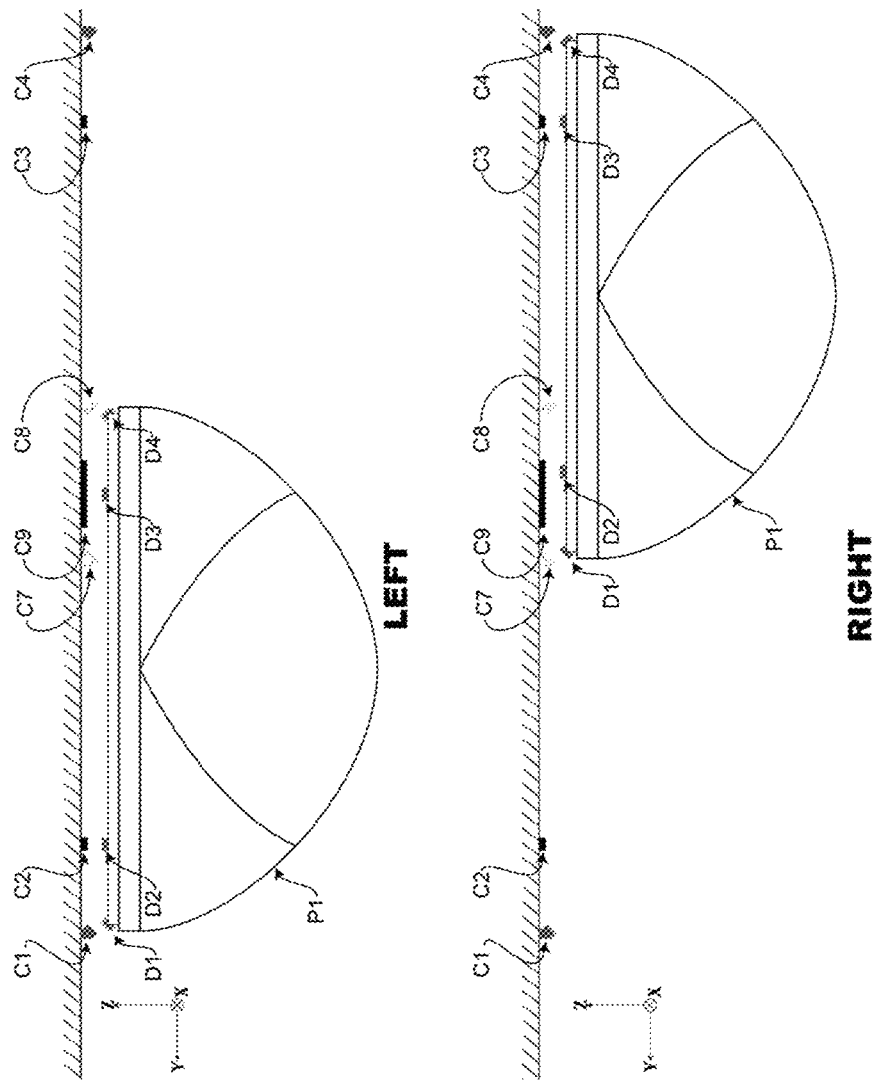
FIG. 31 shows an exemplary cross-sectional view at section L7 of FIG. 24 in accordance with aspects of the disclosure.

FIG. 31 shows an exemplary cross-sectional view at section L7 of the track arrangement (or topology) 2400 (as shown in FIG. 24) in accordance with aspects of the disclosure. As shown in FIG. 31, if the pod P1 is directed leftward, the LEFT primary force interactions (not limited to but providing the majority of the forces acting on bearings) are:

(D1) interacting with (C1) to provide Y- and Z-directed forces (providing guidance);

(D2) interacting with (C2) to provide at least Z-directed forces (providing reaction Y-directed forces as required);

(D3) interacting with (C9) to provide at least Z-directed forces (providing reaction Y-directed forces as required); and (D4) interacting with (C8) to provide Y- and Z-directed forces (providing guidance); it should be understood, however, that this track element (C8) is optional and not necessary for operation but may be utilized, for example, to provide additional capacity.

As shown in FIG. 31, if the pod P1 is directed rightward, the RIGHT primary force interactions (not limited to but providing the majority of the forces acting on bearings) are:

(D1) interacting with (C7) to provide Y- and Z-directed forces (providing guidance); it should be understood, however, that this track element (C7) is optional and not necessary for operation but may be utilized, for example, to provide additional capacity;

(D2) interacting with (C9) to provide at least Z-directed forces (providing reaction Y-directed forces as required);

(D3) interacting with (C3) to provide at least Z-directed forces (providing reaction Y-directed forces as required); and (D4) interacting with (C4) to provide Y- and Z-directed forces (providing guidance)

Figure 32:
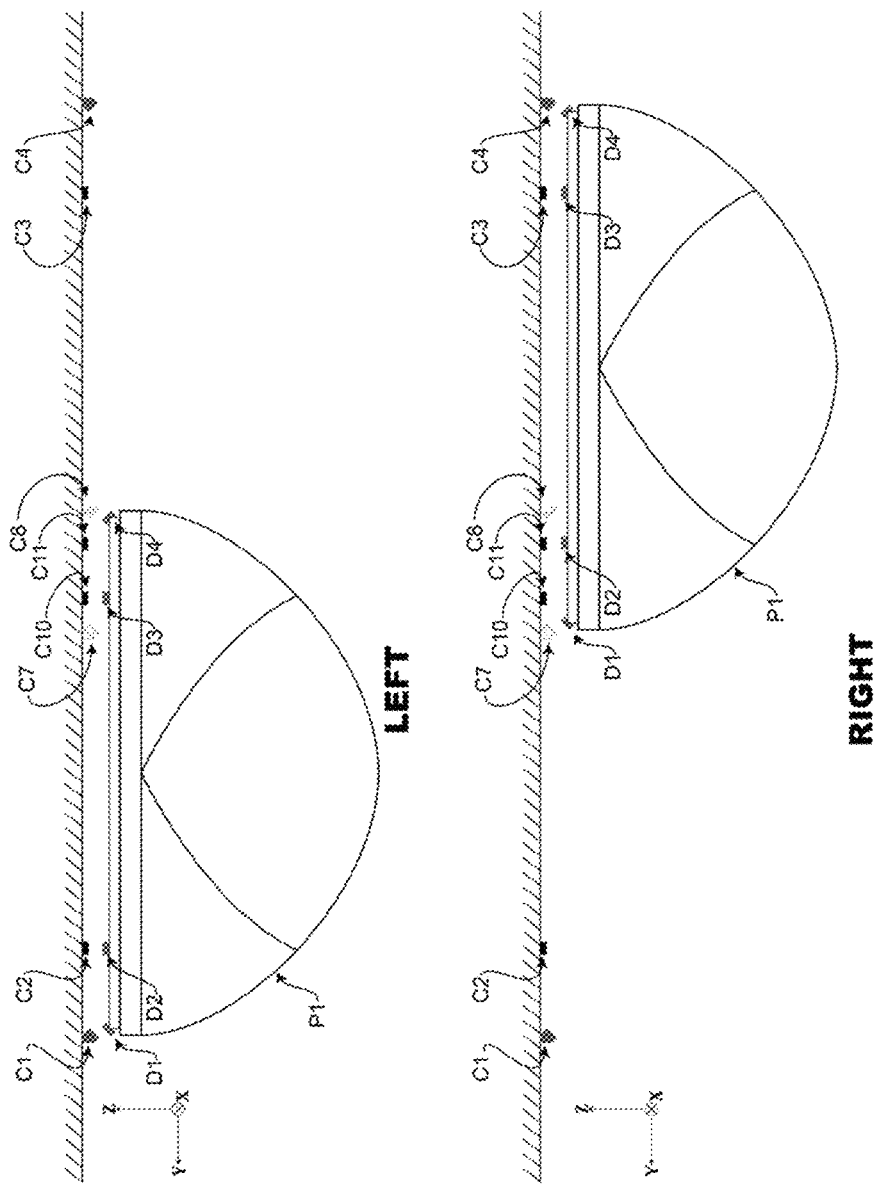
FIG. 32 shows an exemplary cross-sectional view at section L8 of FIG. 24 in accordance with aspects of the disclosure.

FIG. 32 shows an exemplary cross-sectional view at section L8 of the track arrangement (or topology) 2400 (as shown in FIG. 24) in accordance with aspects of the disclosure. As shown in FIG. 32, if the pod P1 is directed leftward, the LEFT primary force interactions (not limited to but providing the majority of the forces acting on bearings) are:

(D1) interacting with (C1) to provide Y- and Z-directed forces (providing guidance);

(D2) interacting with (C2) to provide at least Z-directed forces (providing reaction Y-directed forces as required);

(D3) interacting with (C10) to provide at least Z-directed forces (providing reaction Y-directed forces as required); and (D4) interacting with (C8) to provide Y- and Z-directed forces (providing guidance); it should be understood, however, that this track element (C8) is optional and not necessary for operation but may be utilized, for example, to provide additional capacity.

As shown in FIG. 32, if the pod P1 is directed rightward, the RIGHT primary force interactions (not limited to but providing the majority of the forces acting on bearings) are:

(D1) interacting with (C7) to provide Y- and Z-directed forces (providing guidance); it should be understood, however, that this track element (C7) is optional and not necessary for operation but may be utilized, for example, to provide additional capacity;

(D2) interacting with (C11) to provide at least Z-directed forces (providing reaction Y-directed forces as required);

(D3) interacting with (C3) to provide at least Z-directed forces (providing reaction Y-directed forces as required); and (D4) interacting with (C4) to provide Y- and Z-directed forces (providing guidance).

Figure 33:
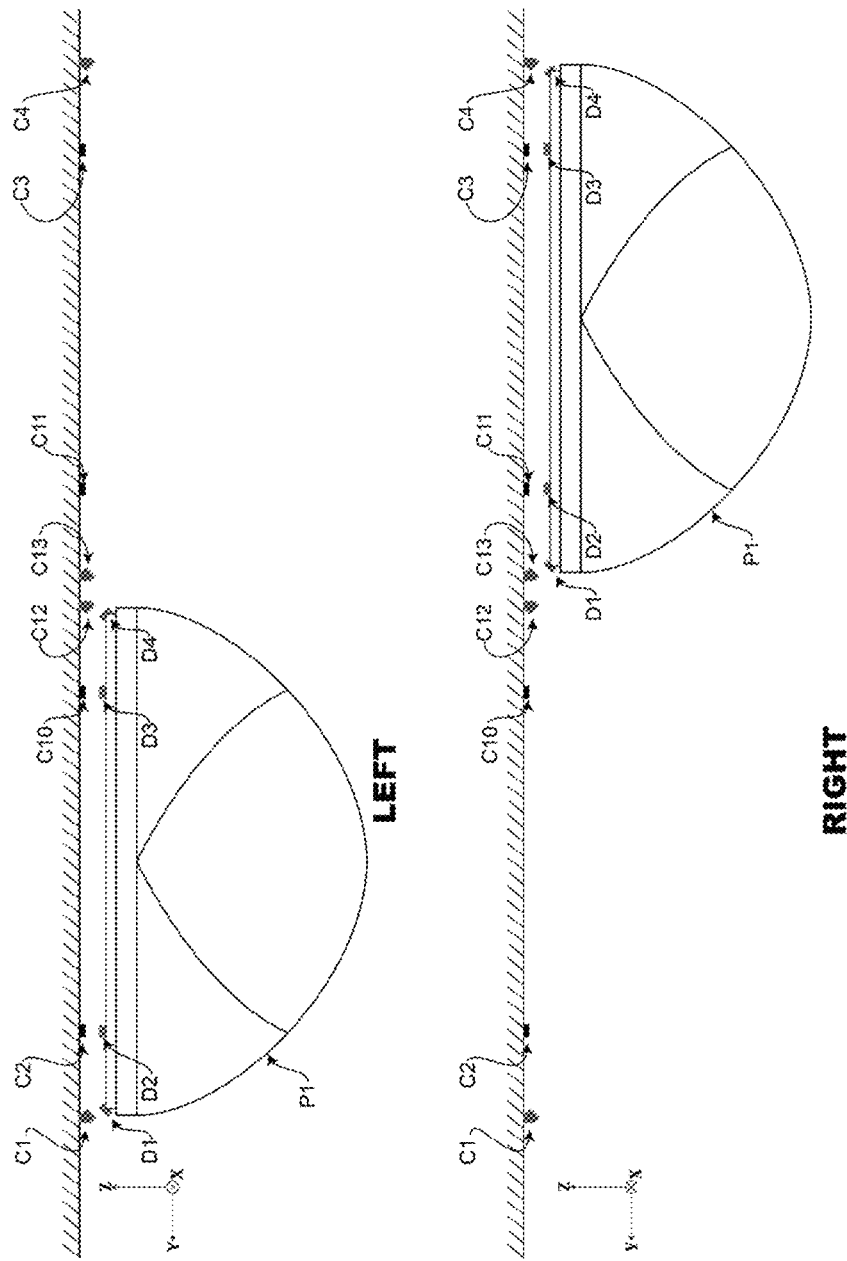
FIG. 33 shows an exemplary cross-sectional view at section L9 of FIG. 24 in accordance with aspects of the disclosure.

FIG. 33 shows an exemplary cross-sectional view at section L9 of the track arrangement (or topology) 2400 (as shown in FIG. 24) in accordance with aspects of the disclosure. As shown in FIG. 33, if the pod P1 is directed leftward, the LEFT primary force interactions (not limited to but providing the majority of the forces acting on bearings) are:

(D1) interacting with (C1) to provide Y- and Z-directed forces (providing guidance);

(D2) interacting with (C2) to provide at least Z-directed forces (providing reaction Y-directed forces as required);

(D3) interacting with (C10) to provide at least Z-directed forces (providing reaction Y-directed forces as required); and (D4) interacting with (C12) to provide Y- and Z-directed forces (providing guidance).

As shown in FIG. 33, if the pod P1 is directed rightward, the RIGHT primary force interactions (not limited to but providing the majority of the forces acting on bearings) are:

(D1) interacting with (C13) to provide Y- and Z-directed forces (providing guidance);

(D2) interacting with (C11) to provide at least Z-directed forces (providing reaction Y-directed forces as required);

(D3) interacting with (C3) to provide at least Z-directed forces (providing reaction Y-directed forces as required); and (D4) interacting with (C4) to provide Y- and Z-directed forces (providing guidance).

Figure 34:
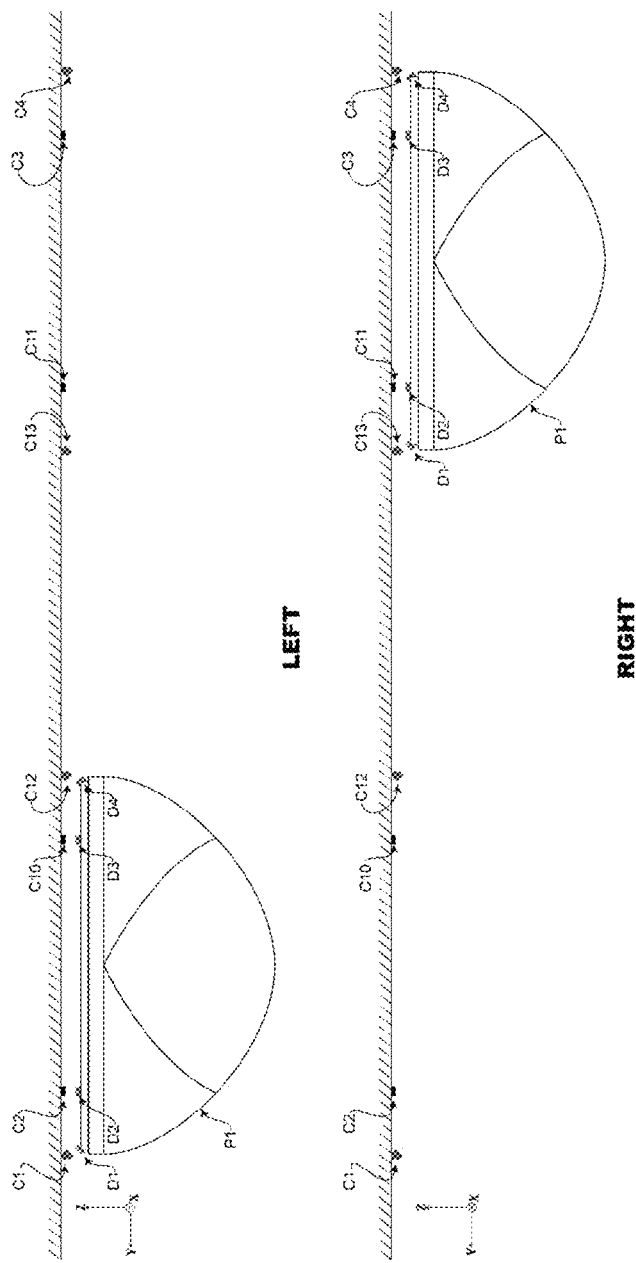
FIG. 34 shows an exemplary cross-sectional view at section L10 in of FIG. 24 accordance with aspects of the disclosure.

FIG. 34 shows an exemplary cross-sectional view at section L10 of the track arrangement (or topology) 2400 (as shown in FIG. 24) in accordance with aspects of the disclosure. As shown in FIG. 34, if the pod P1 is directed leftward, the LEFT primary force interactions (not limited to but providing the majority of the forces acting on bearings) are:

(D1) interacting with (Cl) to provide Y- and Z-directed forces. (providing guidance)

(D2) interacting with (C2) to provide at least Z-directed forces (providing reaction Y-directed forces as required)

(D3) interacting with (C10) to provide at least Z-directed forces (providing reaction Y-directed forces as required)

(D4) interacting with (C12) to provide Y- and Z-directed forces (providing guidance)

At this point along the path of travel downstream of the divergence, operation of the pod P1 is nominal (e.g., a cruise configuration is established where required forces are distributed as required among all four bearings).

As shown in FIG. 34, if the pod P1 is directed rightward, the RIGHT primary force interactions (not limited to but providing the majority of the forces acting on bearings) are:

(D1) interacting with (C13) to provide Y- and Z-directed forces (providing guidance);

(D2) interacting with (C11) to provide at least Z-directed forces (providing reaction Y-directed forces as required);

(D3) interacting with (C3) to provide at least Z-directed forces (providing reaction Y-directed forces as required); and (D4) interacting with (C4) to provide Y- and Z-directed forces (providing guidance).

At this point along the path of travel downstream of the divergence, operation of the pod P1 is nominal (e.g., a cruise configuration is established where required forces are distributed as required among all four bearings).

Figure 35:
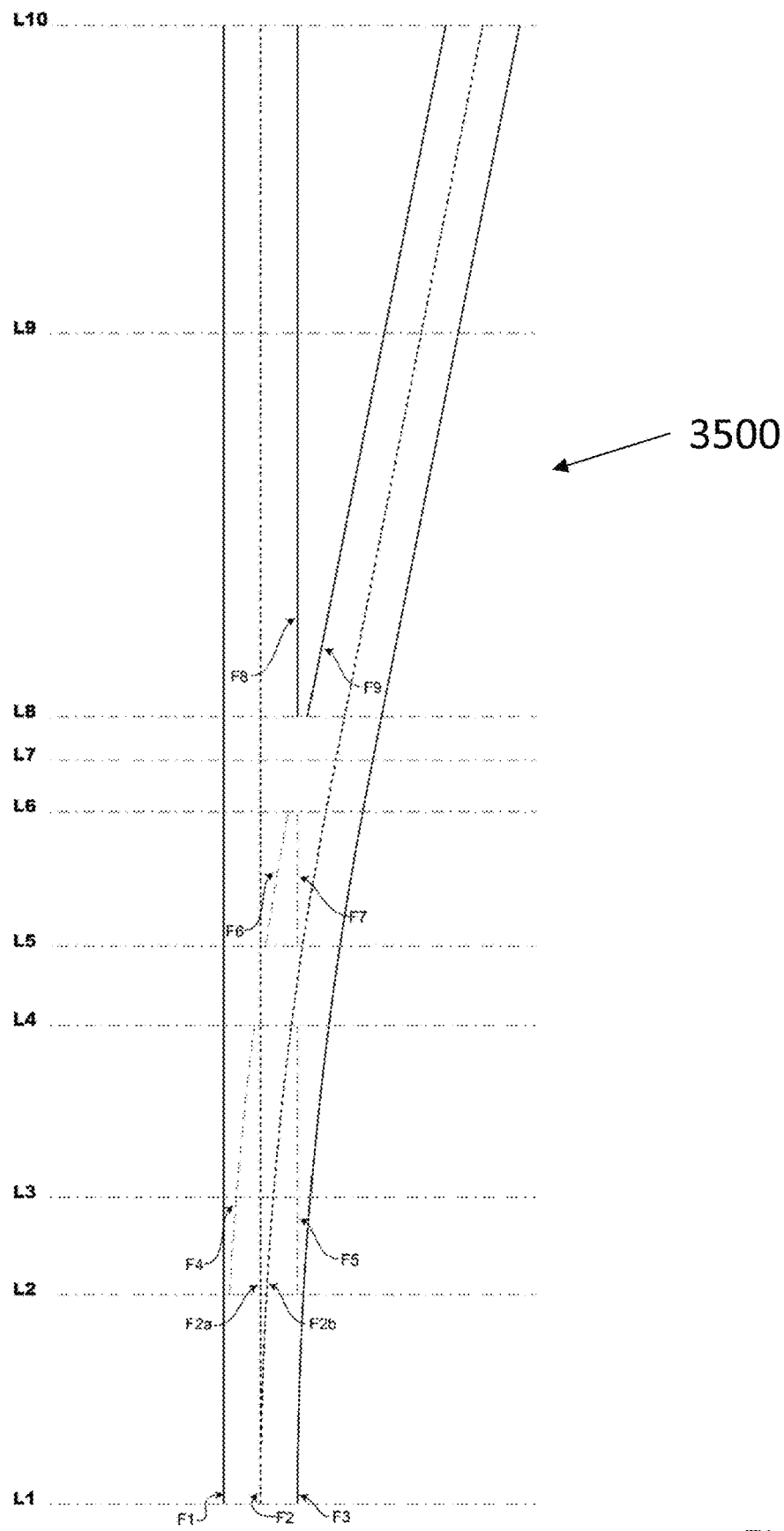
FIG. 35 shows an exemplary schematic illustration of an overview of a switching system for an exemplary track arrangement (or topology) with an overhead bearing surface with one out-of-plane bearing, two in-plane bearings in accordance with aspects of the disclosure.

FIG. 35 shows an exemplary schematic illustration of an overview of a switching system for an exemplary track arrangement (or topology) 3500 with an overhead bearing surface with three rails largely on a single plane, including one out-of-plane bearing, two in-plane bearings in accordance with aspects of the disclosure. As shown in FIG. 35, track arrangement 3500 includes track elements (F1-F9). With the exemplary embodiment, the assumed direction of travel is largely either in the positive X-direction or the negative X-direction. With the present disclosure, all descriptions for operation will be describing examples of operation in the positive X-direction, but as should be understood, all track topologies allow for bi-directional travel.

Figure 36:
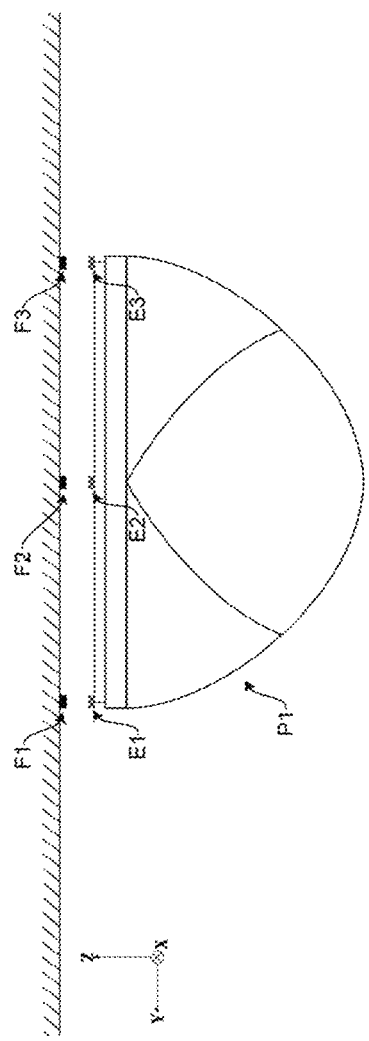
FIG. 36 shows an exemplary cross-sectional view at section L1 of FIG. 35 in accordance with aspects of the disclosure.

FIG. 36 shows an exemplary cross-sectional view at section L1 of the track arrangement (or topology) 3500 of FIG. 35 in accordance with aspects of the disclosure. That is, the exemplary and non-limiting embodiment of FIGS. 35-44 shows an overhung track topology having three rails largely on a single plane. As shown in FIG. 36, a vehicle (e.g., pod, capsule) P1 includes three bearings E1-E3 travelling in the largely X-direction. Each bearing is capable of providing an IN-PLANE (or Y-direction) and OUT-OF-PLANE (or Z-direction) force. An example of such a bearing configuration is disclosed in commonly-assigned U.S. Pat. No. 10,940, 764, entitled "Augmented Permanent Magnet System," the entire contents of which are incorporated herein by reference. For example, FIGS. 12-16 (and the corresponding description) of U.S. Pat. No. 10,940,764, entitled "Augmented Permanent Magnet System" teaches guidance control methods and systems for adjustable force distribution, which may be utilized to provide y-directed guidance forces (e.g., positive or negative y-directed forces) so as to guide a vehicle, e.g., towards a selected pathway of diverging pathways. In embodiments, each track element is at least capable of providing reaction forces in the (YZ) plane on each bearing, as long as the bearings are within some region of interaction of the track element close to the track elements (which is not shown, as the spaced distances between the track elements and bearings are not to scale).

FIG. 36 shows the pod P1 at section L1 of the track arrangement (or topology) 3500 prior to a divergence in the path (as shown in FIG. 35) in accordance with aspects of the disclosure. As shown in FIG. 36, the LEFT primary force interactions (not limited to but providing the majority of the forces acting on bearings) are:

(E1) interacting with (F1) to provide Y- and Z-directed forces (providing guidance);

(E2) interacting with (F2) to provide at least Z-directed forces (providing reaction Y-directed forces as required); and (E3) interacting with (F3) to provide reduced guidance force such that E3/F3 guidance is less than E1/F1.

As shown in FIG. 36, the RIGHT primary force interactions (not limited to but providing the majority of the forces acting on bearings) are:

(E1) interacting with (F1) to provide reduced guidance force such that E3/F3 guidance is greater than E1/F1;

(E2) interacting with (F2) to provide at least Z-directed forces (providing reaction Y-directed forces as required); and (E3) interacting with (F3) to provide Y- and Z-directed forces (providing guidance).

Figure 37:
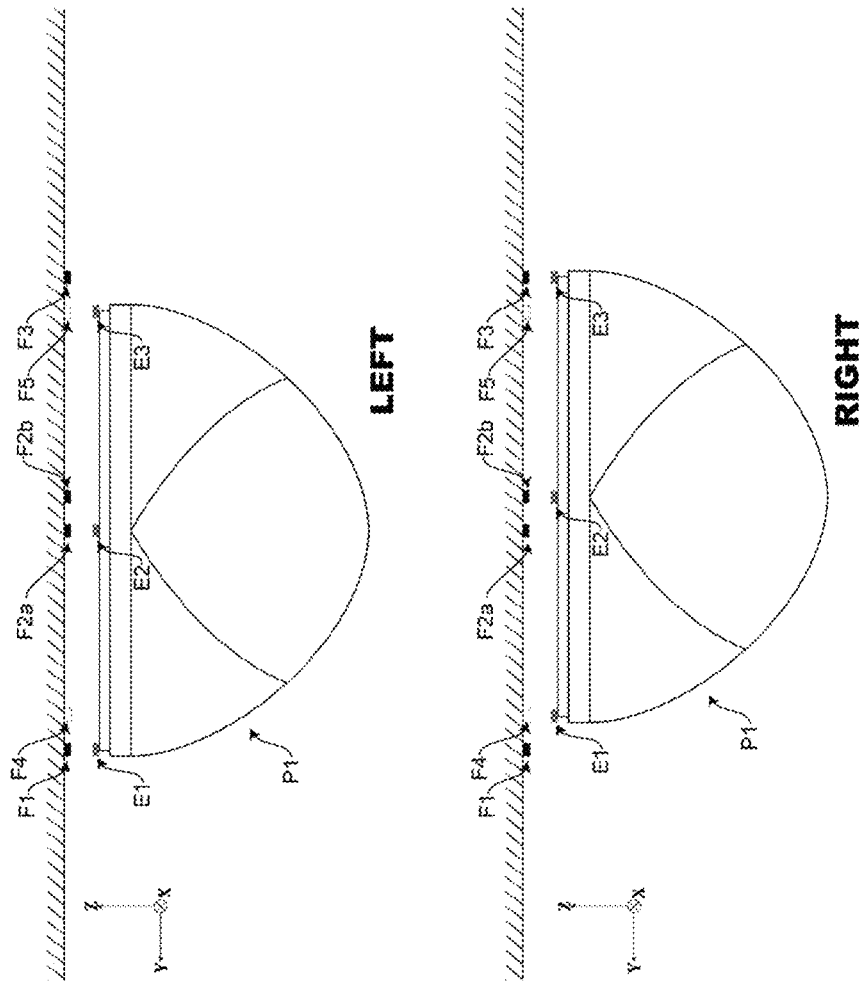
FIG. 37 shows an exemplary cross-sectional view at section L2 of FIG. 35 in accordance with aspects of the disclosure.

FIG. 37 shows an exemplary cross-sectional view at section L2 of the track arrangement (or topology) 3500 (as shown in FIG. 35) in accordance with aspects of the disclosure. As shown in FIG. 37, if the pod P1 is directed leftward, the LEFT primary force interactions (not limited to but providing the majority of the forces acting on bearings) are:

(E1) interacting with (F1) to provide Y- and Z-directed forces (providing guidance);

(E2) interacting with (F2a) to provide at least Z-directed forces (providing reaction Y-directed forces as required); and (E3) interacting with (F5) to provide at least Z-directed forces (providing reaction Y-directed forces as required); it should be understood, however, that this track element (F5) is optional and not necessary for operation but may be utilized, for example, to provide additional capacity.

As shown in FIG. 37, if the pod P1 is directed rightward, the RIGHT primary force interactions (not limited to but providing the majority of the forces acting on bearings) are:

(E1) interacting with (F4) to provide at least Z-directed forces (providing reaction Y-directed forces as required); it should be understood, however, that this track element (F4) is optional and not necessary for operation but may be utilized, for example, to provide additional capacity;

(E2) interacting with (F2b) to provide at least Z-directed forces (providing reaction Y-directed forces as required); and (E3) interacting with (F3) to provide Y- and Z-directed forces (providing guidance).

Figure 38:
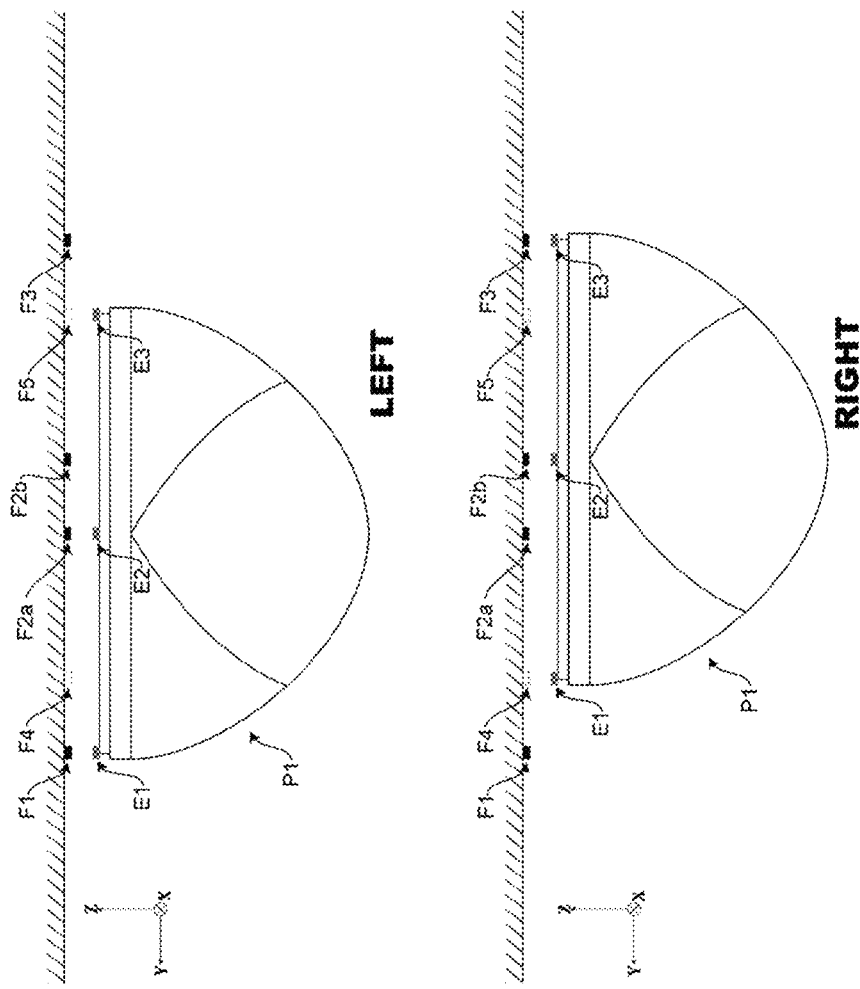
FIG. 38 shows an exemplary cross-sectional view at section L3 of FIG. 35 in accordance with aspects of the disclosure.

FIG. 38 shows an exemplary cross-sectional view at section L3 of the track arrangement (or topology) 3500 (as shown in FIG. 35) in accordance with aspects of the disclosure. As shown in FIG. 38, if the pod P1 is directed leftward, the LEFT primary force interactions (not limited to but providing the majority of the forces acting on bearings) are:

(E1) interacting with (F1) to provide Y- and Z-directed forces (providing guidance)

(E2) interacting with (F2a) to provide at least Z-directed forces (providing reaction Y-directed forces as required); and (E3) interacting with (F5) to provide at least Z-directed forces (providing reaction Y-directed forces as required); it should be understood, however, that this track element (F5) is optional and not necessary for operation but may be utilized, for example, to provide additional capacity.

As shown in FIG. 38, if the pod P1 is directed rightward, the RIGHT primary force interactions (not limited to but providing the majority of the forces acting on bearings) are:

(E1) interacting with (F4) to provide at least Z-directed forces (providing reaction Y-directed forces as required); it should be understood, however, that this track element (F4) is optional and not necessary for operation but may be utilized, for example, to provide additional capacity;

(E2) interacting with (F2b) to provide at least Z-directed forces (providing reaction Y-directed forces as required); and (E3) interacting with (F3) to provide Y- and Z-directed forces (providing guidance).

Figure 39:
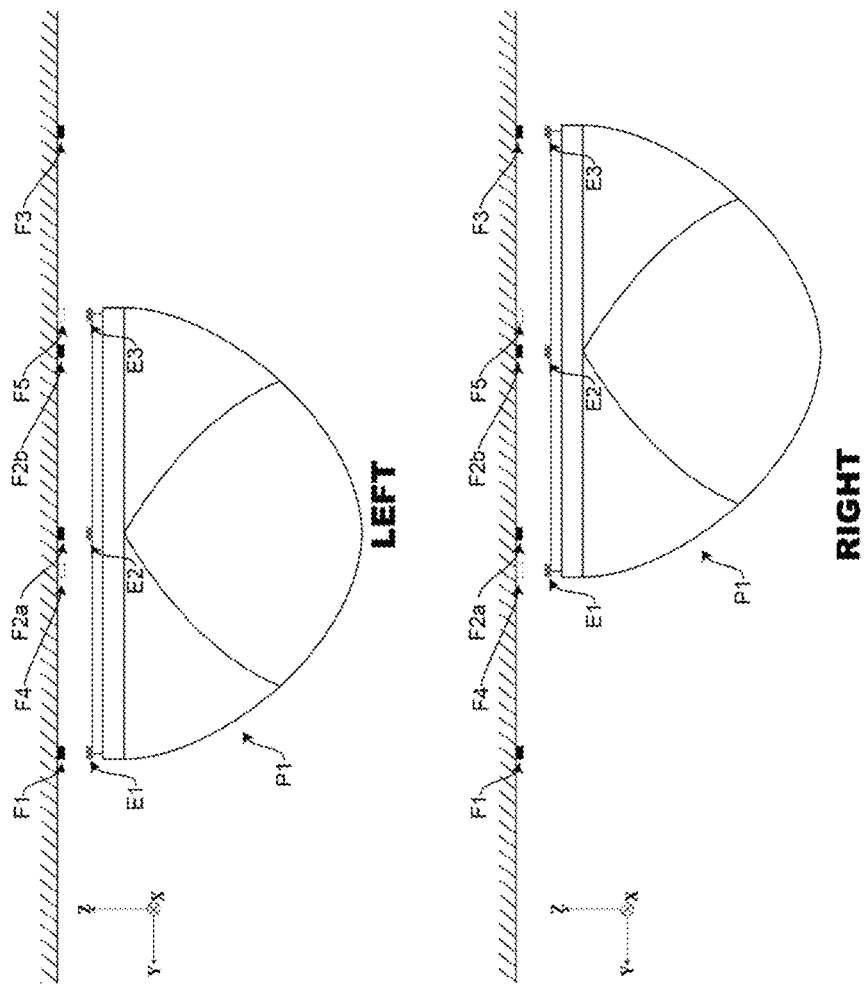
FIG. 39 shows an exemplary cross-sectional view at section L4 of FIG. 35 in accordance with aspects of the disclosure.

FIG. 39 shows an exemplary cross-sectional view at section L4 of the track arrangement (or topology) 3500 (as shown in FIG. 35) in accordance with aspects of the disclosure. As shown in FIG. 39, if the pod P1 is directed leftward, the LEFT primary force interactions (not limited to but providing the majority of the forces acting on bearings) are:

(E1) interacting with (F1) to provide Y- and Z-directed forces (providing guidance);

(E2) interacting with (F2a) to provide at least Z-directed forces (providing reaction Y-directed forces as required); and (E3) interacting with (F5) to provide at least Z-directed forces (providing reaction Y-directed forces as required); it should be understood, however, that this track element (F5) is optional and not necessary for operation but may be utilized, for example, to provide additional capacity.

As shown in FIG. 39, if the pod P1 is directed rightward, the RIGHT primary force interactions (not limited to but providing the majority of the forces acting on bearings) are:

(E1) interacting with (F4) to provide at least Z-directed forces (providing reaction Y-directed forces as required); it should be understood, however, that this track element (F4) is optional and not necessary for operation but may be utilized, for example, to provide additional capacity;

(E2) interacting with (F2b) to provide at least Z-directed forces (providing reaction Y-directed forces as required); and (E3) interacting with (F3) to provide Y- and Z-directed forces (providing guidance).

Figure 40:
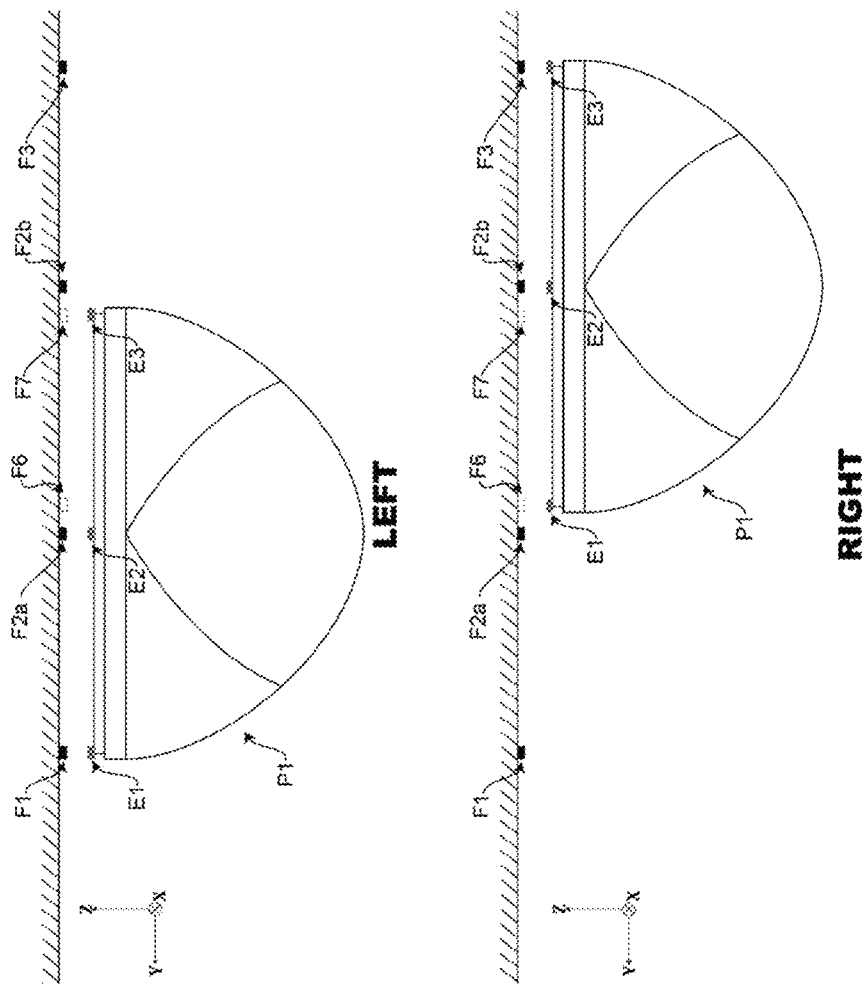
FIG. 40 shows an exemplary cross-sectional view at section L5 of FIG. 35 in accordance with aspects of the disclosure.

FIG. 40 shows an exemplary cross-sectional view at section L5 of the track arrangement (or topology) 3500 (as shown in FIG. 35) in accordance with aspects of the disclosure. As shown in FIG. 40, if the pod P1 is directed leftward, the LEFT primary force interactions (not limited to but providing the majority of the forces acting on bearings) are:

(E1) interacting with (F1) to provide Y- and Z-directed forces (providing guidance);

(E2) interacting with (F2a) to provide at least Z-directed forces (providing reaction Y-directed forces as required); and (E3) interacting with (F7) to provide at least Z-directed forces (providing reaction Y-directed forces as required); it should be understood, however, that this track element (F7) is optional and not necessary for operation but may be utilized, for example, to provide additional capacity.

As shown in FIG. 40, if the pod P1 is directed rightward, the RIGHT primary force interactions (not limited to but providing the majority of the forces acting on bearings) are:

(E1) interacting with (F6) to provide at least Z-directed forces (providing reaction Y-directed forces as required); it should be understood, however, that this track element (F6)

is optional and not necessary for operation but may be utilized, for example, to provide additional capacity;

(E2) interacting with (F2*b*) to provide at least Z-directed forces (providing reaction Y-directed forces as required); and (E3) interacting with (F3) to provide Y- and Z-directed forces (providing guidance).

Figure 41:
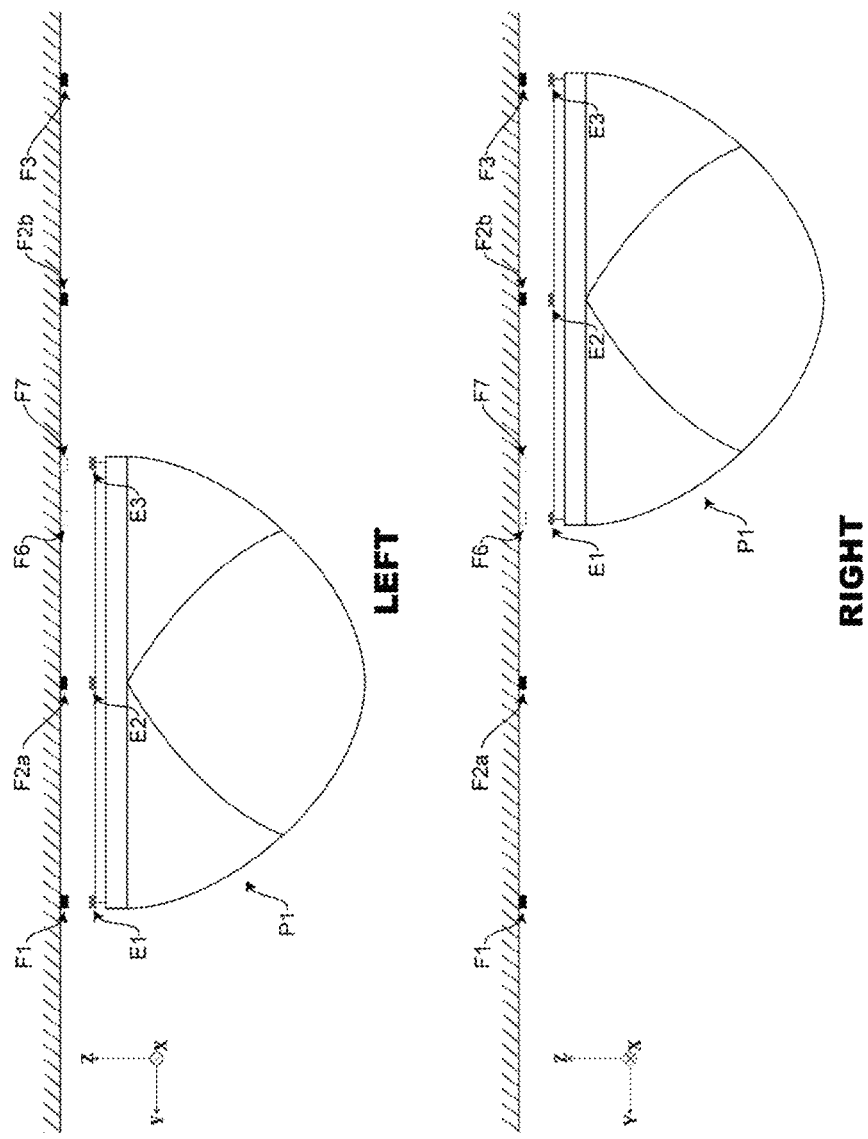
FIG. 41 shows an exemplary cross-sectional view at section L6 of FIG. 35 in accordance with aspects of the disclosure.

FIG. 41 shows an exemplary cross-sectional view at section L6 of the track arrangement (or topology) 3500 (as shown in FIG. 35) in accordance with aspects of the disclosure. As shown in FIG. 41, if the pod P1 is directed leftward, the LEFT primary force interactions (not limited to but providing the majority of the forces acting on bearings) are:

(E1) interacting with (F1) to provide Y- and Z-directed forces (providing guidance);

(E2) interacting with (F2*a*) to provide at least Z-directed forces (providing reaction Y-directed forces as required); and (E3) interacting with (F7) to provide at least Z-directed forces (providing reaction Y-directed forces as required); it should be understood, however, that this track element (F7) is optional and not necessary for operation but may be utilized, for example, to provide additional capacity.

As shown in FIG. 41, if the pod P1 is directed rightward, the RIGHT primary force interactions (not limited to but providing the majority of the forces acting on bearings) are:

(E1) interacting with (F6) to provide at least Z-directed forces (providing reaction Y-directed forces as required); it should be understood, however, that this track element (F6) is optional and not necessary for operation but may be utilized, for example, to provide additional capacity;

(E2) interacting with (F2*b*) to provide at least Z-directed forces (providing reaction Y-directed forces as required); and (E3) interacting with (F3) to provide Y- and Z-directed forces (providing guidance).

Figure 42:
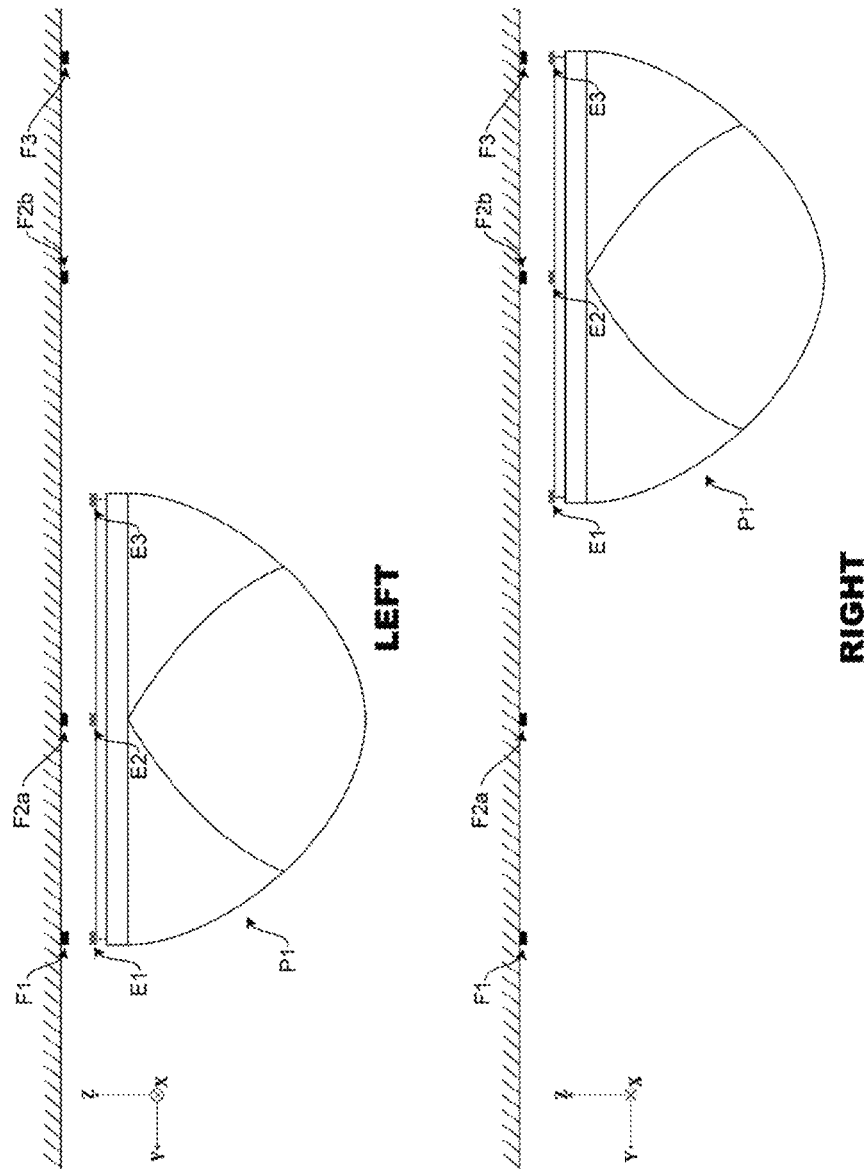
FIG. 42 shows an exemplary cross-sectional view at section L7 of FIG. 35 in accordance with aspects of the disclosure.

FIG. 42 shows an exemplary cross-sectional view at section L7 of the track arrangement (or topology) 3500 (as shown in FIG. 35) in accordance with aspects of the disclosure. As shown in FIG. 42, if the pod P1 is directed leftward, the LEFT primary force interactions (not limited to but providing the majority of the forces acting on bearings) are:

(E1) interacting with (F1) to provide Y- and Z-directed forces (providing guidance);

(E2) interacting with (F2*a*) to provide at least Z-directed forces (providing reaction Y-directed forces as required); and (E3) interacting with (NOTHING) to provide no forces.

As shown in FIG. 42, if the pod P1 is directed rightward, the RIGHT primary force interactions (not limited to but providing the majority of the forces acting on bearings) are:

(E1) interacting with (NOTHING) to provide no forces;

(E2) interacting with (F2*b*) to provide at least Z-directed forces (providing reaction Y-directed forces as required); and (E3) interacting with (F3) to provide Y- and Z-directed forces (providing guidance)

Figure 43:
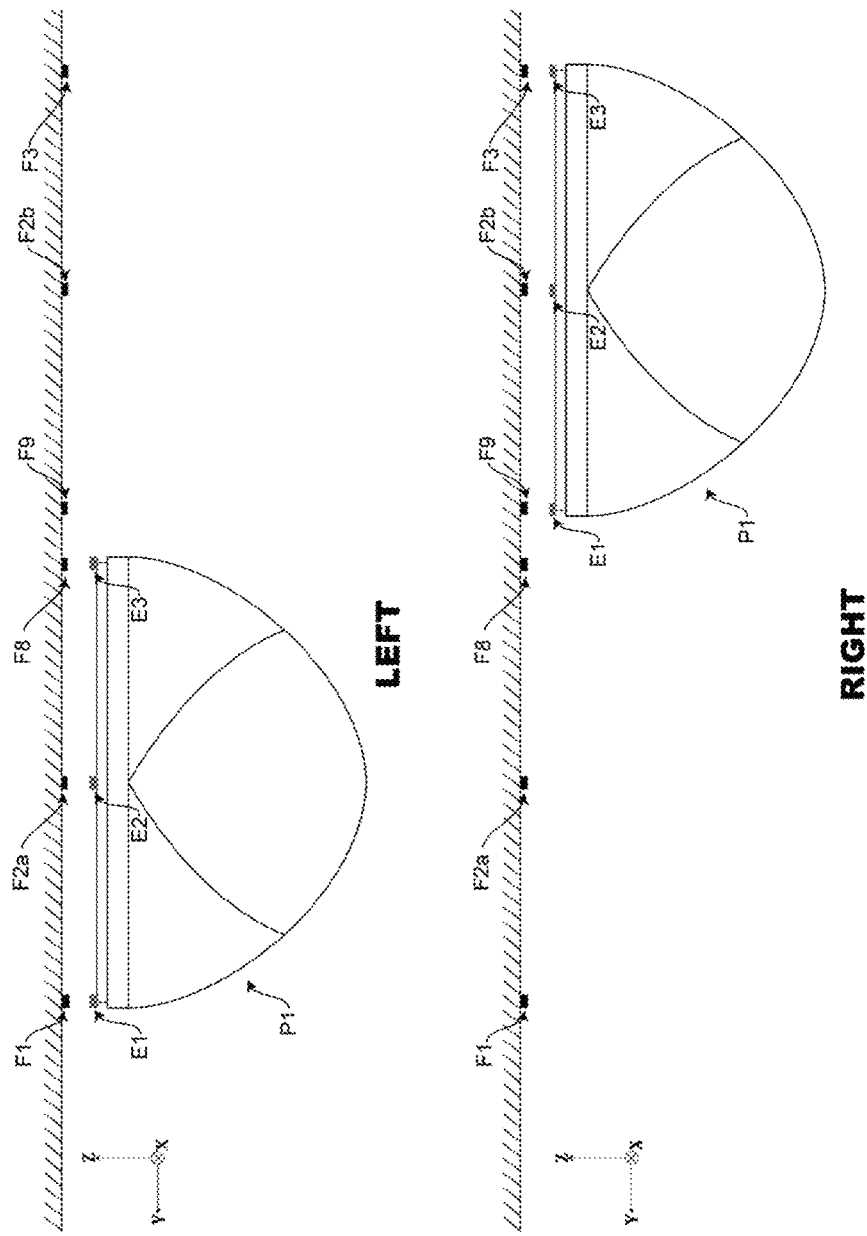
FIG. 43 shows an exemplary cross-sectional view at section L8 of FIG. 35 in accordance with aspects of the disclosure.

FIG. 43 shows an exemplary cross-sectional view at section L8 of the track arrangement (or topology) 3500 (as shown in FIG. 35) in accordance with aspects of the disclosure. As shown in FIG. 43, if the pod P1 is directed leftward, the LEFT primary force interactions (not limited to but providing the majority of the forces acting on bearings) are:

(E1) interacting with (F1) to provide Y- and Z-directed forces (providing guidance);

(E2) interacting with (F2*a*) to provide at least Z-directed forces (providing reaction Y-directed forces as required); and (E3) interacting with (F8) to provide Y- and Z-directed forces (providing guidance).

As shown in FIG. 43, if the pod P1 is directed rightward, the RIGHT primary force interactions (not limited to but providing the majority of the forces acting on bearings) are:

(E1) interacting with (F9) to provide Y- and Z-directed forces (providing guidance)

(E2) interacting with (F2*b*) to provide at least Z-directed forces (providing reaction Y-directed forces as required); and (E3) interacting with (F3) to provide Y- and Z-directed forces (providing guidance)

Figure 44:
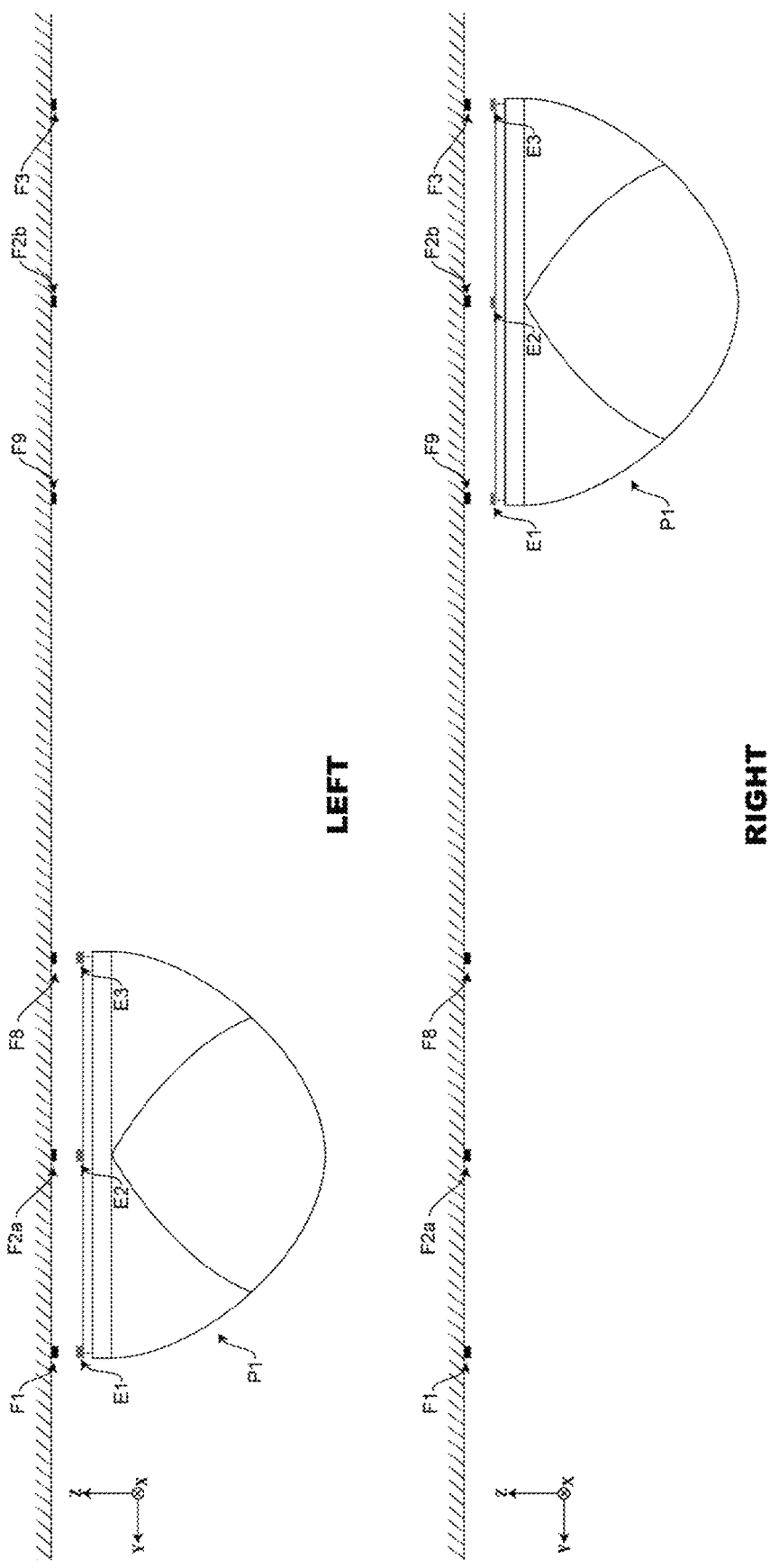
FIG. 44 shows an exemplary cross-sectional view at section L9 of FIG. 35 in accordance with aspects of the disclosure.

FIG. 44 shows an exemplary cross-sectional view at section L9 of the track arrangement (or topology) 3500 (as shown in FIG. 35) in accordance with aspects of the disclosure. As shown in FIG. 44, if the pod P1 is directed leftward, the LEFT primary force interactions (not limited to but providing the majority of the forces acting on bearings) are:

(E1) interacting with (F1) to provide Y- and Z-directed forces (providing guidance)

(E2) interacting with (F2*a*) to provide at least Z-directed forces (providing reaction Y-directed forces as required); and (E3) interacting with (F8) to provide Y- and Z-directed forces (providing guidance).

At this point along the path of travel downstream of the divergence, operation of the pod P1 is nominal (e.g., a cruise configuration is established where required forces are distributed as required, e.g., among all three bearings).

As shown in FIG. 44, if the pod P1 is directed rightward, the RIGHT primary force interactions (not limited to but providing the majority of the forces acting on bearings) are:

(E1) interacting with (F9) to provide Y- and Z-directed forces (providing guidance);

(E2) interacting with (F2*b*) to provide at least Z-directed forces (providing reaction Y-directed forces as required); and (E3) interacting with (F3) to provide Y- and Z-directed forces (providing guidance).

At this point along the path of travel downstream of the divergence, operation of the pod P1 is nominal (e.g., a cruise configuration is established where required forces are distributed as required, e.g., among all three bearings).

Figure 45:
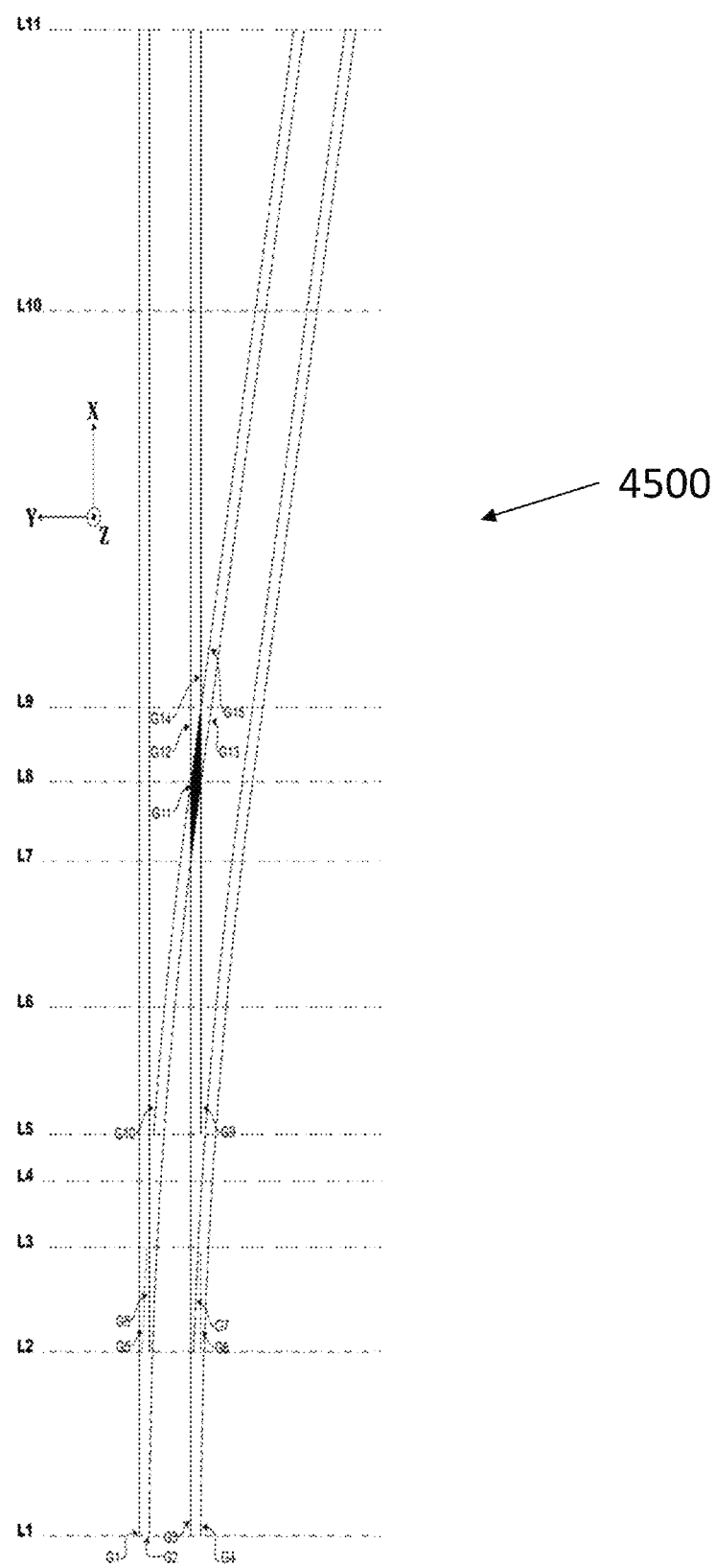
FIG. 45 shows an exemplary schematic illustration of an overview of a switching system for an exemplary track arrangement (or topology) with an overhead bearing surface having four combined out-of-plane and in-plane bearings in accordance with aspects of the disclosure.

FIG. 45 shows an exemplary schematic illustration of an overview of a switching system for an exemplary track arrangement (or topology) 4500 with an overhead bearing surface having four combined out-of-plane and in-plane bearings in accordance with aspects of the disclosure. As shown in FIG. 45, track arrangement 4500 includes track elements (G1-G15). With the exemplary embodiment, the assumed direction of travel is largely either in the positive X-direction or the negative X-direction. With the present disclosure, all descriptions for operation will be describing examples of operation in the positive X-direction, but as should be understood, all track topologies allow for bi-directional travel.

Figure 46:
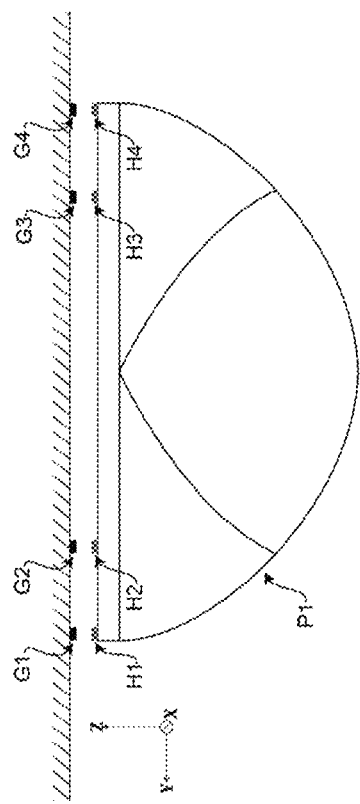
FIG. 46 shows an exemplary cross-sectional view at section L1 of FIG. 45 in accordance with aspects of the disclosure.

FIG. 46 shows an exemplary cross-sectional view at section L1 of the track arrangement (or topology) 4500 of FIG. 45 in accordance with aspects of the disclosure. As shown in FIG. 46, a vehicle (e.g., pod, capsule) P1 includes four bearings H1-H4 travelling in the largely X-direction.

That is, the exemplary and non-limiting embodiment of FIGS. 45-55 shows an overhung track topology having four rails largely on a single plane, which utilizes a third switching control method as compared to the embodiment of FIGS. 12-23 and the embodiment of FIGS. 24-34, as described below. Each bearing is capable of providing an IN-PLANE (or Y-direction) and OUT-OF-PLANE (or Z-direction) force. An example of such a bearing configuration is disclosed in commonly-assigned U.S. Pat. No. 10,940,764, entitled "Augmented Permanent Magnet System," the entire contents of which are incorporated herein by reference. For example, FIGS. 12-16 (and corresponding description) of U.S. Pat. No. 10,940,764, entitled "Augmented Permanent Magnet System" teaches guidance control methods and systems for adjustable force distribution, which may be utilized to provide y-directed guidance forces (e.g., positive or negative y-directed forces) so as to guide a vehicle, e.g., towards a selected pathway of diverging pathways, for example, by offsetting the hearing (e.g., electromagnet) relative to the track. In embodiments, each track element is at least capable of providing reaction forces in the (YZ) plane on each bearing, as long as the bearings are within some region of interaction of the track element close to the track elements (which is not shown, as the spaced distances between the track elements and bearings are not to scale).

FIG. 46 shows the pod P1 at section L1 of the track arrangement (or topology) 4500 prior to a divergence in the path (as shown in FIG. 45) in accordance with aspects of the disclosure. As shown in FIG. 46, the LEFT primary force interactions (not limited to but providing the majority of the forces acting on bearings) are:

(H1) interacting with (G1) to provide Y- and Z-directed forces (providing guidance);

(H2) interacting with (G2) to provide at least Z-directed forces (providing reduced guidance forces);

(H3) interacting with (G3) to provide Y- and Z-directed forces (providing guidance); and (H4) interacting with (G4) to provide at least Z-directed forces (providing reduced guidance forces).

In accordance with aspects of the disclosure, net guidance from (H1, H3) is greater than (H2, H4).

As shown in FIG. 46, the RIGHT primary force interactions (not limited to but providing the majority of the forces acting on bearings) are:

(H1) interacting with (G1) to provide at least Z-directed forces (providing reduced guidance forces);

(H2) interacting with (G2) to provide Y- and Z-directed forces (providing guidance);

(H3) interacting with (G3) to provide at least Z-directed forces (providing reduced guidance forces; and (H4) interacting with (G4) to provide Y- and Z-directed forces (providing guidance).

In accordance with aspects of the disclosure, net guidance from (H1, H3) is less than (H2, H4).

Figure 47:
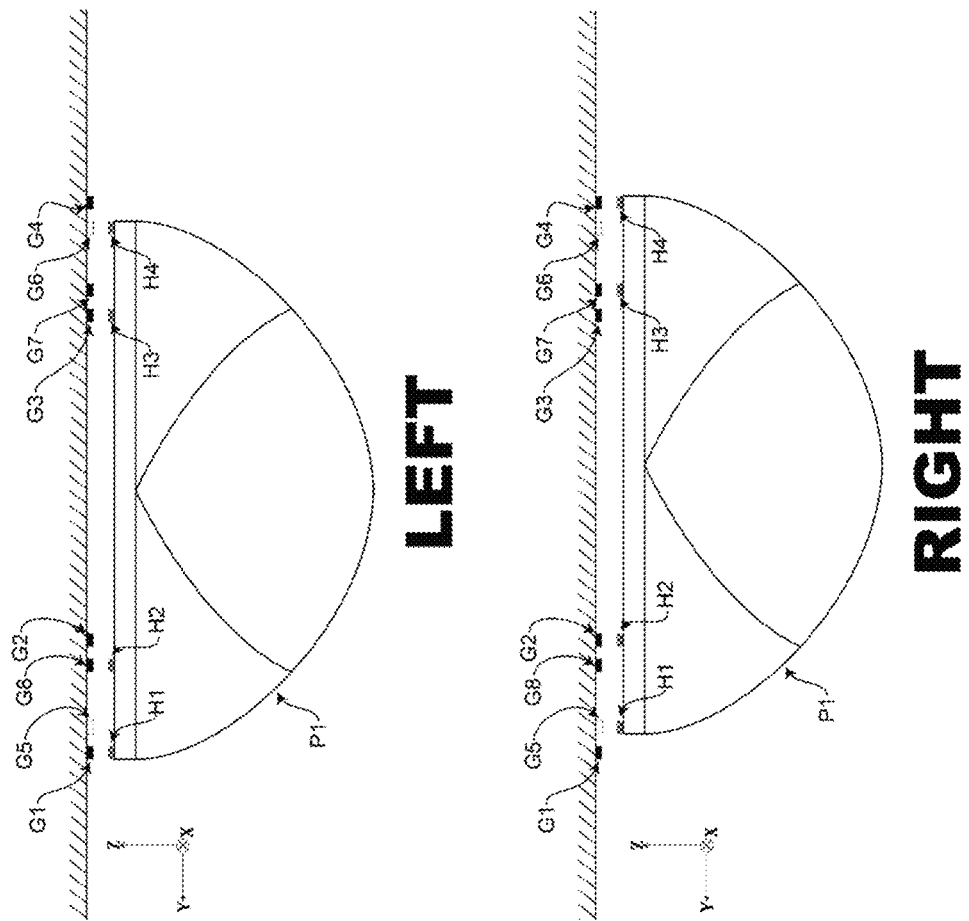
FIG. 47 shows an exemplary cross-sectional view at section L2 of FIG. 45 in accordance with aspects of the disclosure.

FIG. 47 shows an exemplary cross-sectional view at section L2 of the track arrangement (or topology) 4500 (as shown in FIG. 45) in accordance with aspects of the disclosure. As shown in FIG. 47, if the pod P1 is directed leftward, the LEFT primary force interactions (not limited to but providing the majority of the forces acting on bearings) are:

(H1) interacting with (G1) to provide Y- and Z-directed forces (providing guidance);

(H2) interacting with (G8) to provide Y- and Z-directed forces (providing guidance);

(H3) interacting with (G3) to provide at least Z-directed forces (providing reduced guidance); and (H4) interacting with (G6) to provide at least Z-directed forces (providing reduced guidance forces); it should be understood, however, that this track element (G6) is optional and not necessary for operation but may be utilized, for example, to provide additional capacity.

In accordance with aspects of the disclosure, net guidance from (H1, H2) is greater than (H3, H4).

As shown in FIG. 47, if the pod P1 is directed rightward, the RIGHT primary force interactions (not limited to but providing the majority of the forces acting on bearings) are:

(H1) interacting with (G5) to provide at least Z-directed forces (providing reduced guidance forces); it should be understood, however, that this track element (G5) is optional and not necessary for operation but may be utilized, for example, to provide additional capacity;

(H2) interacting with (G2) to provide at least Z-directed forces (providing reduced guidance);

(H3) interacting with (G7) to provide Y- and Z-directed forces (providing guidance); and (H4) interacting with (G4) to provide Y- and Z-directed forces (providing guidance)

In accordance with aspects of the disclosure, net guidance from (H1, H2) is less than (H3, H4).

Figure 48:
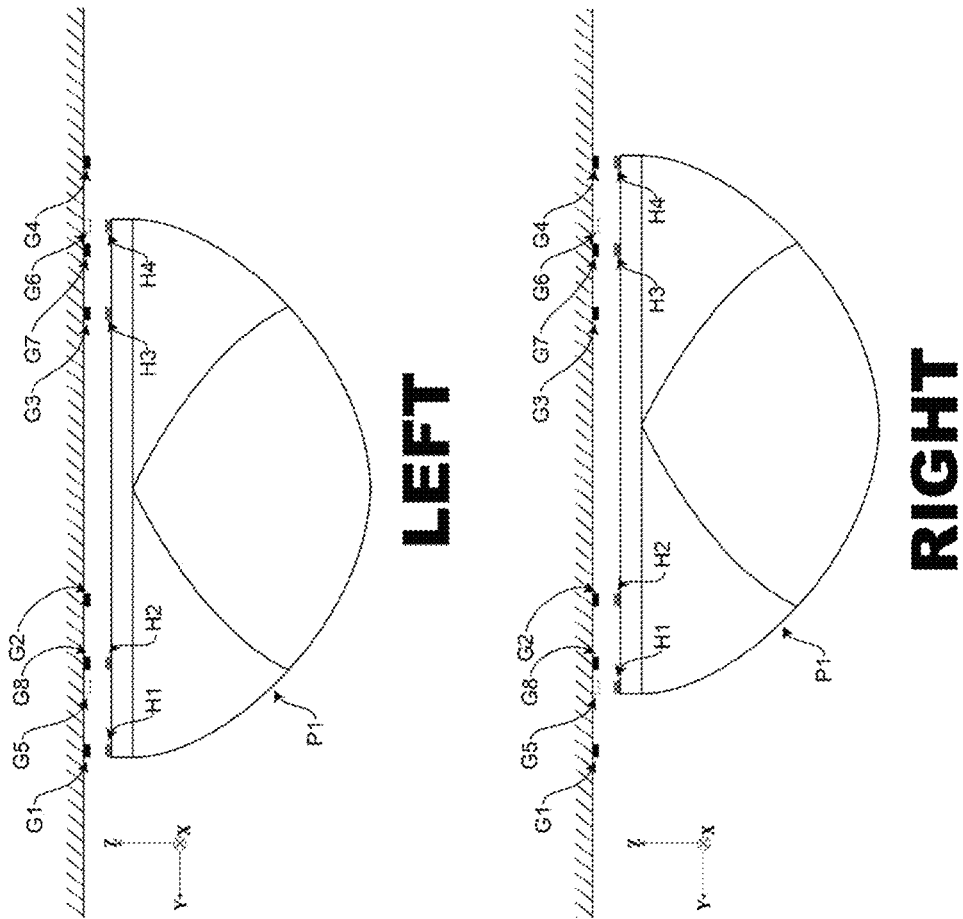
FIG. 48 shows an exemplary cross-sectional view at section L3 of FIG. 45 in accordance with aspects of the disclosure.

FIG. 48 shows an exemplary cross-sectional view at section L3 of the track arrangement (or topology) 4500 (as shown in FIG. 45) in accordance with aspects of the disclosure. As shown in FIG. 48, if the pod P1 is directed leftward, the LEFT primary force interactions (not limited to but providing the majority of the forces acting on bearings) are:

(H1) interacting with (G1) to provide Y- and Z-directed forces (providing guidance);

(H2) interacting with (G8) to provide Y- and Z-directed forces (providing guidance);

(H3) interacting with (G3) to provide at least Z-directed forces (providing reduced guidance); and (H4) interacting with (G6) to provide at least Z-directed forces (providing reduced guidance forces); it should be understood, however, that this track element (G6) is optional and not necessary for operation but may be utilized, for example, to provide additional capacity.

In accordance with aspects of the disclosure, net guidance from (H1, H2) is greater than (H3, H4).

As shown in FIG. 48, if the pod P1 is directed rightward, the RIGHT primary force interactions (not limited to but providing the majority of the forces acting on bearings) are:

(H1) interacting with (G5) to provide at least Z-directed forces (providing reduced guidance forces); it should be understood, however, that this track element (G5) is optional and not necessary for operation but may be utilized, for example, to provide additional capacity;

(H2) interacting with (G2) to provide at least Z-directed forces (providing reduced guidance);

(H3) interacting with (G7) to provide Y- and Z-directed forces (providing guidance); and (H4) interacting with (G4) to provide Y- and Z-directed forces (providing guidance).

In accordance with aspects of the disclosure, net guidance from (H1, H2) is less than (H3, H4).

Figure 49:
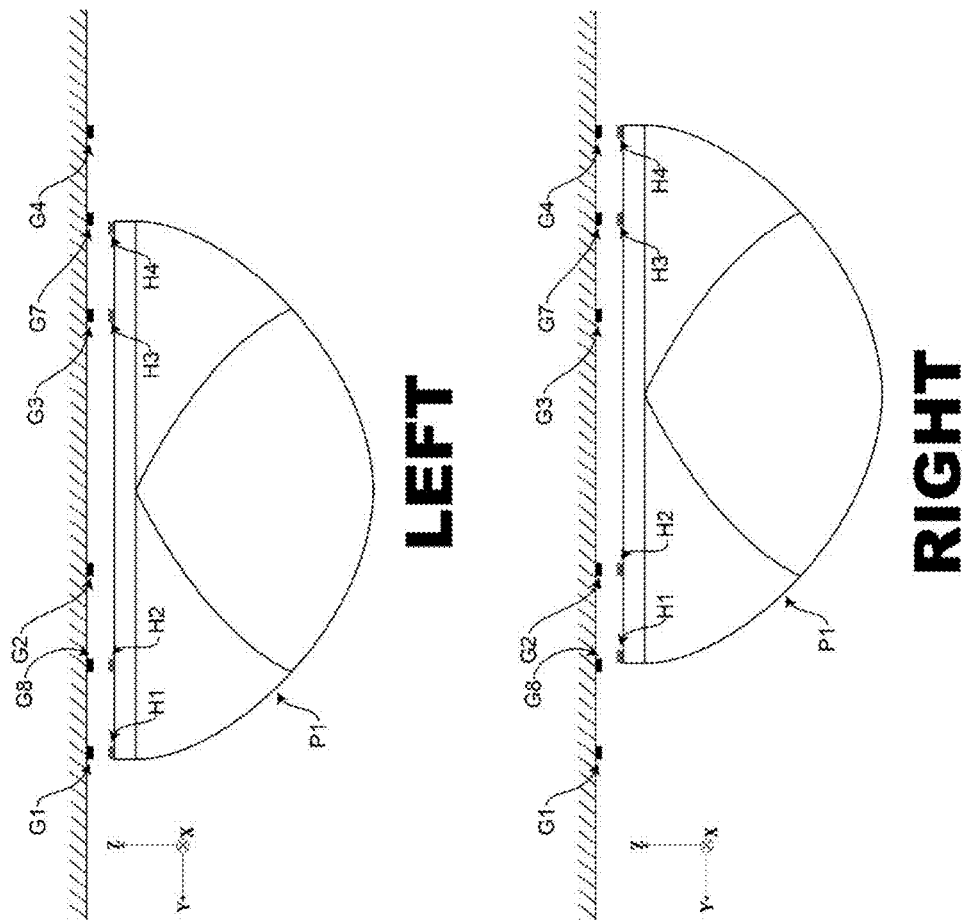
FIG. 49 shows an exemplary cross-sectional view at section L4 of FIG. 45 in accordance with aspects of the disclosure.

FIG. 49 shows an exemplary cross-sectional view at section L4 of the track arrangement (or topology) 4500 (as shown in FIG. 45) in accordance with aspects of the disclosure. As shown in FIG. 49, if the pod P1 is directed leftward, the LEFT primary force interactions (not limited to but providing the majority of the forces acting on bearings) are:

(H1) interacting with (G1) to provide Y- and Z-directed forces (providing guidance);

(H2) interacting with (G8) to provide Y- and Z-directed forces (providing guidance);

(H3) interacting with (G3) to provide at least Z-directed forces (providing reduced guidance); and (H4) interacting with (G7) to provide at least Z-directed forces (providing reduced guidance forces).

In accordance with aspects of the disclosure, net guidance from (H1, H2) is greater than (H3, H4).

As shown in FIG. 49, if the pod P1 is directed rightward, the RIGHT primary force interactions (not limited to but providing the majority of the forces acting on bearings) are:

(H1) interacting with (G5) to provide at least Z-directed forces (providing reduced guidance forces);

(H2) interacting with (G2) to provide at least Z-directed forces (providing reduced guidance);

(H3) interacting with (G7) to provide Y- and Z-directed forces (providing guidance); and (H4) interacting with (G4) to provide Y- and Z-directed forces (providing guidance).

In accordance with aspects of the disclosure, net guidance from (H1, H2) is less than (H3, H4).

Figure 50:
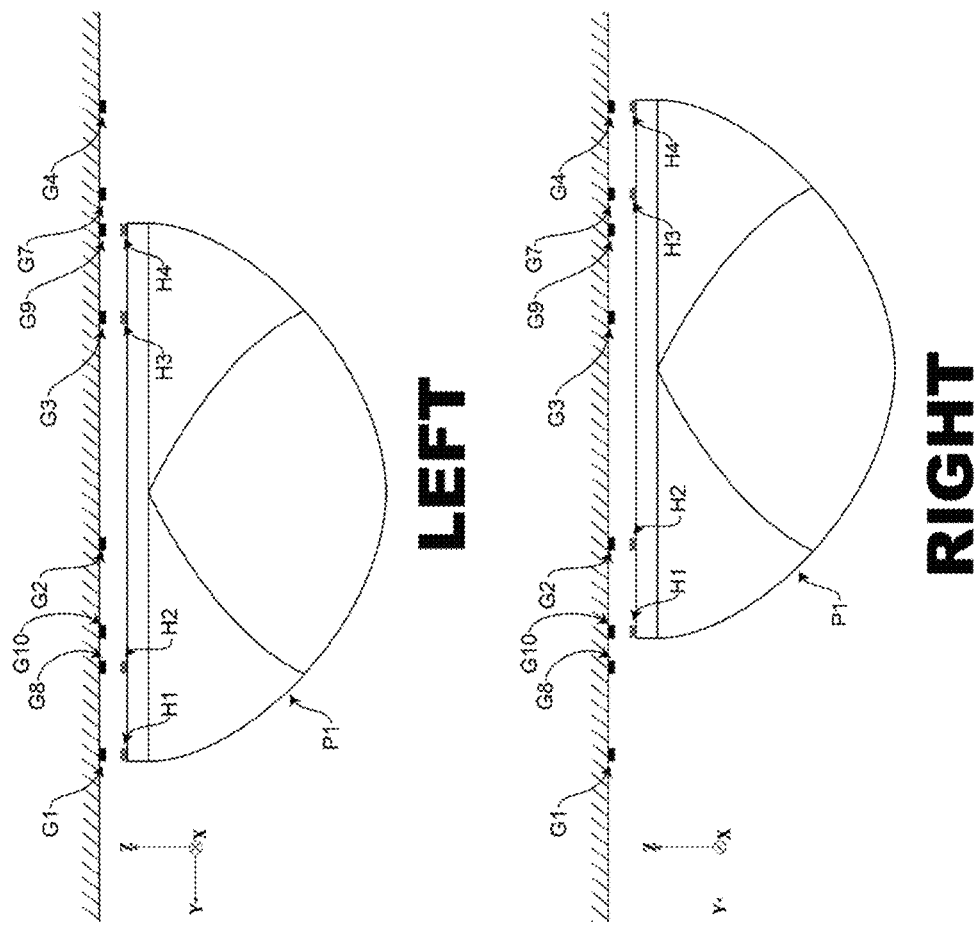
FIG. 50 shows an exemplary cross-sectional view at section L5 of FIG. 45 in accordance with aspects of the disclosure.

FIG. 50 shows an exemplary cross-sectional view at section L5 of the track arrangement (or topology) 4500 (as shown in FIG. 45) in accordance with aspects of the disclosure. As shown in FIG. 50, if the pod P1 is directed leftward, the LEFT primary force interactions (not limited to but providing the majority of the forces acting on bearings) are:

(H1) interacting with (G1) to provide Y- and Z-directed forces (providing guidance);

(H2) interacting with (G8) to provide Y- and Z-directed forces (providing guidance);

(H3) interacting with (G3) to provide at least Z-directed forces (providing reduced guidance); and (H4) interacting with (G9) to provide at least Z-directed forces (providing reduced guidance forces).

In accordance with aspects of the disclosure, net guidance from (H1, H2) is greater than (H3, H4).

As shown in FIG. 50, if the pod P1 is directed rightward, the RIGHT primary force interactions (not limited to but providing the majority of the forces acting on bearings) are:

(H1) interacting with (G10) to provide at least Z-directed forces (providing reduced guidance forces);

(H2) interacting with (G2) to provide at least Z-directed forces (providing reduced guidance);

(H3) interacting with (G7) to provide Y- and Z-directed forces (providing guidance); and (H4) interacting with (G4) to provide Y- and Z-directed forces (providing guidance).

In accordance with aspects of the disclosure, net guidance from (H1, H2) is less than (H3, H4).

Figure 51:
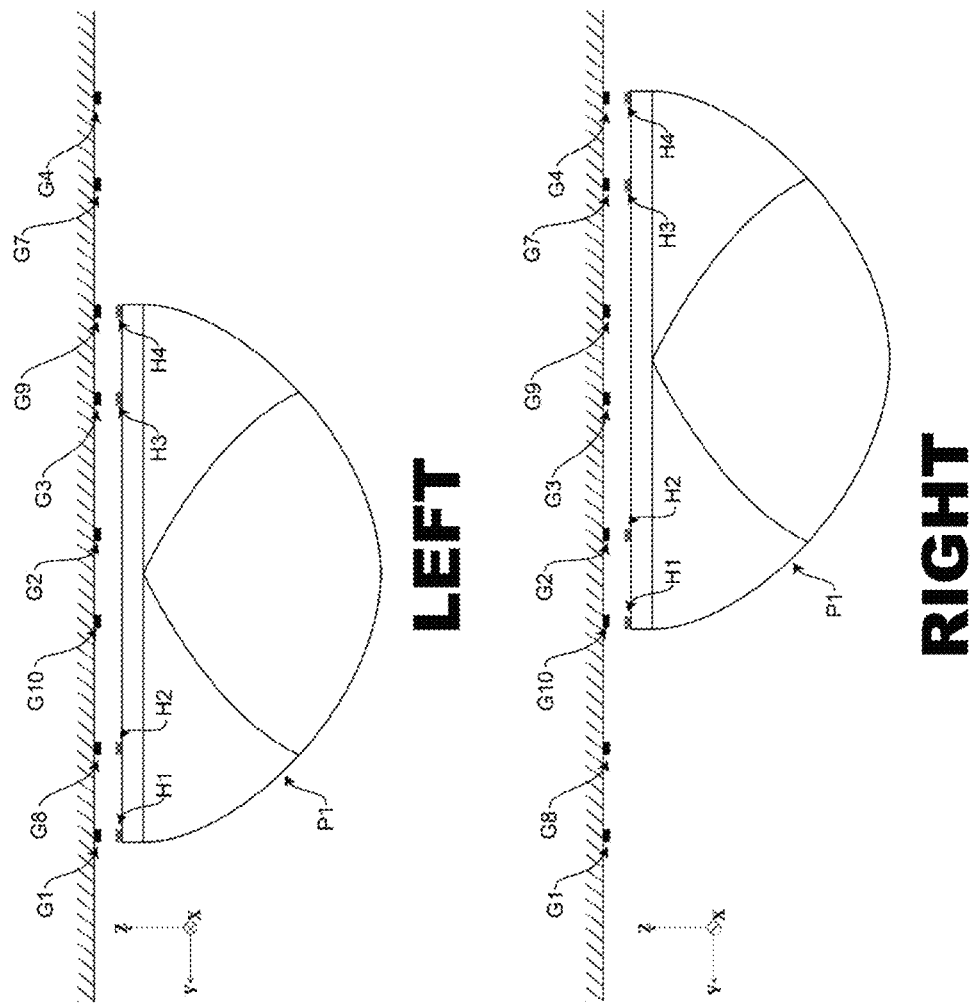
FIG. 51 shows an exemplary cross-sectional view at section L6 of FIG. 45 in accordance with aspects of the disclosure.

FIG. 51 shows an exemplary cross-sectional view at section L6 of the track arrangement (or topology) 4500 (as shown in FIG. 45) in accordance with aspects of the disclosure. As shown in FIG. 51, if the pod P1 is directed leftward, the LEFT primary force interactions (not limited to but providing the majority of the forces acting on bearings) are:

(H1) interacting with (G1) to provide Y- and Z-directed forces (providing guidance);

(H2) interacting with (G8) to provide Y- and Z-directed forces (providing guidance);

(H3) interacting with (G3) to provide at least Z-directed forces (providing reduced guidance); and (H4) interacting with (G9) to provide at least Z-directed forces (providing reduced guidance forces).

In accordance with aspects of the disclosure, net guidance from (H1, H2) is greater than (H3, H4).

As shown in FIG. 51, if the pod P1 is directed rightward, the RIGHT primary force interactions (not limited to but providing the majority of the forces acting on bearings) are:

(H1) interacting with (G10) to provide at least Z-directed forces (providing reduced guidance forces);

(H2) interacting with (G2) to provide at least Z-directed forces (providing reduced guidance);

(H3) interacting with (G7) to provide Y- and Z-directed forces (providing guidance); and (H4) interacting with (G4) to provide Y- and Z-directed forces (providing guidance).

In accordance with aspects of the disclosure, net guidance from (H1, H2) less than (H3, H4).

Figure 52:
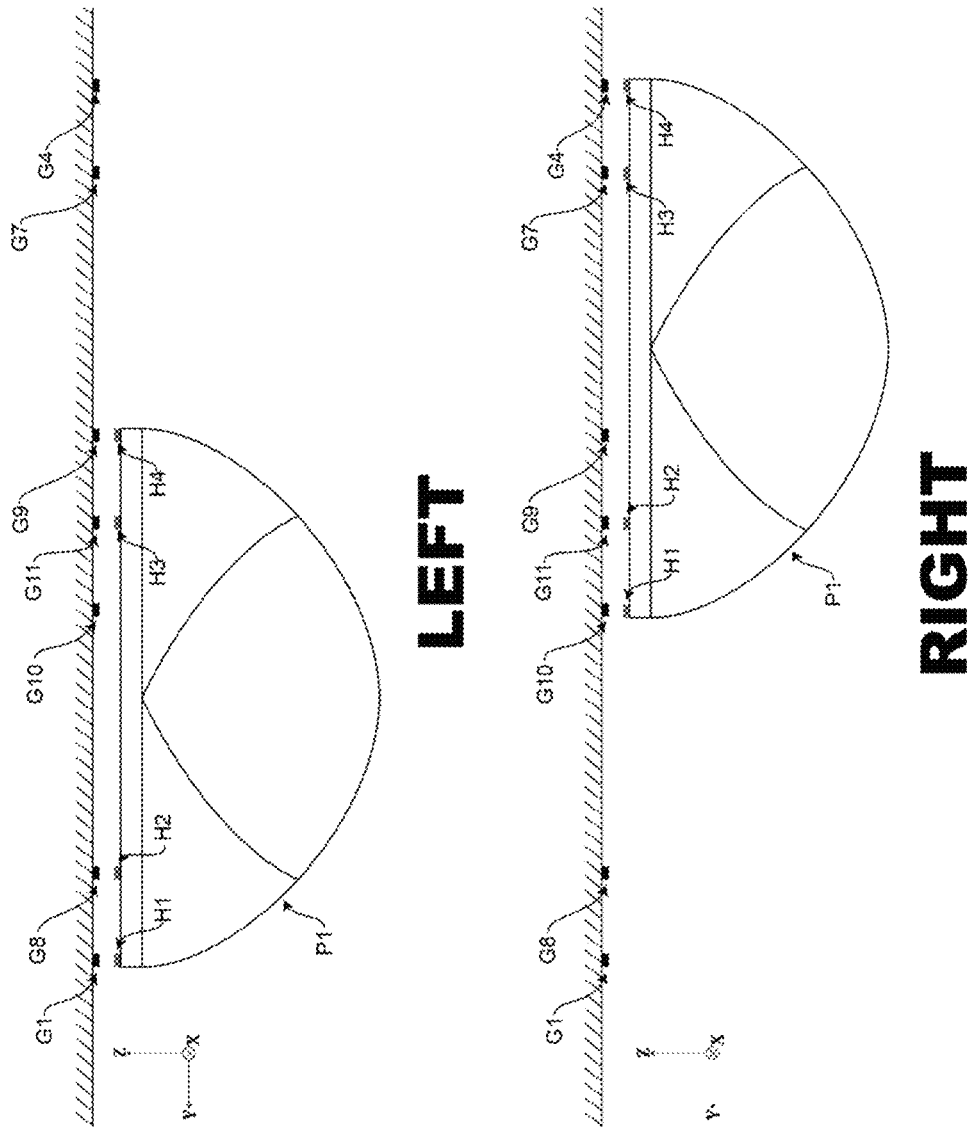
FIG. 52 shows an exemplary cross-sectional view at section L7 of FIG. 45 in accordance with aspects of the disclosure.

FIG. 52 shows an exemplary cross-sectional view at section L7 of the track arrangement (or topology) 4500 (as shown in FIG. 45) in accordance with aspects of the disclosure. As shown in FIG. 52, if the pod P1 is directed leftward, the LEFT primary force interactions (not limited to but providing the majority of the forces acting on bearings) are:

(H1) interacting with (G1) to provide Y- and Z-directed forces (providing guidance);

(H2) interacting with (G8) to provide Y- and Z-directed forces (providing guidance);

(H3) interacting with (G11) to provide at least Z-directed forces (providing reduced guidance); and (H4) interacting with (G9) to provide at least Z-directed forces (providing reduced guidance forces).

In accordance with aspects of the disclosure, net guidance from (H1, H2) is greater than (H3, H4).

As shown in FIG. 52, if the pod P1 is directed rightward, the RIGHT primary force interactions (not limited to but providing the majority of the forces acting on bearings) are:

(H1) interacting with (G10) to provide at least Z-directed forces (providing reduced guidance forces);

(H2) interacting with (G11) to provide at least Z-directed forces (providing reduced guidance);

(H3) interacting with (G7) to provide Y- and Z-directed forces (providing guidance); and (H4) interacting with (G4) to provide Y- and Z-directed forces (providing guidance).

In accordance with aspects of the disclosure, net guidance from (H1, H2) is less than (H3, H4).

Figure 53:
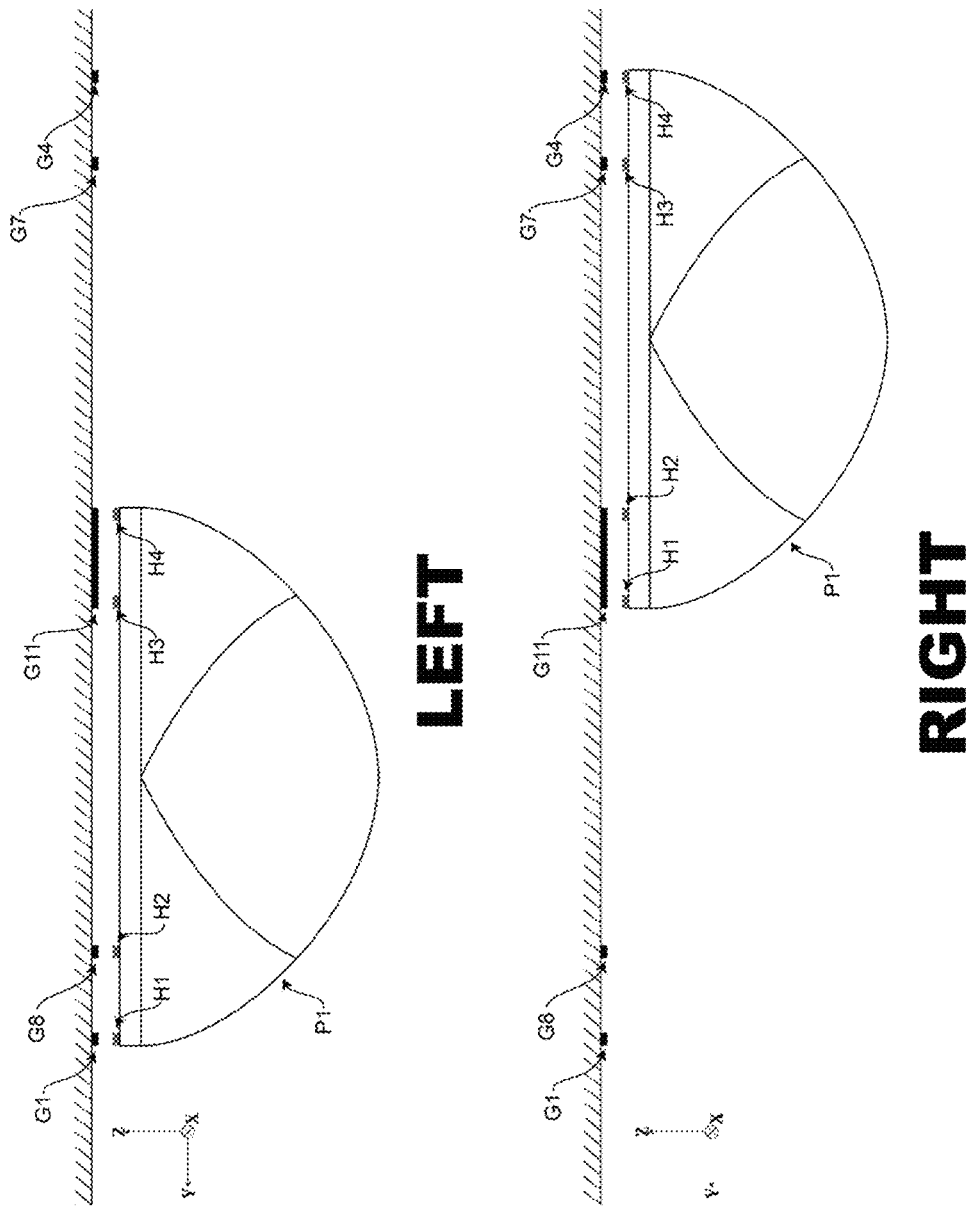
FIG. 53 shows an exemplary cross-sectional view at section L8 of FIG. 45 in accordance with aspects of the disclosure.

FIG. 53 shows an exemplary cross-sectional view at section L8 of the track arrangement (or topology) 4500 (as shown in FIG. 45) in accordance with aspects of the disclosure. As shown in FIG. 53, if the pod P1 is directed leftward, the LEFT primary force interactions (not limited to but providing the majority of the forces acting on bearings) are:

(H1) interacting with (G1) to provide Y- and Z-directed forces (providing guidance);

(H2) interacting with (G8) to provide Y- and Z-directed forces (providing guidance);

(H3) interacting with (G11) to provide at least Z-directed forces (providing reduced guidance); and (H4) interacting with (G11) to provide at least Z-directed forces (providing reduced guidance forces).

In accordance with aspects of the disclosure, net guidance from (H1, H2) is greater than (H3, H4).

As shown in FIG. 53, if the pod P1 is directed rightward, the RIGHT primary force interactions (not limited to but providing the majority of the forces acting on bearings) are:

(H1) interacting with (G11) to provide at least Z-directed forces (providing reduced guidance forces);

(H2) interacting with (G11) to provide at least Z-directed forces (providing reduced guidance);

(H3) interacting with (G7) to provide Y- and Z-directed forces (providing guidance); and (H4) interacting with (G4) to provide Y- and Z-directed forces (providing guidance).

In accordance with aspects of the disclosure, net guidance from (H1, H2) is less than (H3, H4).

Figure 54:
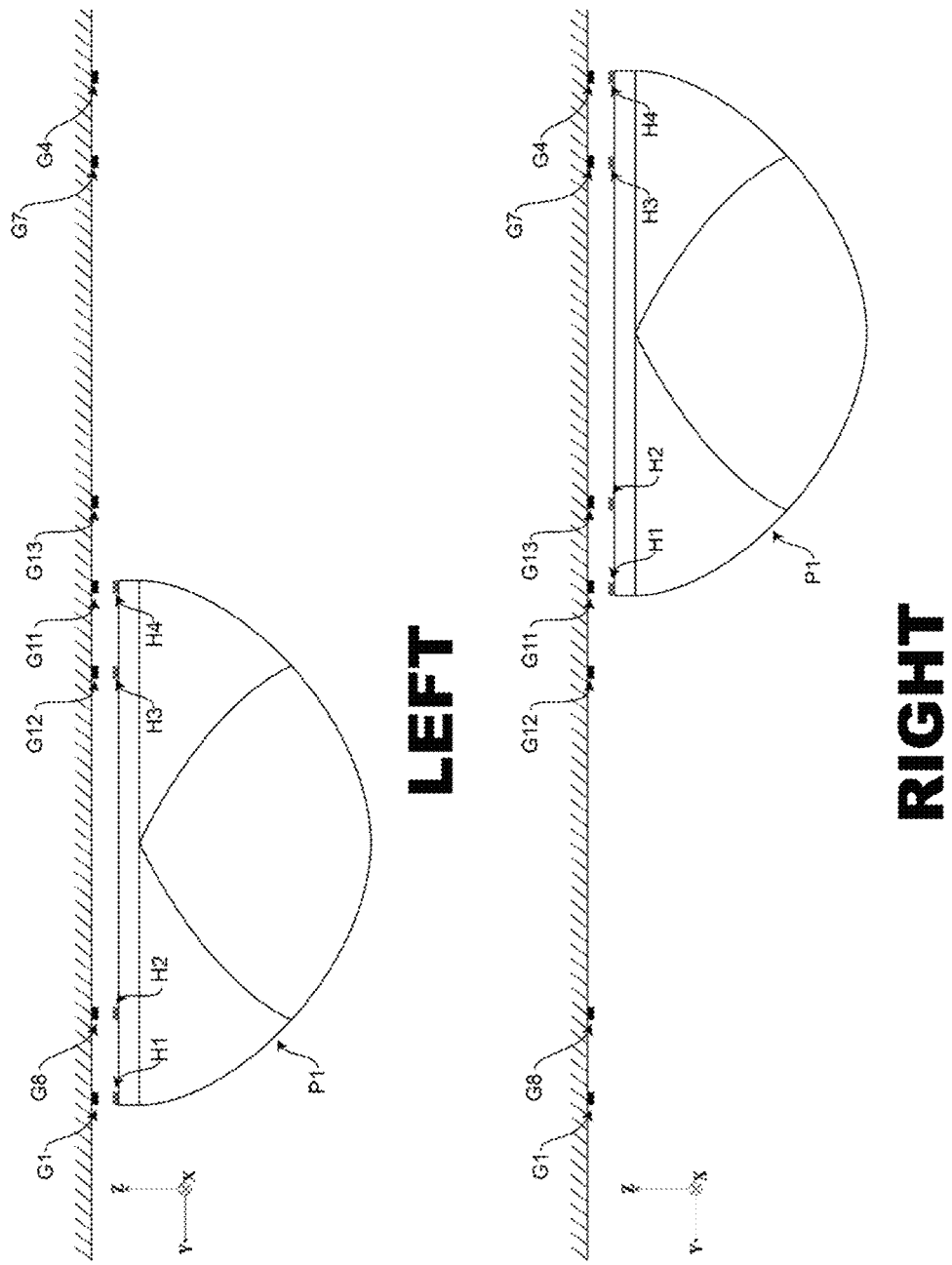
FIG. 54 shows an exemplary cross-sectional view at section L9 of FIG. 45 in accordance with aspects of the disclosure.

FIG. 54 shows an exemplary cross-sectional view at section L9 of the track arrangement (or topology) 4500 (as shown in FIG. 45) in accordance with aspects of the disclosure. As shown in FIG. 54, if the pod P1 is directed leftward, the LEFT primary force interactions (not limited to but providing the majority of the forces acting on bearings) are:

(H1) interacting with (G1) to provide Y- and Z-directed forces (providing guidance);

(H2) interacting with (G8) to provide Y- and Z-directed forces (providing guidance);

(H3) interacting with (G11) to provide at least Z-directed forces (providing reduced guidance); and (H4) interacting with (G14) to provide at least Z-directed forces (providing reduced guidance forces).

In accordance with aspects of the disclosure, net guidance from (H1, H2) is greater than (H3, H4).

As shown in FIG. 54, if the pod P1 is directed rightward, the RIGHT primary force interactions (not limited to but providing the majority of the forces acting on bearings) are:

(H1) interacting with (G14) to provide at least Z-directed forces (providing reduced guidance forces);

(H2) interacting with (G13) to provide at least Z-directed forces (providing reduced guidance);

(H3) interacting with (G7) to provide Y- and Z-directed forces (providing guidance); and (H4) interacting with (G4) to provide Y- and Z-directed forces (providing guidance).

In accordance with aspects of the disclosure, net guidance from (H1, H2) is less than (H3, H4).

Figure 55:
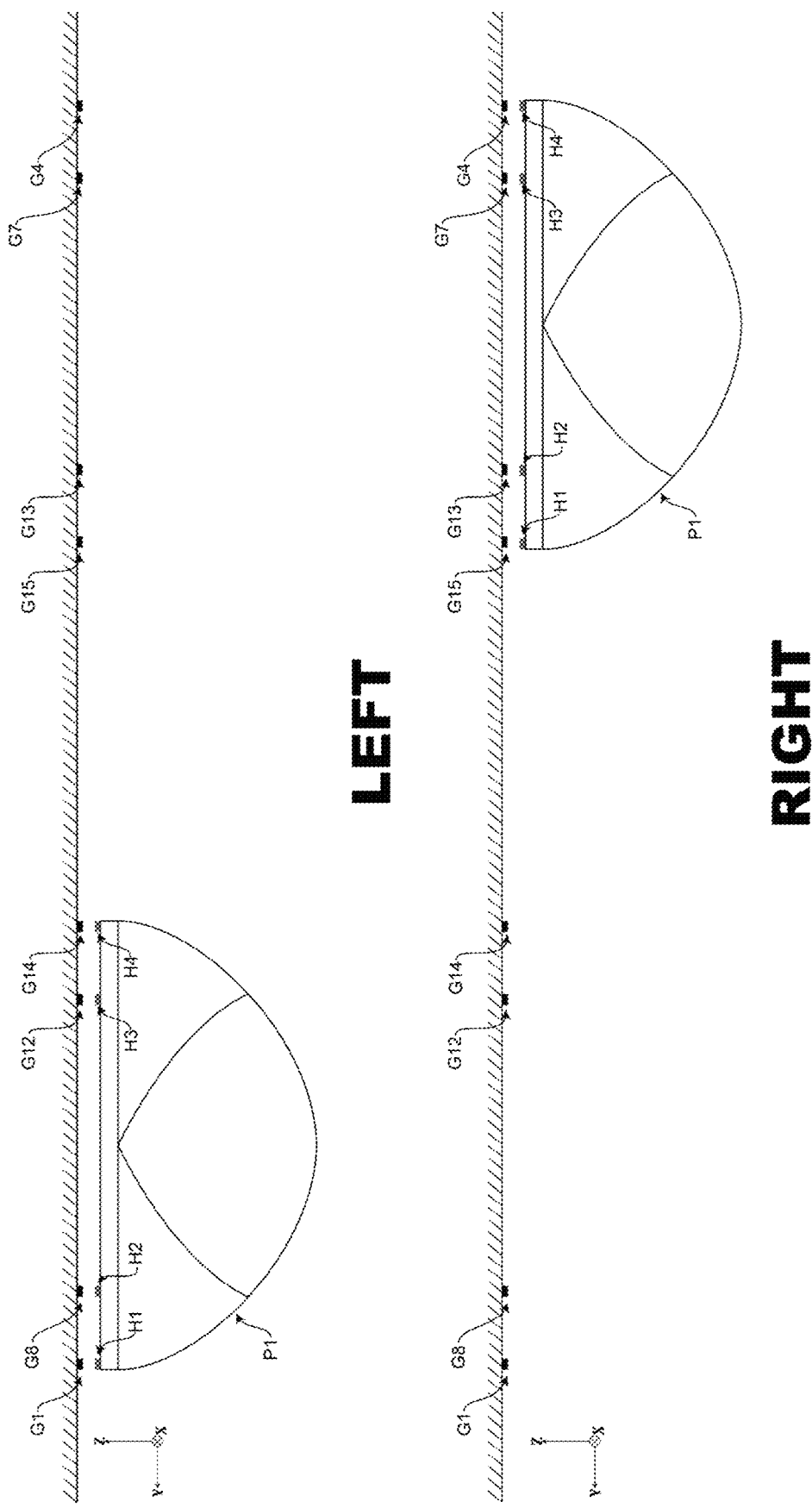
FIG. 55 shows an exemplary cross-sectional view at section L10 of FIG. 45 in accordance with aspects of the disclosure.

FIG. 55 shows an exemplary cross-sectional view at section L10 of the track arrangement (or topology) 4500 (as shown in FIG. 45) in accordance with aspects of the disclosure. As shown in FIG. 55, if the pod P1 is directed leftward, the LEFT primary force interactions (not limited to but providing the majority of the forces acting on bearings) are:

(H1) interacting with (G1) to provide Y- and Z-directed forces (providing guidance);

(H2) interacting with (G8) to provide Y- and Z-directed forces (providing guidance);

(H3) interacting with (G12) to provide Y- and Z-directed forces (providing guidance); and (H4) interacting with (G14) to provide Y- and Z-directed forces (providing guidance).

At this point along the path of travel downstream of the divergence, operation of the pod P1 is nominal (e.g., a cruise configuration is established where YZ required forces are distributed as required among all four bearings).

As shown in FIG. 55, if the pod P1 is directed rightward, the RIGHT primary force interactions (not limited to but providing the majority of the forces acting on bearings) are:

(H1) interacting with (G15) to provide Y- and Z-directed forces (providing guidance);

(H2) interacting with (G13) to provide Y- and Z-directed forces (providing guidance);

(H3) interacting with (G7) to provide Y- and Z-directed forces (providing guidance); and (H4) interacting with (G4) to provide Y- and Z-directed forces (providing guidance).

At this point along the path of travel downstream of the divergence, operation of the pod P1 is nominal (e.g., a cruise configuration is established where YZ required forces are distributed as required among all four bearings).

While the specification describes particular embodiments of the present disclosure, those of ordinary skill can devise variations of the present disclosure without departing from the inventive concept.

Figure 56:
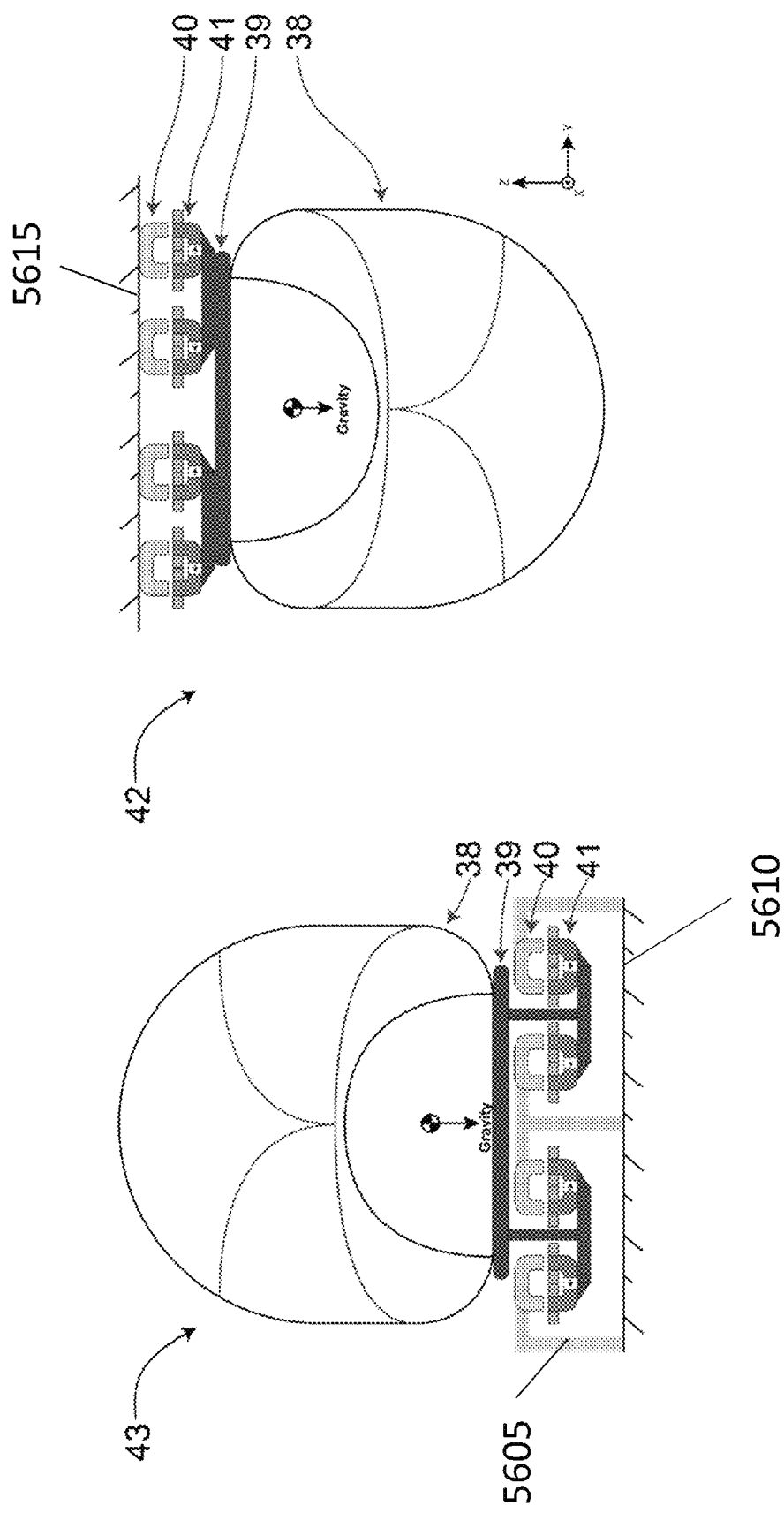
FIG. 56 shows exemplary cross-sectional views of an underhung track arrangement and an overhung track arrangement in accordance with aspects of the disclosure.

FIG. 56 shows exemplary cross-sectional views of an underhung track arrangement 43 and an overhung track arrangement 42 in accordance with aspects of the disclosure. As shown in FIG. 56, each arrangement includes a vehicle 38, a bearing mount (or coupling plate) 39, a plurality of bearings (e.g., levitation engines) 41, and a plurality of corresponding tracks (or guideways) 40 (e.g., comprising rails). Bogies 44 are coupled to vehicle 38 via a mechanical structure, such as the bearing mount (or coupling plate) 39. At the ends of the bogies 44 are the bearings 41 (e.g., magnetic bearings having a set of magnet assemblies) to be coupled (e.g., magnetically coupled) to guideway 40.

As shown in FIG. 56, with the exemplary underhung track arrangement 43, the bearings 41 and tracks (or guideway) 40 are beneath (or under) the vehicle 38. In contrast, with the exemplary overhung track arrangement 42, the bearings 41 and tracks (or guideway) 40 are above (or over) the vehicle 38. Additionally, as can be observed in FIG. 56, some embodiments (e.g., the exemplary underhung track arrangement 43) may utilize one or more "enclosed" guideways having a guideway housing 5605 (mounted on a base structure 5610), in which the tracks (or track elements) 40 are arranged (and in which elements of the vehicle 38 (e.g., bogies 44 and bearings 41 and portions of a connector between the boogies 44 and the bearing mount 39) may be accommodated as the vehicle 38 travels along the guideway 40, for example). Additionally, other embodiments (e.g., the exemplary overhung track arrangement 42) may utilize an "open" guideway in which the track elements are mounted to a base structure 5615. While the exemplary depicted embodiments are configured as such, the disclosure contemplates, for example, underhung track arrangements that utilize "open" guideways and overhung track arrangements that utilize one or more "enclosed" guideways.

In the illustrated embodiments, the sets of bearings 41 interact with guideway 40. While not viewable in FIG. 56, multiple bearings 41 may be arranged parallel to each other in the direction of vehicle travel, i.e., in the x-axis direction. These multiple bearings 41 can also be aligned with one another in the travel direction, or one or more engines may be offset from each other in the Y-direction. The bearings 41 are tunable to maintain a non-contacting coupling with guideway 40 so that vehicle 38 levitates as it is guided along guideway 40. Moreover, from the two exemplary embodiments, it can be seen that the magnetic coupling between the bearings 41 and guideway 40 can be tuned to overcome or compensate for the weight of vehicle 38.

System Environment

Aspects of embodiments of the present disclosure (e.g., control systems for the switching system or for the selective activation/deactivation of the bearings (e.g., lev engines)) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc.

As will be appreciated by one skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a usb key, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present disclosure may be embodied in a field programmable gate array (FPGA).

Figure 57:
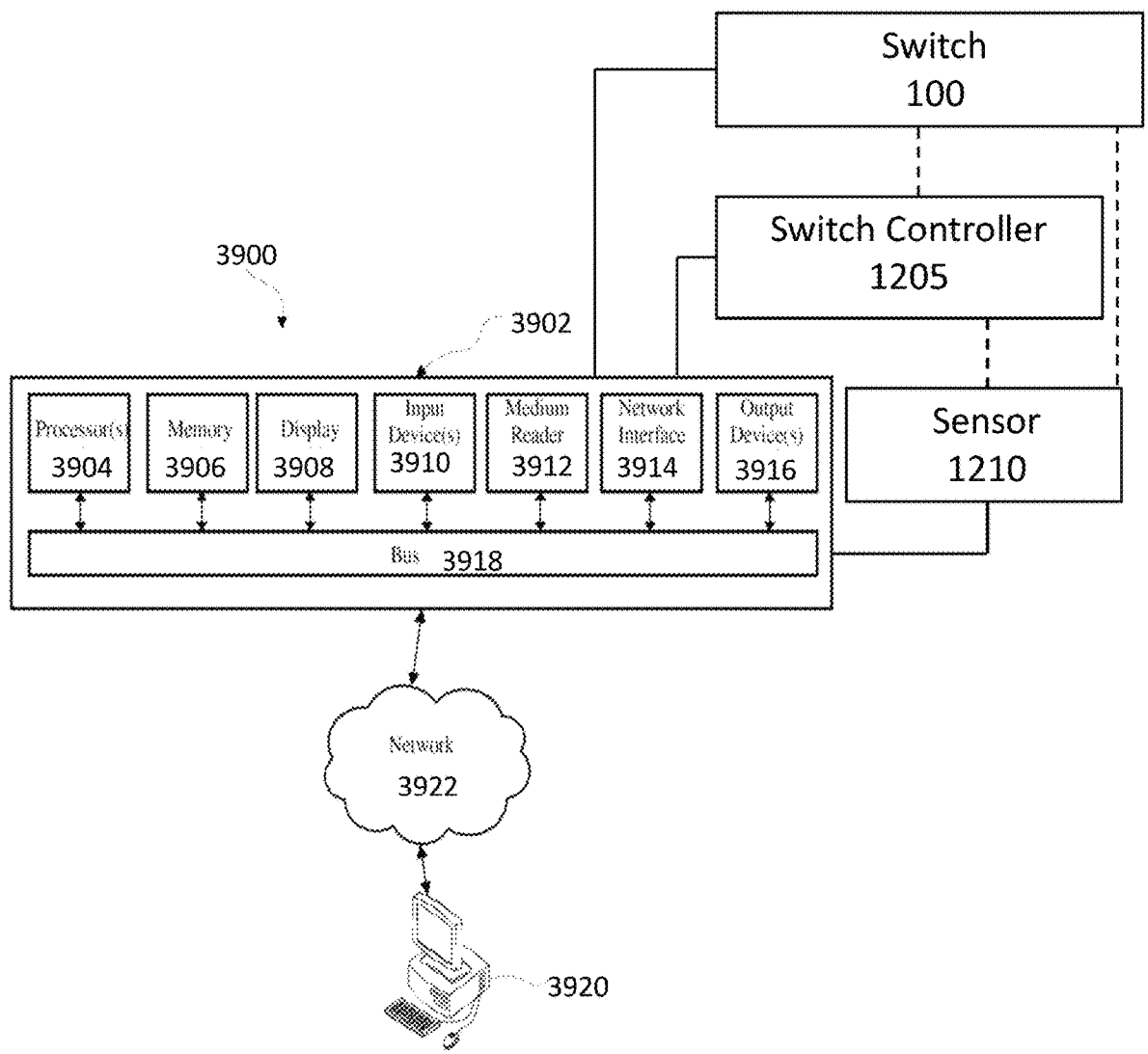
FIG. 57 shows an exemplary environment for practicing aspects of the present disclosure.

FIG. 57 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks or cloud environment.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

As illustrated in FIG. 57, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 57, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof. As shown in FIG. 57, the computer system 3902 may include communication and/or power connections to switches 100, which may be switches for the bearings, and a switch controller 1205 to control activation/deactivation of the respective bearings, in accordance with aspects of the disclosure. Additionally, as shown in FIG. 57, the computer system 3902 may include one or more sensors 1210 (e.g., positional sensors, GPS systems, magnetic sensors) that may provide data (e.g., positional data) to the switch controller 1205.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 57. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Accordingly, the present disclosure provides various systems, structures, methods, and apparatuses. Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular materials and embodiments, embodiments of the disclosure are not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

While the specification describes particular embodiments of the present disclosure, those of ordinary skill can devise variations of the present disclosure without departing from the inventive concept.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

While the specification describes particular embodiments of the present disclosure, those of ordinary skill can devise variations of the present disclosure without departing from the inventive concept.

Insofar as the description above and the accompanying drawing disclose any additional subject matter that is not within the scope of the claims below, the embodiments are not dedicated to the public and the right to file one or more applications to claim such additional embodiments is reserved.

What is claimed is:

1. A track switching arrangement for a track-based guided transportation system, the track switching arrangement forming diverging pathways and enabling vehicle-side switching of a vehicle in the guided transportation system, the track switching arrangement comprising:
   an upstream pathway;
   two downstream pathways; and
   a path switching transition region having the diverging pathways between the upstream pathway and the two downstream pathways,
   wherein each of the pathways comprises track elements configured to interact with one or more respective bearings of the vehicle to provide levitation to the vehicle and/or guidance for the vehicle,
   wherein the track elements form an overhung track arrangement having an overhead bearing surface, and
   wherein the track elements comprise four tracks configured for respective selective interaction with two out-of-plane bearings and two in-plane bearings of the vehicle,
   wherein the four tracks include:
      two outer tracks configured for the interaction with the two out-of-plane bearings; and
      two inner tracks configured for the interaction with the two in-plane bearings arranged between the two outer tracks,
   wherein the two inner tracks each have in-plane bearing surfaces that are parallel to each other, and
   wherein the two outer tracks have respective symmetrically-arranged out-of-plane bearing surfaces that are non-parallel to each other and non-parallel to the in-plane bearing surfaces of the two inner tracks.

2. The track switching arrangement of claim 1, wherein the track elements comprise four rails.

3. The track switching arrangement of claim 2, wherein the track elements are each in the same plane.

4. The track switching arrangement of claim 2, wherein the track elements are arranged in respective guideways configured to accommodate respective bearings of the vehicle.

5. The track switching arrangement of claim 4, wherein at the upstream pathway, the respective guideways have a first width such that the rails arranged therein are each arranged to interact with a respective bearing of the vehicle, and wherein at a beginning portion of the path switching transition region, the respective guideways increase in width from the first width such that such that only some of the rails arranged therein are each arranged to directly interact with a respective bearing of the vehicle.

6. The track switching arrangement of claim 5, wherein at a further portion of the path switching transition region downstream from the beginning portion, the respective guideways further increases in width to accommodate additional track elements of the diverging pathways.

7. The track switching arrangement of claim 1, further comprising a cross-over region.

8. The track switching arrangement of claim 1, further comprising at least one guideway and at least one track element arranged in the at least one guideway.

9. The track switching arrangement of claim 8, wherein the at least one guideway has a cross section structured to allow a vehicle guidance apparatus of the vehicle to suspend substantially beneath the track element, which is connected to an overhang ceiling of the at least one guideway, such that the at least one bearing of the vehicle guidance apparatus is engaged with the at least one track, such that the track is exerts forces on the bearing, including a lateral force and a vertical force.

10. The track switching arrangement of claim 1, wherein the track elements further comprise multiple largely guidance rails.

11. The track switching arrangement of claim 1, wherein the track elements further comprise a plurality of off-set and angled rails producing both levitation and guidance.

12. A method of operating the switching system of claim 1, the method comprising:
   controlling activation and/or magnitude of operation of one or more respective bearings on the vehicle during travel through the path switching transition region having the diverging pathways between the upstream pathway and the two downstream pathways, to selectively interact with some of the track elements to provide guidance for the vehicle to one of the two downstream pathways.

* * * * *